United States Patent
Gaither et al.

(10) Patent No.: US 9,656,583 B2
(45) Date of Patent: May 23, 2017

(54) PASSENGER SEAT

(71) Applicant: Zodiac Seats US LLC, Gainesville, TX (US)

(72) Inventors: Larry Richard Gaither, The Colony, TX (US); Timothy W. Terleski, Richardson, TX (US); Chirag Patel, Dallas, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 76 days.

(21) Appl. No.: 14/455,125

(22) Filed: Aug. 8, 2014

(65) Prior Publication Data

US 2014/0346828 A1    Nov. 27, 2014

Related U.S. Application Data

(60) Division of application No. 13/432,109, filed on Mar. 28, 2012, now Pat. No. 8,827,365, which is a
(Continued)

(51) Int. Cl.
*B60N 2/66* (2006.01)
*B64D 11/06* (2006.01)
(Continued)

(52) U.S. Cl.
CPC ............ *B60N 2/66* (2013.01); *B60N 2/02* (2013.01); *B60N 2/22* (2013.01); *B60N 2/242* (2013.01);
(Continued)

(58) Field of Classification Search
CPC .......... B60N 2/168; B60N 2/167; B60N 2/66; B60N 2/2227; A47C 1/023; A47C 1/03233
(Continued)

(56) References Cited

U.S. PATENT DOCUMENTS 3,005,660 A    10/1961    Winick
4,362,336 A    12/1982    Zapf et al.
(Continued)

FOREIGN PATENT DOCUMENTS

EP    1116653    7/2001
EP    1234763    8/2002
(Continued)

OTHER PUBLICATIONS

International Search Report and Written Opinion dated May 31, 2011 in Application No. PCT/US2011/024407.
(Continued)

*Primary Examiner* — Sarah McPartlin
(74) *Attorney, Agent, or Firm* — Kilpatrick Townsend & Stockton LLP; Dean W. Russell; Tiffany L. Williams

(57) ABSTRACT

Describes are passenger seats including a seat pan assembly with a reclining mechanism, a seat back pivotally coupled to the aft end of the seat pan assembly, and a lumbar mechanism coupled to the seat back and/or the seat pan assembly. As examples, the seat pan assembly includes at least one track having a reclining path and a sleeper path, and a sleeper selection control configured to pull a diverter into a position substantially blocking the opening to the reclining path and to push the diverter into a position substantially blocking the opening to the sleeper path. In certain cases, the seat pan assembly also includes a tilting mechanism with a fixed component and a variable component adjustably engaged with each other.

16 Claims, 49 Drawing Sheets

Related U.S. Application Data continuation-in-part of application No. 13/025,086, filed on Feb. 10, 2011, now Pat. No. 8,439,435.

(60) Provisional application No. 61/516,122, filed on Mar. 28, 2011, provisional application No. 61/458,979, filed on Dec. 3, 2010, provisional application No. 61/403,326, filed on Sep. 14, 2010, provisional application No. 61/302,994, filed on Feb. 10, 2010.

(51) Int. Cl.
  *B60N 2/24* (2006.01)
  *B60N 2/02* (2006.01)
  *B60N 2/22* (2006.01)
  *B61D 33/00* (2006.01)

(52) U.S. Cl.
  CPC .............. *B61D 33/00* (2013.01); *B64D 11/06* (2013.01); *B64D 11/064* (2014.12); *B64D 11/0641* (2014.12); *B64D 11/0644* (2014.12); *B64D 11/0646* (2014.12); *B64D 11/0649* (2014.12); *Y02T 50/46* (2013.01)

(58) Field of Classification Search
  USPC .......................... 297/340, 341, 342, 316, 317
  See application file for complete search history.

(56) References Cited

U.S. PATENT DOCUMENTS

| | | | |
|---|---|---|---|
| 4,767,157 A | 8/1988 | Kazaoka et al. | |
| 5,112,109 A | 5/1992 | Takada et al. | |
| 5,203,532 A | 4/1993 | Matsuura | |
| 5,558,399 A | 9/1996 | Serber | |
| 5,722,726 A | 3/1998 | Matsumiya | |
| 5,735,574 A | 4/1998 | Serber | |
| 5,857,745 A | 1/1999 | Matsumiya | |
| 6,030,043 A | 2/2000 | Habedank | |
| 6,059,364 A * | 5/2000 | Dryburgh | A47C 1/0352 105/322 |
| 6,237,994 B1 | 5/2001 | Bentley et al. | |
| 6,340,208 B1 | 1/2002 | Habedank | |
| 6,481,798 B2 | 11/2002 | Romca et al. | |
| 6,641,214 B2 | 11/2003 | Veneruso | |
| 6,679,556 B1 | 1/2004 | Alvestad | |
| 6,688,691 B2 | 2/2004 | Marechal et al. | |
| 6,692,069 B2 | 2/2004 | Beroth et al. | |
| 6,877,597 B2 | 4/2005 | Bach et al. | |
| 7,229,118 B2 | 6/2007 | Saberan et al. | |
| 7,374,245 B2 | 5/2008 | Tanaka et al. | |
| 7,469,861 B2 | 12/2008 | Ferry et al. | |
| 7,472,957 B2 | 1/2009 | Ferry et al. | |
| 7,523,888 B2 | 4/2009 | Ferry et al. | |
| 7,637,571 B2 | 12/2009 | Okano et al. | |
| 7,997,654 B2 | 8/2011 | Ferry et al. | |
| 8,419,123 B2 * | 4/2013 | Hankinson | B64D 11/06 297/118 |
| 8,439,435 B2 | 5/2013 | Gaither et al. | |
| 8,733,840 B2 | 5/2014 | Westerink et al. | |
| 9,174,737 B2 * | 11/2015 | Beroth | B64D 11/06 |
| 2001/0000639 A1 | 5/2001 | Park et al. | |
| 2002/0063449 A1 | 5/2002 | Plant | |
| 2004/0036336 A1 * | 2/2004 | Veneruso | B60N 2/0232 297/354.13 |
| 2005/0046259 A1 | 3/2005 | Schuerg | |
| 2007/0235271 A1 | 10/2007 | Elliot et al. | |
| 2008/0211283 A1 | 9/2008 | Okano et al. | |
| 2010/0019086 A1 | 1/2010 | Ferry et al. | |
| 2010/0253122 A1 | 10/2010 | Okimoto et al. | |
| 2010/0308167 A1 | 12/2010 | Hawkins et al. | |
| 2011/0193386 A1 | 8/2011 | Gaither et al. | |
| 2012/0217779 A1 | 8/2012 | Gaither et al. | |
| 2013/0009435 A1 | 1/2013 | Westerink et al. | |

FOREIGN PATENT DOCUMENTS

| | | |
|---|---|---|
| EP | 1970245 | 9/2008 |
| GB | 1049792 | 11/1966 |
| GB | 1271869 | 4/1972 |
| WO | WO03013903 | 2/2003 |
| WO | WO2011100476 | 8/2011 |
| WO | WO2012135250 | 10/2012 |
| WO | WO2013006749 | 1/2013 |

OTHER PUBLICATIONS

International Preliminary Report on Patentability dated Aug. 23, 2012 in Application No. PCT/US2011/024407.
International Search Report and Written Opinion dated Sep. 7, 2012 in Application No. PCT/US2012/030792.
Office Action dated Oct. 24, 2012 in U.S. Appl. No. 13/025,086.
U.S. Appl. No. 13/542,816, Notice of Allowance, Jan. 14, 2014.
PCT/US2012/045658, International Preliminary Report on Patentability, Jan. 16, 2014.
International Search Report and Written Opinion dated Dec. 3, 2012 in Application No. PCT/US2012/045658.
International Preliminary Report on Patentability dated Oct. 10, 2013 in Application No. PCT/US2012/030792.
Office Action dated Sep. 24, 2013 in U.S. Appl. No. 13/542,816.
Response dated Dec. 23, 2013 in U.S. Appl. No. 13/542,816.
Office Action dated Jan. 17, 2014 in U.S. Appl. No. 13/432,109.
Response dated Apr. 17, 2014 in U.S. Appl. No. 13/432,109.
Notice of Allowance dated May 8, 2014 in U.S. Appl. No. 13/432,109.
Notice of Allowance dated Feb. 6, 2013 in U.S. Appl. No. 13/025,086.
Response dated Jan. 24, 2013 in U.S. Appl. No. 13/025,086.

* cited by examiner

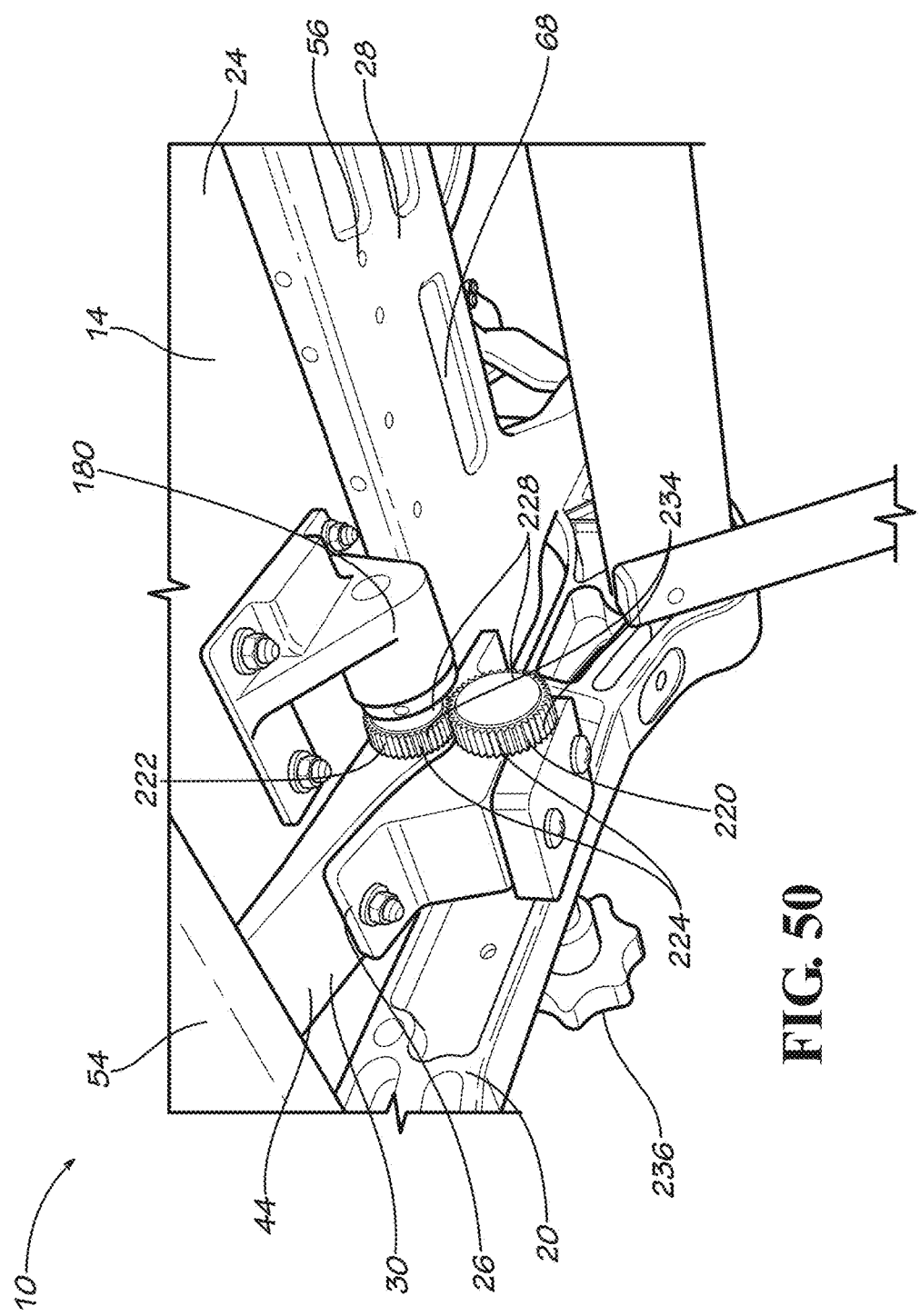

PASSENGER SEAT

CROSS REFERENCE TO RELATED APPLICATIONS

This application is a division of U.S. patent application Ser. No. 13/432,109 filed on Mar. 28, 2012, now allowed, which is related to and claims priority benefits from U.S. Provisional Application Ser. No. 61/516,122, filed on Mar. 28, 2011, entitled PASSENGER SEAT (2MOTION UPDATE); and is a continuation-in-part of U.S. patent application Ser. No. 13/025,086, filed on Feb. 10, 2011, entitled PASSENGER SEAT, now pending, which is related to and claims priority benefits from U.S. Provisional Application Ser. No. 61/302,994, filed on Feb. 10, 2010, entitled TOURIST CLASS SLEEPER SEAT; U.S. Provisional Application Ser. No. 61/403,326, filed on Sep. 14, 2010, entitled TOURIST CLASS SLEEPER SEAT; and U.S. Provisional Application Ser. No. 61/458,979, filed on Dec. 3, 2010, entitled TOURIST CLASS SLEEPER SEAT. The '109, '122, '086, '994, '326, and '979 applications are hereby incorporated in their entireties by this reference.

FIELD OF THE INVENTION

The field of the invention relates to passenger seats or the like.

BACKGROUND

Common carriers, such as passenger airlines, bus lines, and train lines, frequently convey substantial numbers of passengers simultaneously. In many instances, there is a desire to increase the number of seats within a given space to optimize the number of passengers being transported at any given time. By increasing the number of passenger seats in the space, the amount of space available for each passenger is diminished.

In order to provide as much room as possible for the passenger in the diminished space, some passenger seats have been modified to reduce the distance that the passenger seat back may be reclined. In some cases, to offset the reduction in passenger comfort created by the limited recline, the passenger seat bottom pan may tilt forward to increase the recline angle of the entire seat while maintaining the limited amount of intrusion of the passenger seat back into the next-aft passenger seat space. While these modifications have improved the reclining comfort, additional improvements are desired to provide a comfortable sleeping position without increasing the amount of intrusion of the passenger seat back into the next-aft passenger seat space.

SUMMARY

Embodiments of the present invention include a passenger seat comprising a seat pan assembly, a seat back pivotally coupled to the aft end of the seat pan assembly, and a lumbar mechanism coupled to the seat back and/or the seat pan assembly.

In some embodiments, the seat pan assembly may comprise a reclining mechanism, a seat frame comprising at least one track comprising a reclining path and a sleeper path, a diverter pivotally coupled to the at least one track adjacent an opening to the reclining path and an opening to the sleeper path, and a sleeper selection control coupled to the diverter and configured to pull the diverter into a position substantially blocking the opening to the reclining path and to push the diverter into a position substantially blocking the opening to the sleeper path. The seat pan assembly may further comprise at least one pivot bar coupled to the aft end of the seat pan assembly and configured to slidingly couple to the at least one track.

In other embodiments, the seat pan assembly may comprise a seat pan pivotally coupled to a seat frame, a tilting mechanism comprising a fixed component coupled to the seat frame and a variable component coupled to the seat pan, wherein the fixed component and the variable component are adjustably engaged with each other. The fixed component and the variable component may be engaged with each other via a plurality of interlocking teeth, which may be arranged on a planar surface or a circumferential surface of a mounting plate within each of the fixed component and the variable component. In some embodiments, an actuation cable may be coupled to the variable component, wherein the actuation cable is configured to apply a pulling force to the variable component to disengage the variable component from the fixed component. In other embodiments, an adjustment knob may be coupled to the fixed component, wherein the adjustment knob is configured to apply a frictional force to the fixed component.

The reclining mechanism may be configured to adjust a forward position of the seat pan assembly and the rotation of the seat back between upright and reclining positions. The tilting mechanism may be configured to rotate an aft end of the seat pan relative to the pan frame and deploy the lumbar mechanism. In some embodiments, the tilting mechanism and the reclining mechanism may be configured to operate independently of one another.

BRIEF DESCRIPTION OF THE DRAWINGS

FIG. 50 is a bottom partial perspective view of the tilting mechanism of FIG. 45, where the passenger seat is in a sleeper position.

DETAILED DESCRIPTION

Figure 1:
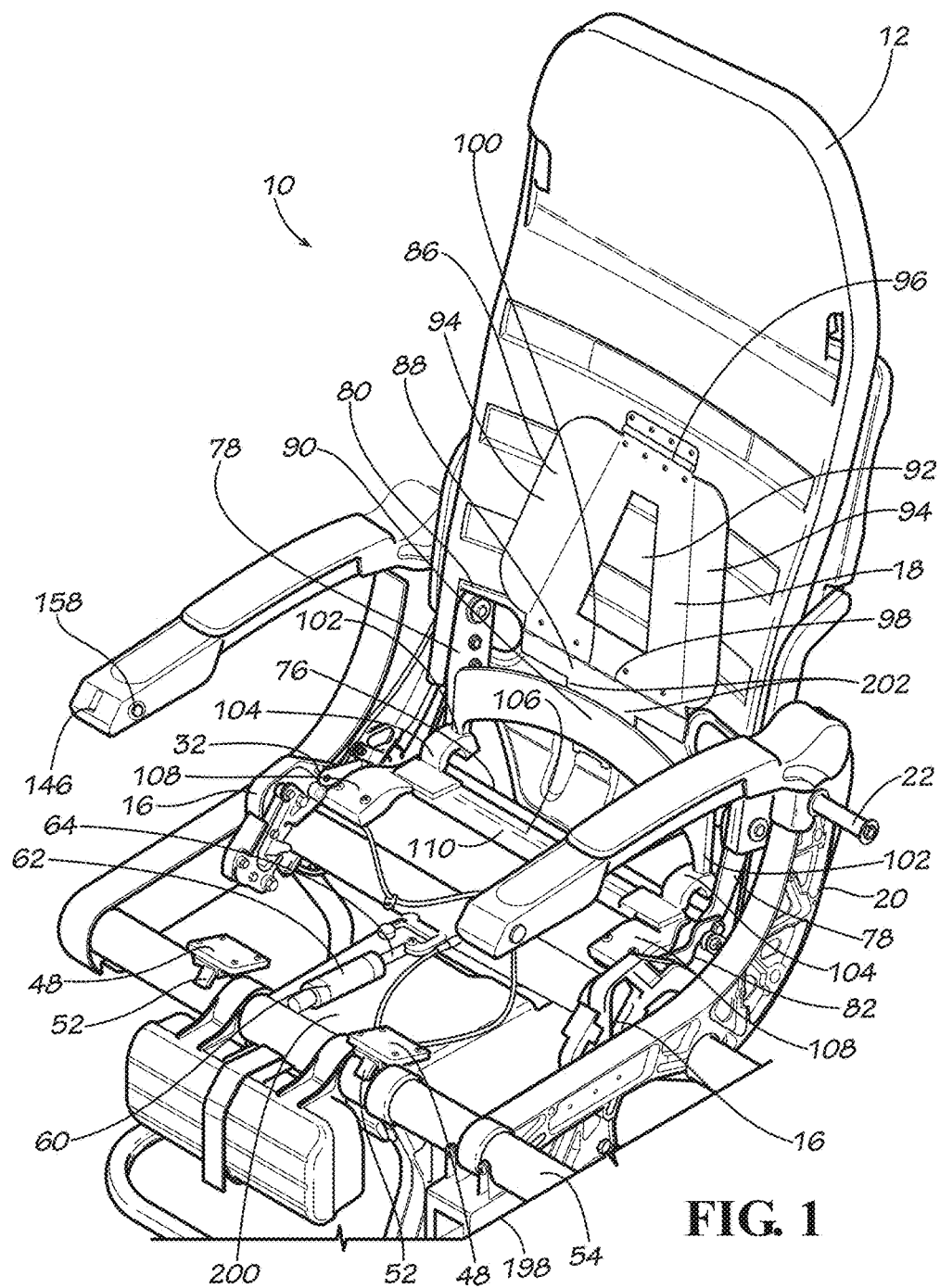
FIG. 1 is a perspective view of a passenger seat according to certain embodiments of the present invention.

Embodiments of the invention provide passenger seats with reclining and sleeper positions. While the passenger seats are discussed for use with aircraft, they are by no means so limited. Rather, embodiments of the passenger seats may be used with any type of vehicle or otherwise as desired.

FIGS. 1-50 illustrate embodiments of a passenger seat 10. In some embodiments, the passenger seat 10 comprises a seat back 12, a seat pan assembly 14, and a lumbar mechanism 18.

The seat back 12 may be formed of materials including but not limited to aluminum, stainless steel, other metallic materials, composite materials, or other similar materials. Each side of the seat back 12 is pivotally coupled to a seat frame 20 via a pivot shaft 22.

In the embodiments shown in FIGS. 1, 5-7, and 23-26, the seat pan assembly 14 comprises a seat pan 24, wherein the seat pan 24 has a integral design that incorporates the structural elements of a pan frame into the seat pan 24 structure. In the embodiments shown in FIGS. 27-50, the seat pan assembly 14 comprises a seat pan 24 coupled to a pan frame 26. The seat pan assembly 14 may be formed of materials including but not limited to aluminum, stainless steel, other metallic materials, composite materials, or other similar materials. Further, in the embodiments shown in FIGS. 27-50, the seat pan 24 and the pan frame 26 may be formed of the same or different materials.

In the embodiments shown in FIGS. 27-50, the pan frame 26 may comprise a support bar 28, two side bars 30, and at least one pivot bar 32. In these embodiments, the support bar 28 and the two side bars 30 are integrally formed and serve as the primary structure of the pan frame 26. In some embodiments, the support bar 28 and the two side bars 30 have an "I" formation, but any suitable shape or coupling between the support bar 28 and the two side bars 30 may be used that will provide sufficient stability and strength for the pan frame 26. The pivot bar 32 is coupled to an aft end 34 of the side bar 30.

As shown in FIGS. 27-30 and 33-42, the seat pan 24 is pivotally coupled to the pan frame 26 via a sleeper pivot bar 40. The sleeper pivot bar 40 passes through an aperture 42 formed in the forward region of the seat pan 24 and couples to forward ends 44 of the two side bars 30. In these embodiments, the seat pan 24 may include a cut-out region 46 that surrounds the pivot bar 32, but the seat pan 24 is not directly coupled to the pivot bar 32.

As shown in FIGS. 1, 27-30, 33-39, and 45-47, the seat pan assembly 14 may also include at least one coupling device 48 that is positioned adjacent a forward end 50 of the seat pan assembly 14. At least one coupling receptacle 52 may be positioned adjacent a forward base frame tube 54 of a seat frame 20. The seat pan assembly 14 is releasably coupled to the forward base frame tube 54 by releasably engaging the coupling device 48 with the coupling receptacle 52. In some embodiments, as shown in FIG. 1 (where the seat pan 24 is not shown so that the coupling device 48 is visible), the coupling device 48 is positioned on an inner surface 56 of the seat pan 24. In other embodiments, as shown in FIGS. 27-30, 33-39, and 45-47, the coupling device 48 is positioned on a projection 58 that extends from the forward end 44 of the side bar 30 so that the projection 58 is positioned adjacent a side 168 of the seat pan 24. However, one of ordinary skill in the relevant art will understand that any suitable releasable or fixed couplings may be used to secure the seat pan assembly 14 to the seat frame 20.

In some embodiments, at least one reclining mechanism 60 may be coupled to the seat pan assembly 14. The reclining mechanism 60 may be a locking gas spring comprising a cylinder 62 and a piston 64. In other embodiments, other suitable types of reclining mechanisms may be used.

In the embodiments shown in FIGS. 5-7 and 23-26, the piston 64 is coupled to a bracket 66, which is in turn coupled to the inner surface 56 of the seat pan 24. The bracket 66 is secured to the seat pan 24 via fasteners 36. In the embodiments shown in FIGS. 27-39 and 45-47, the piston 64 is coupled to a bracket 66, which is in turn coupled to an underside 68 of the support bar 28. In these embodiments, the bracket 66 is coupled to the support bar 28 via the fasteners 36, but the seat pan 24 is configured to allow the fasteners 36 to pass through the seat pan 24 without directly coupling the seat pan 24 to the support bar 28 in that particular location.

In some embodiments, a spherical plane bearing 70 may be used to couple the piston 64 to the bracket 66. The spherical plane bearing 70 allows the piston 64 to rotate in all directions relative to the bracket 66, but prevents the piston 64 from sliding forward or aft relative to the bracket 66. However, one of ordinary skill in the relevant art will understand that any suitable type of couplings may be used to couple the piston 64 to the bracket 66.

Figure 34:
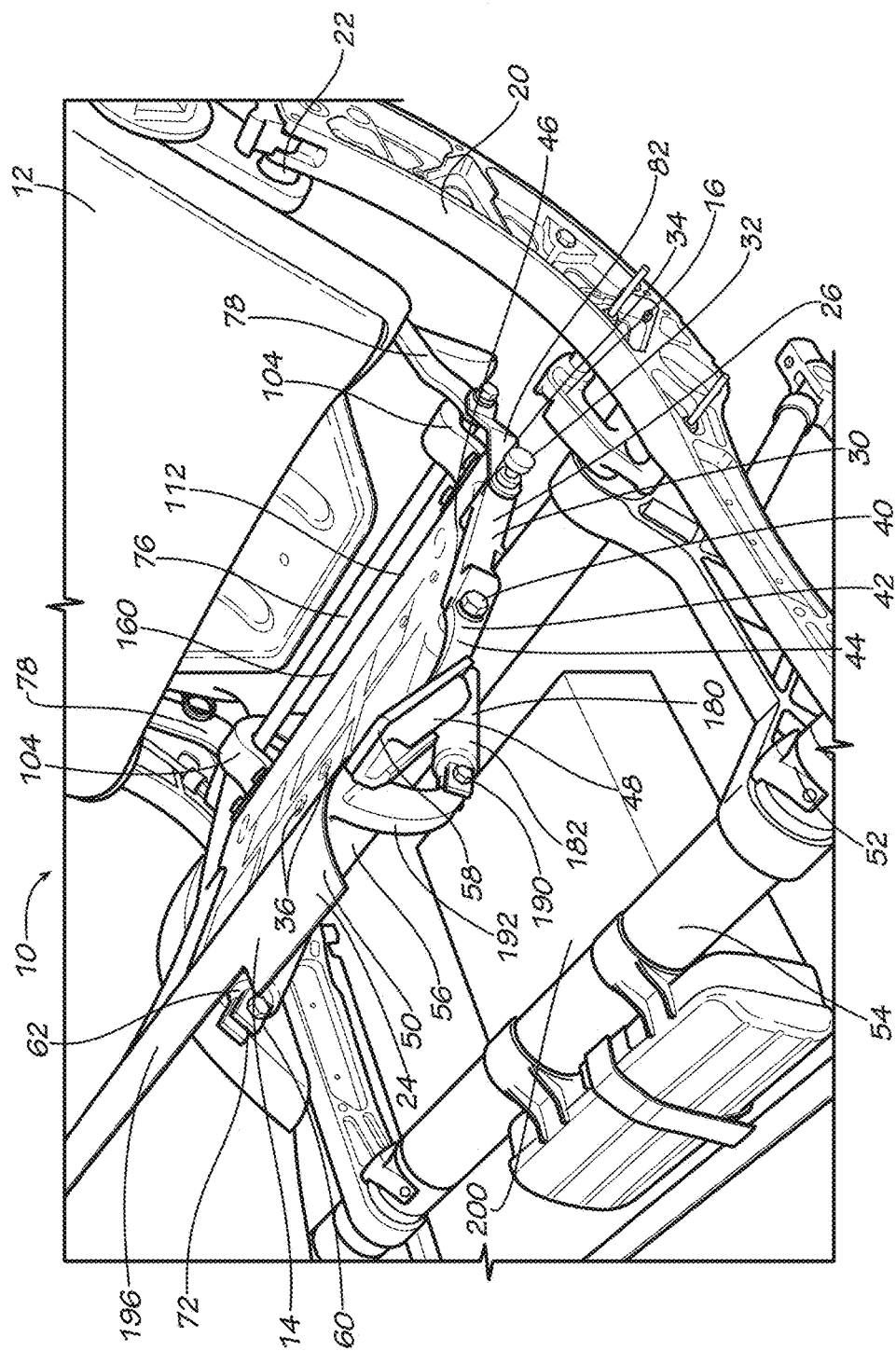
FIG. 34 is a partial perspective view of the passenger seat of FIG. 27, wherein the seat pan assembly is in a partially open position.
Figure 35:
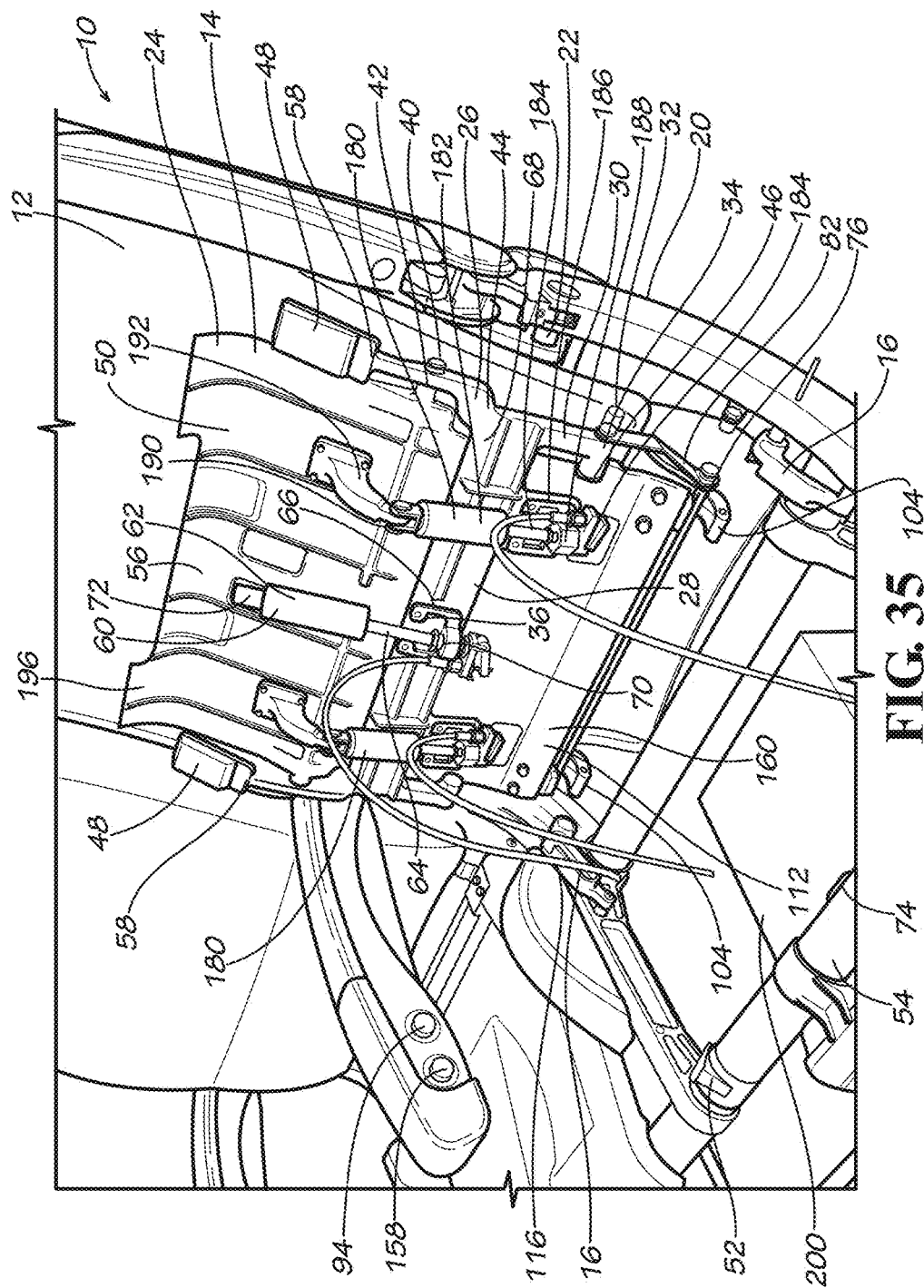
FIG. 35 is a partial perspective view of the passenger seat of FIG. 27, wherein the seat pan assembly is in an open position.
Figure 36:
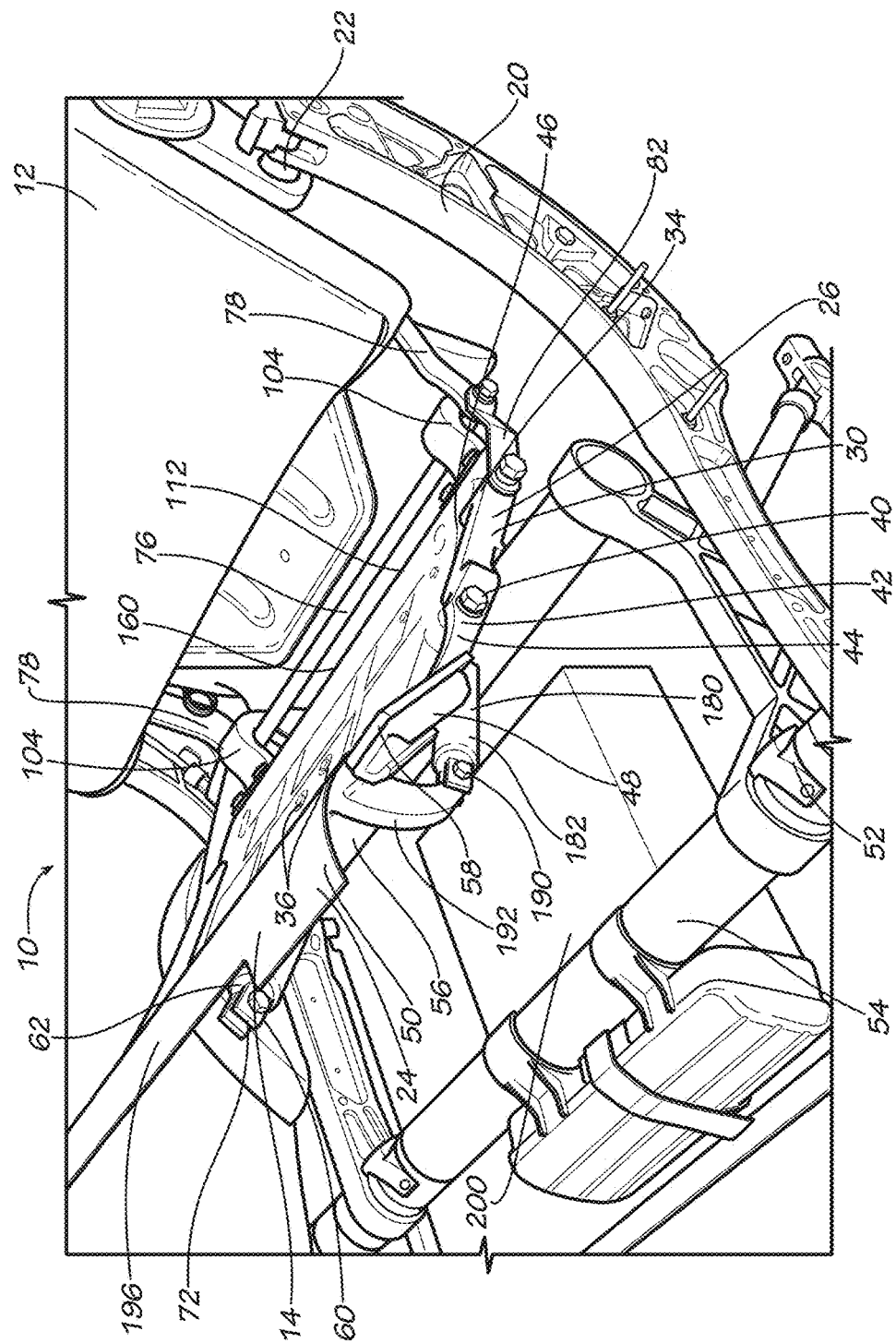
FIG. 36 is a partial perspective view of a passenger seat according to other embodiments of the present invention.
Figure 37:
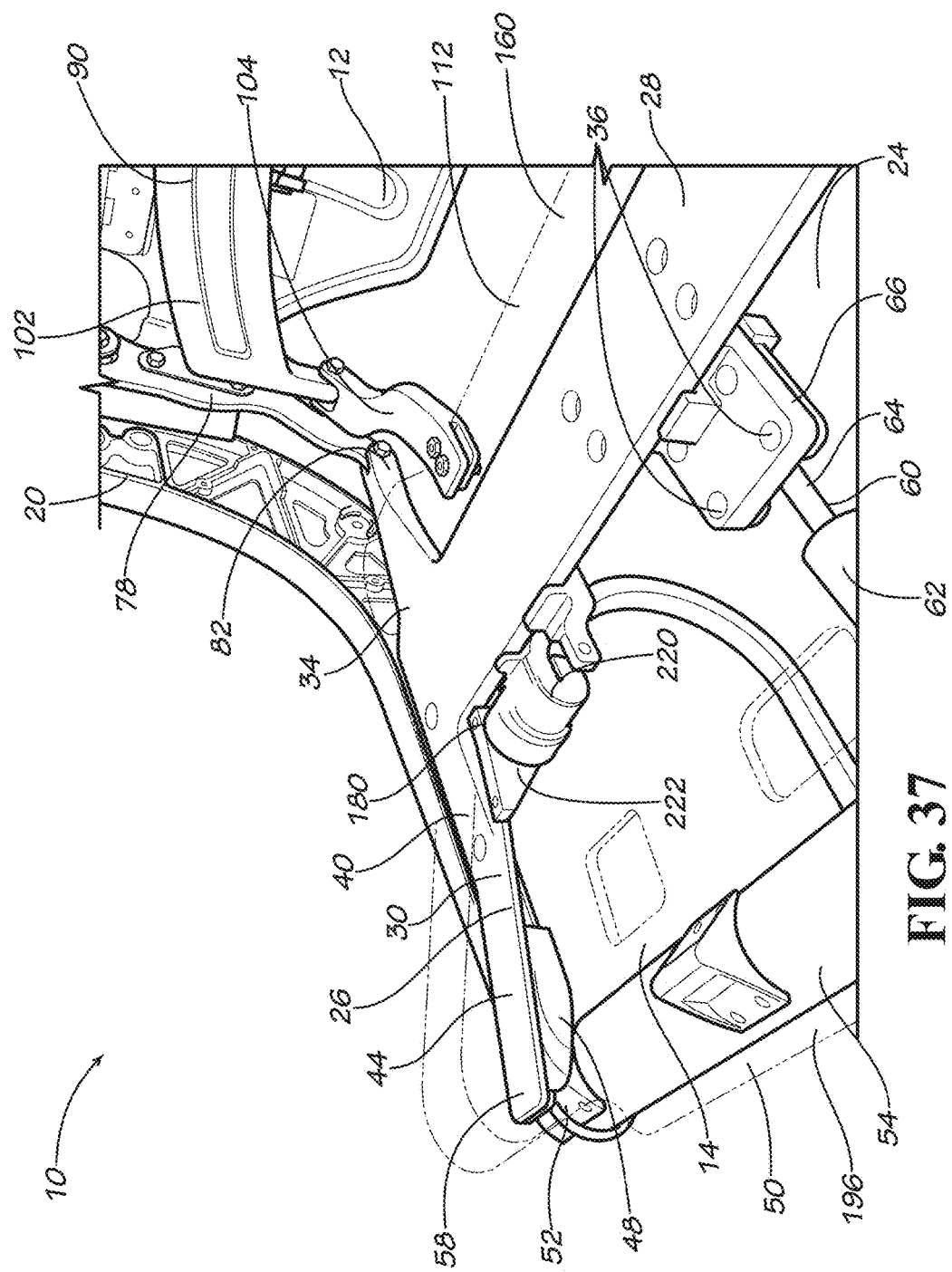
FIG. 37 is a top partial perspective view of other embodiments of a tilting mechanism for the passenger seat of FIG. 36, where the passenger seat is in an upright position.
Figure 38:
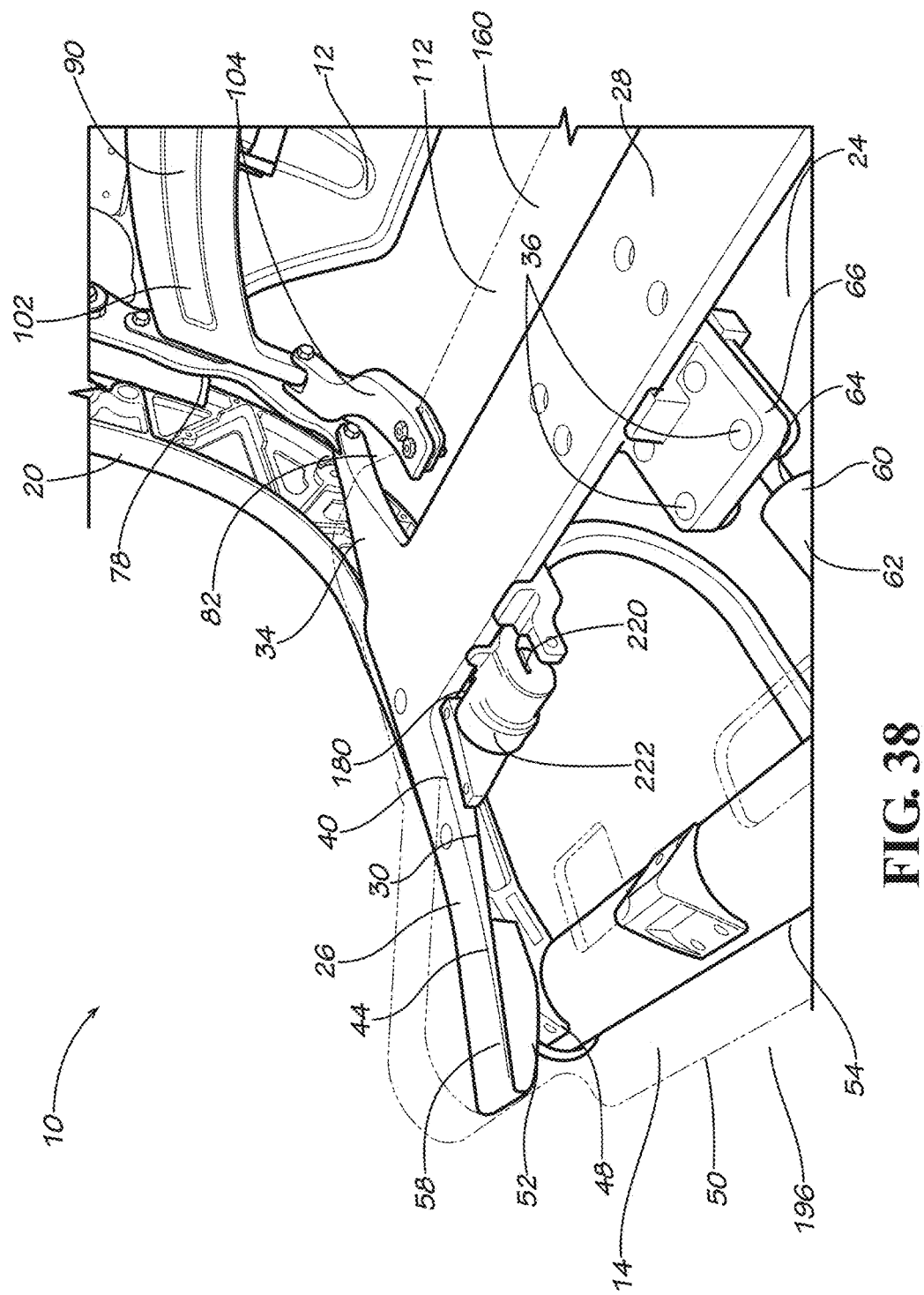
FIG. 38 is a top partial perspective view of the tilting mechanism of FIG. 37, where the passenger seat is in a reclining position.
Figure 39:
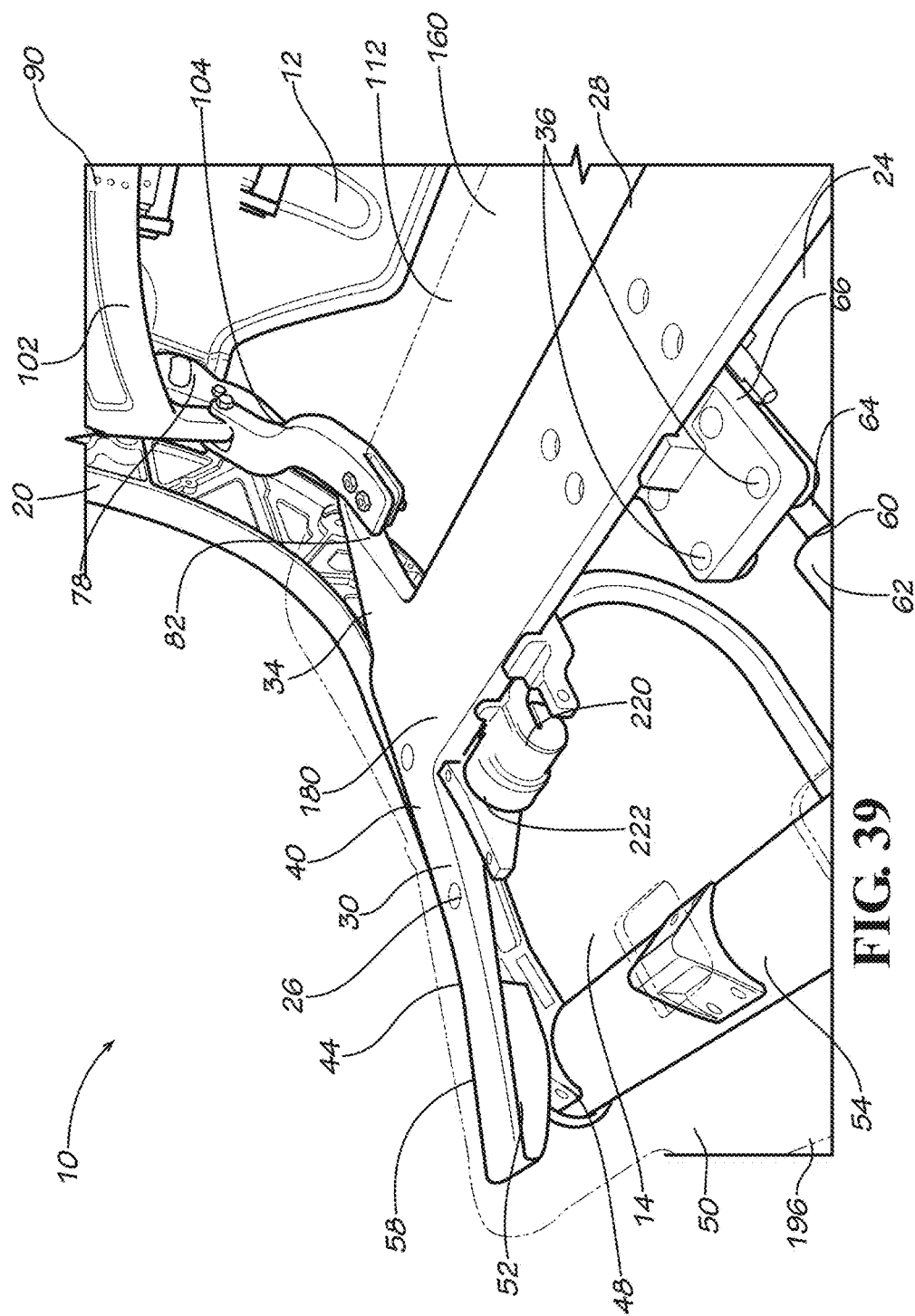
FIG. 39 is a top partial perspective view of the tilting mechanism of FIG. 37, where the passenger seat is in a sleeper position.
Figure 40:
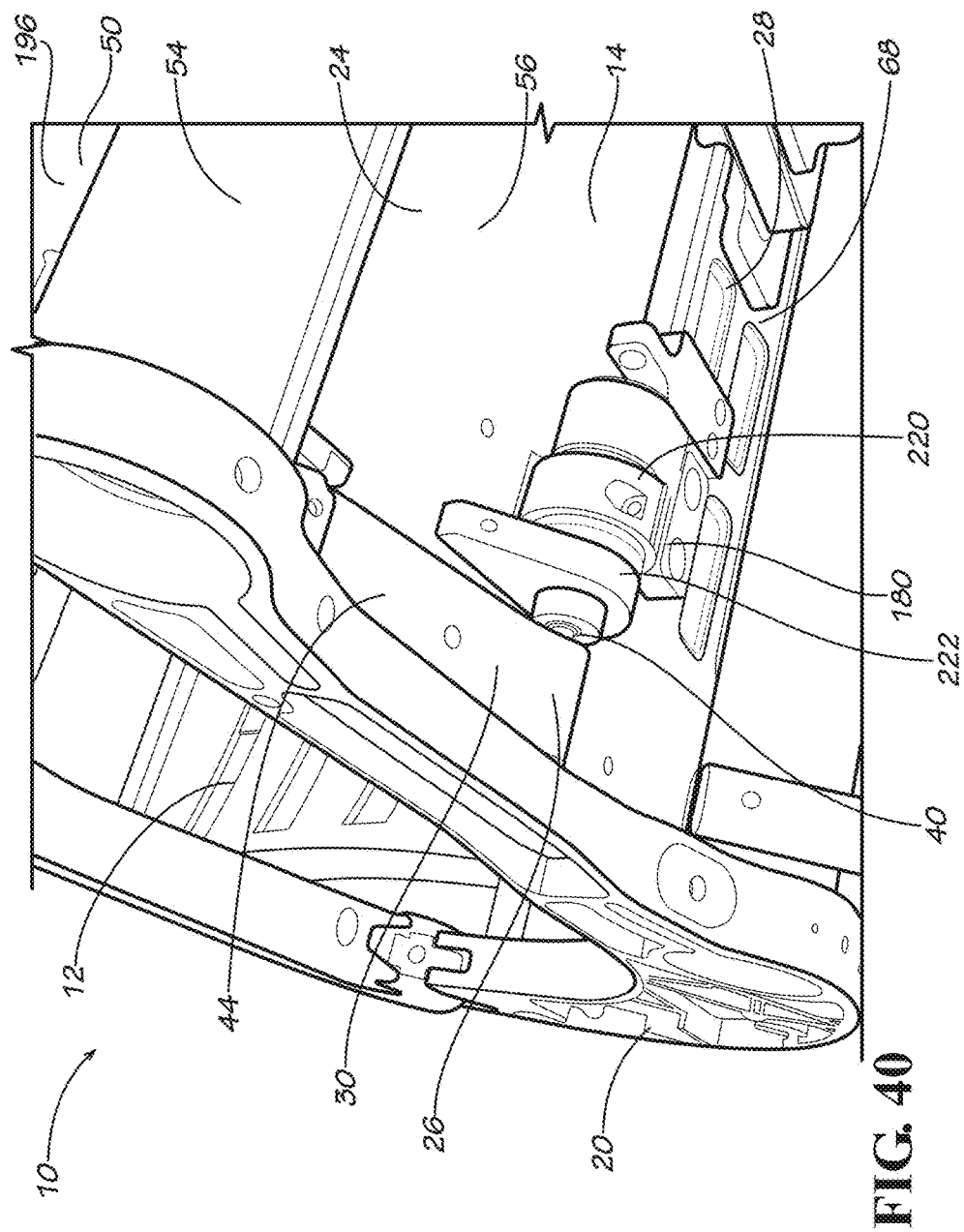
FIG. 40 is a bottom partial perspective view of the tilting mechanism of FIG. 37, where the passenger seat is in an upright position.
Figure 41:
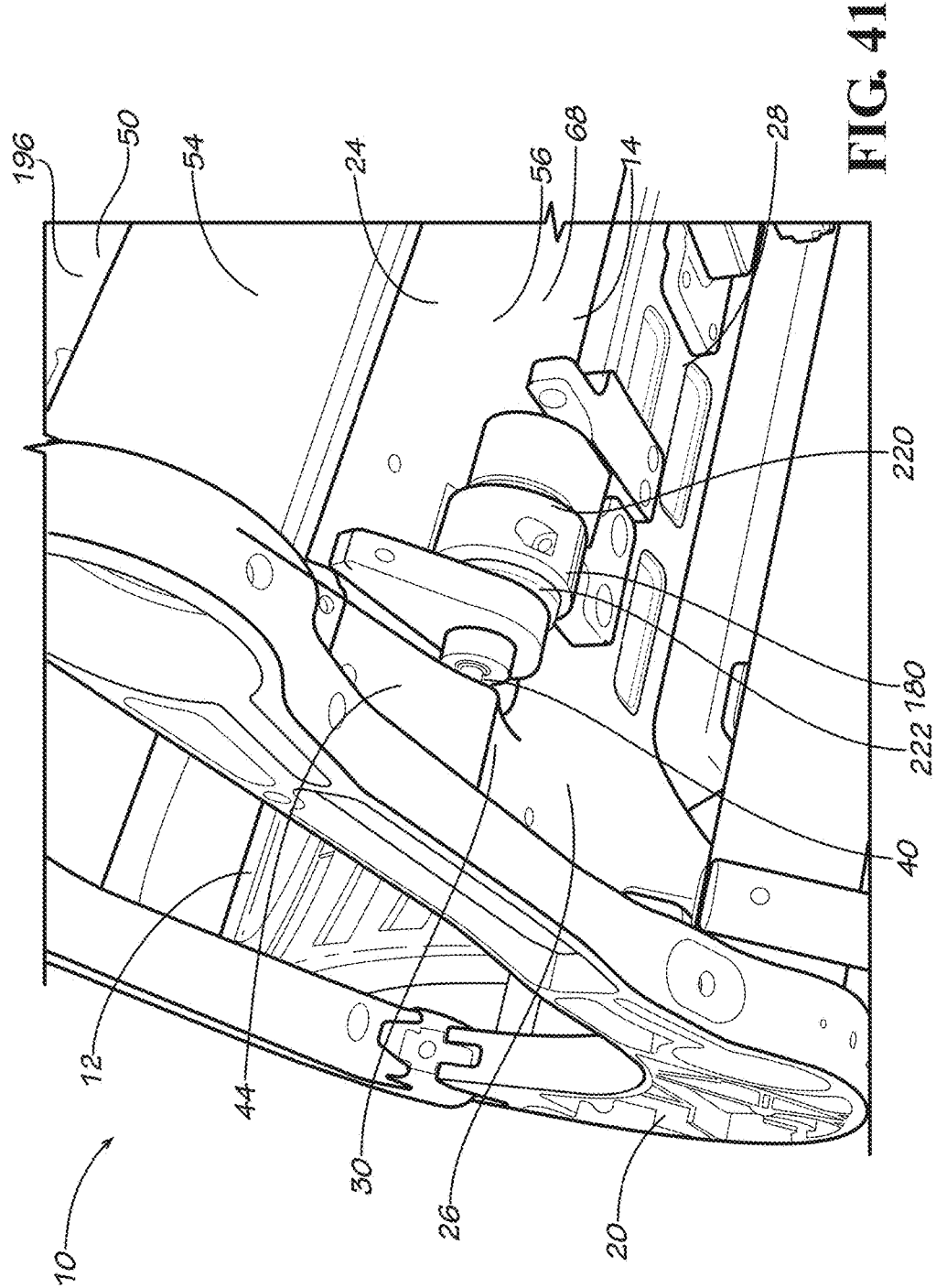
FIG. 41 is a bottom partial perspective view of the tilting mechanism of FIG. 37, where the passenger seat is in a reclining position.
Figure 42:
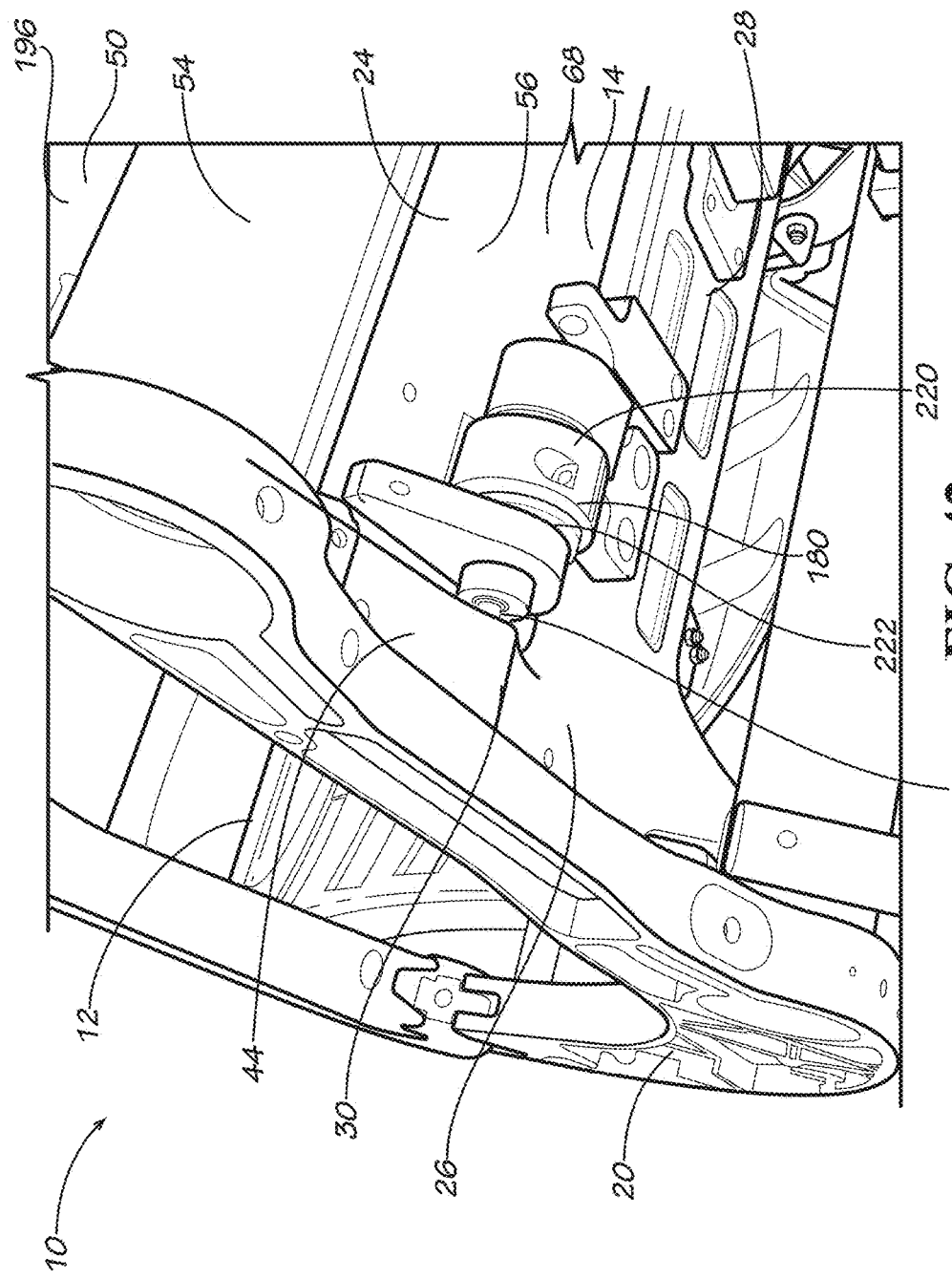
FIG. 42 is a bottom partial perspective view of the tilting mechanism of FIG. 37, where the passenger seat is in a sleeper position.

The cylinder 62 may include a pivotal coupling 72. In some embodiments, as shown in FIGS. 34-36, the pivotal coupling 72 is coupled to a bracket 74 that is positioned on the forward base frame tube 54 of the seat frame 20. A quick release pin mechanism may be used to couple the cylinder 62 to the bracket 74. However, any suitable mechanical fasteners may be used including but not limited to screws, bolts, rivets, or other suitable mechanical fastening devices.

The seat pan assembly 14 is pivotally linked to the seat back 12, as shown in FIGS. 1, 27-30, and 33-35. A pair of arms 78 are coupled to a lower end 80 of the seat back 12 and extend downward to pivotally link to a second pair of arms 82. In the embodiments shown in FIGS. 27-35, the arms 82 are in turn pivotally coupled to the aft ends 34 of the two side bars 30 adjacent each pivot bar 32. In this embodiment, the seat back 12 is pivotally linked to the seat pan assembly 14, but the seat back 12 does not support the seat pan assembly 14.

In the embodiment shown in FIGS. 36-39 and 45-47, the arms 82 are rigidly coupled to the aft ends 34 of the two side bars 30 adjacent each pivot bar 32. In this embodiment, an aft end 160 of the seat pan assembly 14 is not separately coupled to the seat frame 20. Thus, the seat back 12 is pivotally coupled to the aft end 160 of the seat pan assembly 14 and provides the structural support for the aft end 160 of the seat pan assembly 14. In other embodiments, the seat back 12 may be pivotally coupled to a pair of arches 104 that couple the lumbar mechanism 18 to the seat pan assembly 14.

In some embodiments, a torsion bar 76 may be positioned adjacent the coupling locations between the arms 78 and the arms 82, where the torsion bar 76 may provide additional torsional rigidity to the system. However, one of ordinary skill in the relevant art will understand that any suitable arrangement that allows the seat pan assembly 14 to pivotally couple to the seat back 12 in a manner that provides sufficient torsional rigidity to the passenger seat 10 may be used.

In some embodiments, the lumbar mechanism 18 is coupled to the seat back 12 and the seat pan 24. The lumbar mechanism 18 comprises an upper structure 86, a connector 88, and a lower structure 90. The lumbar mechanism 18 may be formed of materials including but not limited to aluminum, stainless steel, other metallic materials, composite materials, or other similar materials. In the embodiments illustrated in FIGS. 1, 5-7, and 27-30, the upper structure 86 has a substantially trapezoidal shape that is configured to generally conform to the shape of a passenger's lumbar region. However, one of ordinary skill in the relevant art will understand that any suitable size and shape of the upper structure 86 may be used to provide support for a passenger's back. The upper structure 86 may include an aperture 92 to reduce the weight of the lumbar mechanism 18 or for other purposes. The upper structure 86 may also include flared sides 94 that may be angled in a forward direction to provide a curvature to the upper structure 86. An upper edge 96 of the upper structure 86 is pivotally coupled to the seat back 12. The particular coupling location along the seat back 12 may vary depending on the size and configuration of the upper structure 86.

A lower edge 98 of the upper structure 86 is pivotally coupled to an upper edge 100 of the connector 88. The connector 88 comprises tracks 202 that are slidingly coupled to the lower structure 90, where the connector 88 is configured to allow the lower structure 90 to transition vertically relative to the upper structure 86.

In some embodiments, the lower structure 90 has an arched shape comprising lower legs 102 that are configured to couple to the pan frame 26. However, one of ordinary skill in the relevant art will understand that any suitable size and shape of the lower structure 90 may be used to provide support for a passenger's back and/or structural support for the upper structure 86. In some embodiments, the lower legs 102 are pivotally coupled to the pair of arches 104 that are configured to pass over the torsion bar 76, so that the lower structure 90 is not coupled to the torsion bar 76, but also does not interfere with the operation or configuration of the coupling between the seat back 12 and the seat pan assembly 14. In other embodiments, the lower legs 102 may be pivotally coupled directly to the pan frame 26 or the seat pan 24.

In the embodiment shown in FIGS. 1, 5-7, and 23-26, the arches 104 form part of a coupling structure 106 and are rigidly coupled to a support bar 110. In this embodiment, the coupling structure 106 may further comprise a pair of arms 108 that extend in a forward direction from the support bar 110. The arms 108 are configured to rigidly couple to an aft end 112 of the seat pan 24. In the embodiment shown in FIGS. 27-39 and 45-47, the arches 104 are coupled directly to the aft end 112 of the seat pan 24 without a coupling structure 106, support bar 110, or arms 108. However, one of ordinary skill in the relevant art will understand that any suitable coupling arrangement may be used between the upper structure 86, the lower structure 90, and the seat pan assembly 14 that will allow the lumbar mechanism 18 to provide the desired support in the various positions of the passenger seat 10.

In some embodiments, at least one track 16 is coupled to the seat frame 20 and is configured to receive the pivot bar 32 and provide structural support for the seat pan assembly 14. In these embodiments, as best illustrated in FIGS. 15-26, the track 16 includes the reclining path 116 and a sleeper path 118. The pivot bar 32 is directed into a particular path via a diverter 124, where the diverter 124 is configured to rotate between a position substantially blocking an opening to the reclining path 116, also known as a diverter sleeper position 154 (as shown in FIGS. 17, 21, 22, 25, and 26) and a position substantially blocking an opening to the sleeper path 118, also known as a diverter reclining position 156 (as shown in FIGS. 15, 16, 19, 20, 23, and 24).

Figure 15:
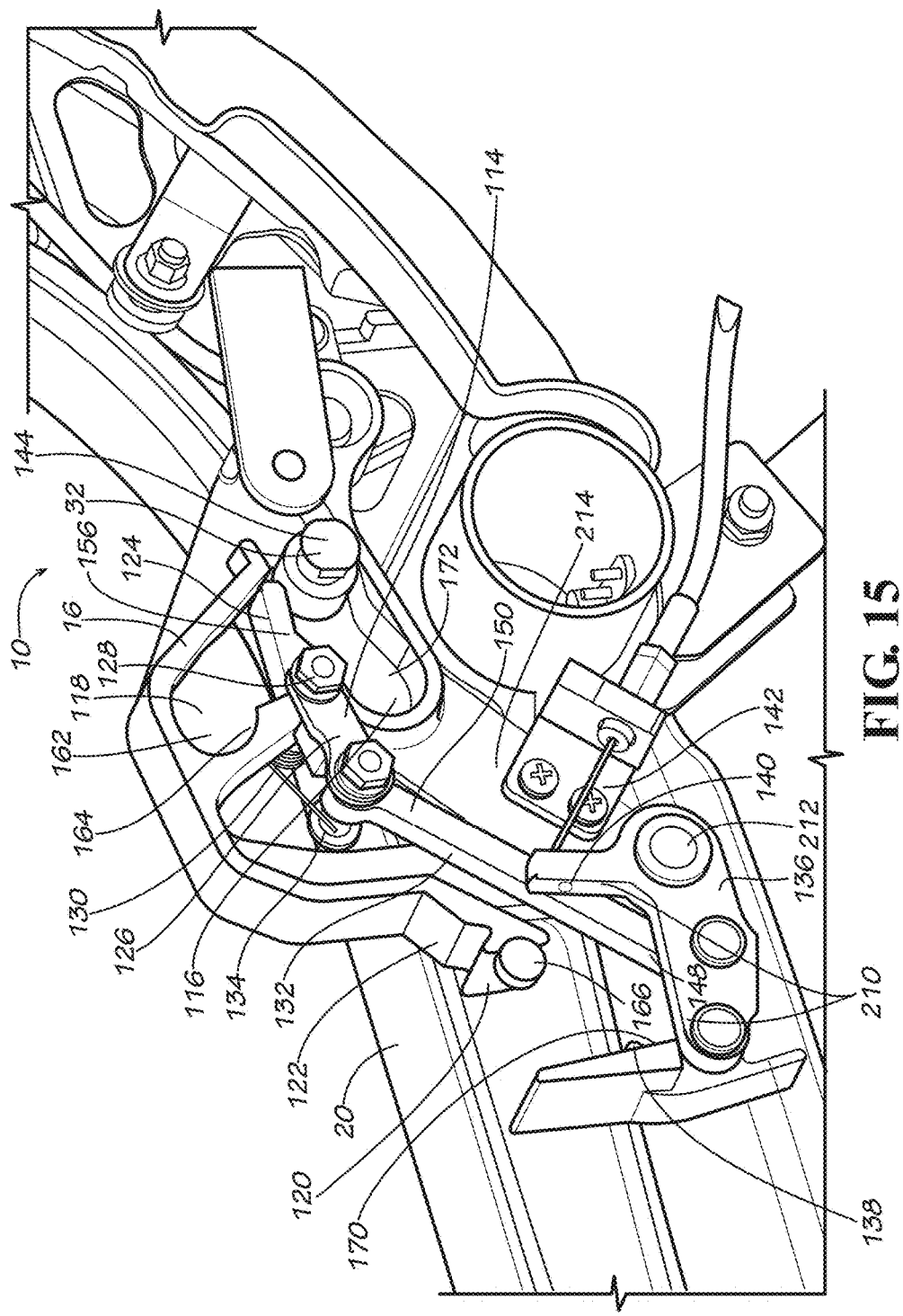
FIG. 15 is a partial perspective view of certain embodiments of a track for the passenger seat of FIG. 1, where the passenger seat is in an upright position and a diverter is in a diverter reclining position.
Figure 16:
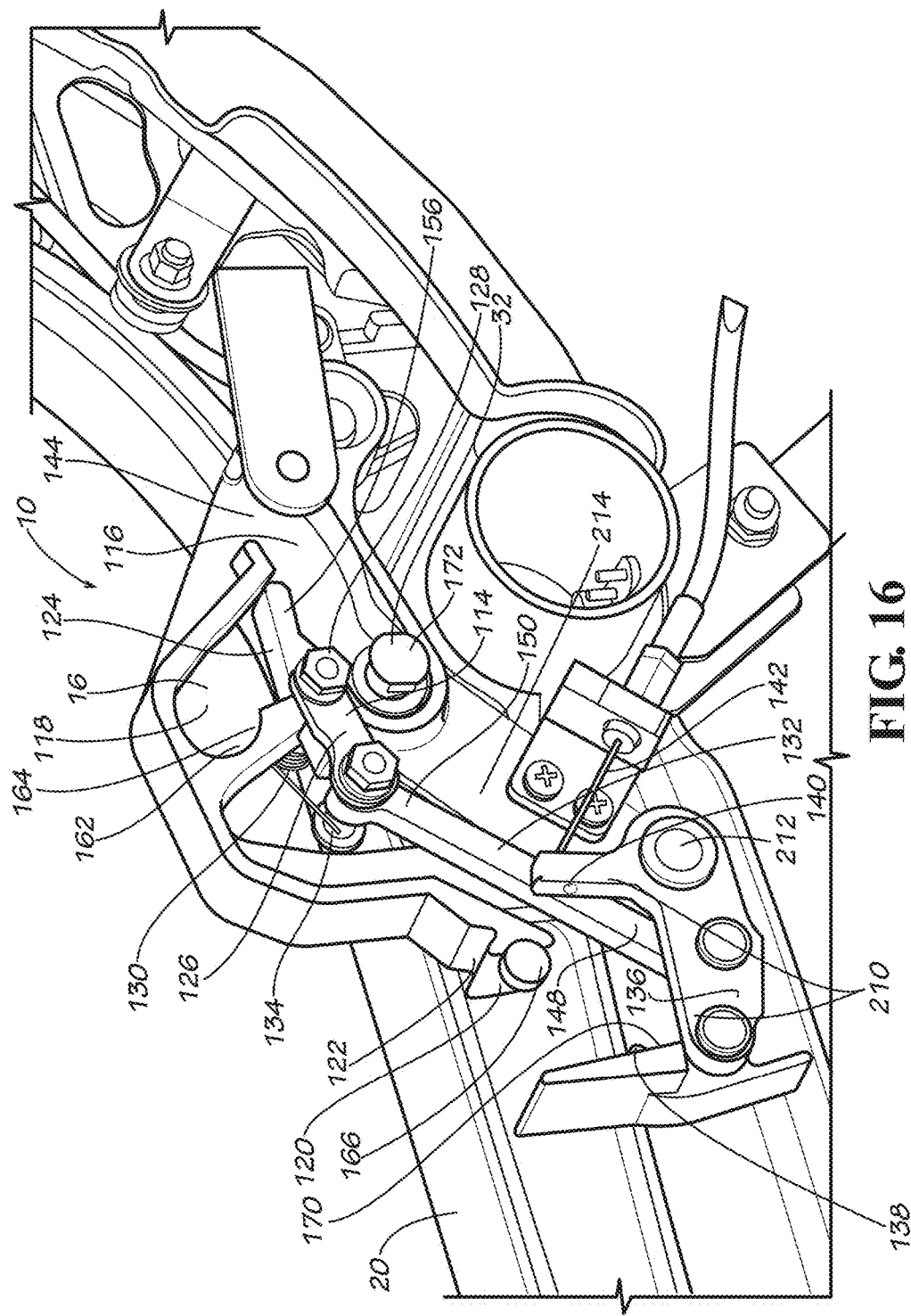
FIG. 16 is a partial perspective view of the track of FIG. 15, where the passenger seat is in a reclining position and a diverter is in a diverter reclining position.
Figure 19:
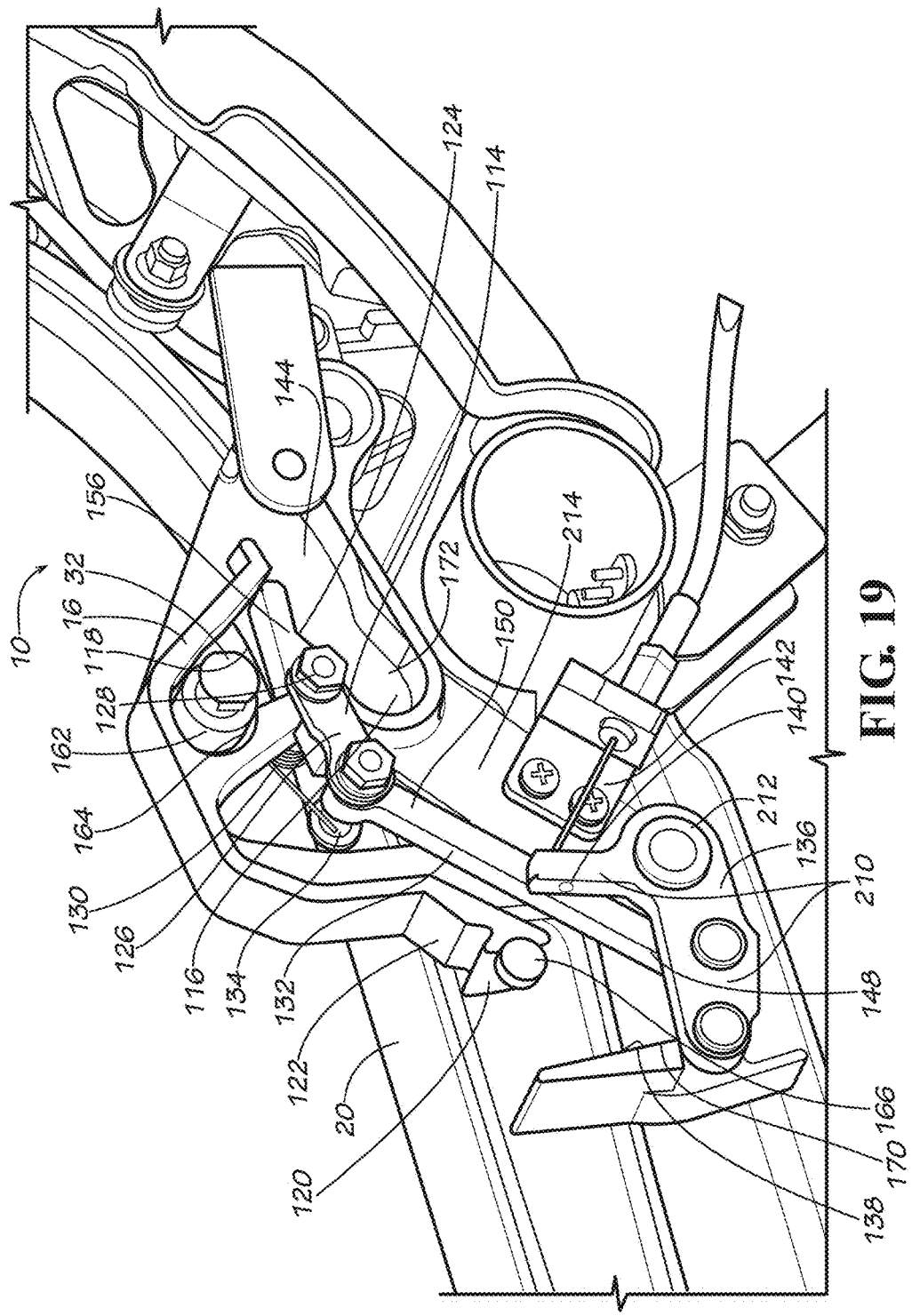
FIG. 19 is a partial perspective view of the track of FIG. 15, where the passenger seat is in a sleeper position and a diverter is in a diverter reclining position.

A first arm 126 is coupled at one end to the diverter 124 and extends in a direction generally opposing the diverter 124. The diverter 124 and the first arm 126 are pivotally coupled to the track 16 via a fastener 128. The fastener 128 may be any suitable mechanical fastener including but not limited to screws, bolts, rivets, or other suitable mechanical fastening devices. In some embodiments, as shown in FIGS. 15, 16, and 19, a torsion spring 130 is also coupled to an end of the fastener 128.

In the embodiments shown in FIGS. 15-26, the first arm 126 is pivotally coupled at an opposing end to a second arm 132. In some embodiments, as shown in FIGS. 15-22, the first arm 126 is coupled to the second arm 132 adjacent an extension 134, wherein the torsion spring 130 may also be coupled to the extension 134.

Figure 20:
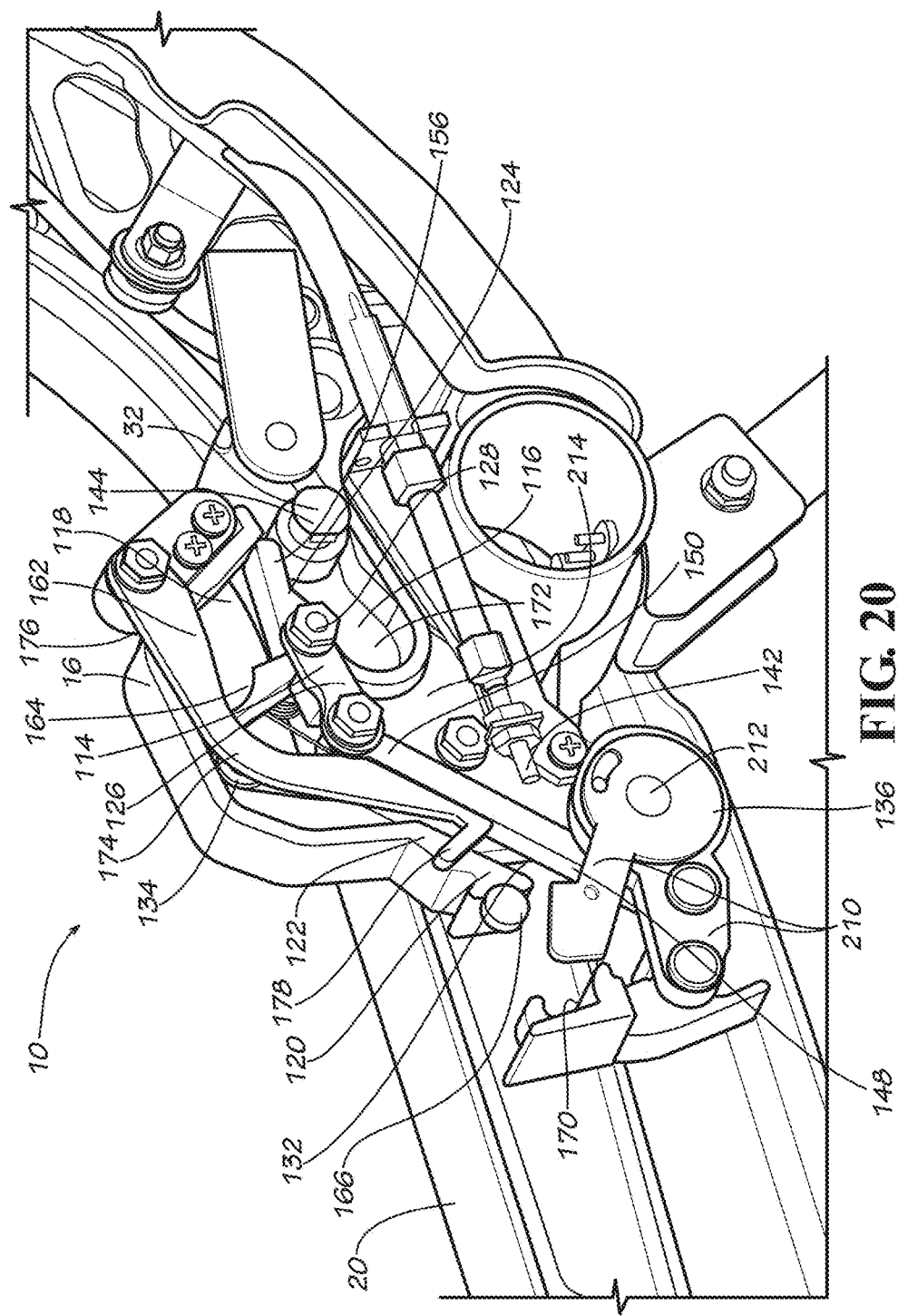
FIG. 20 is partial perspective view of other embodiments of a track for the passenger seat of FIG. 1, where the passenger seat is in an upright position and a diverter is in a diverter reclining position.
Figure 21:
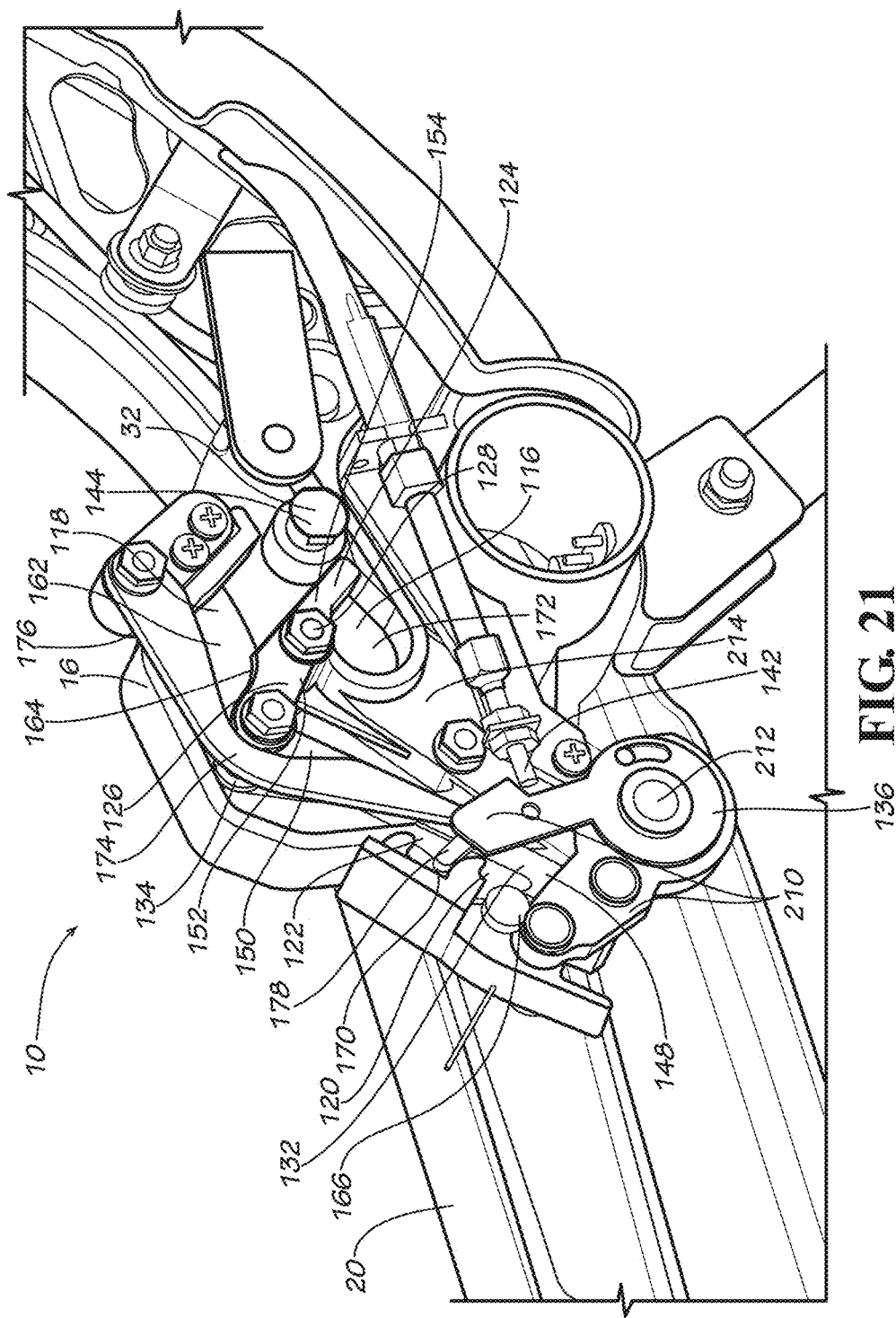
FIG. 21 is a partial perspective view of the track of FIG. 20, where the passenger seat is in an upright position and a diverter is in a diverter sleeper position.
Figure 22:
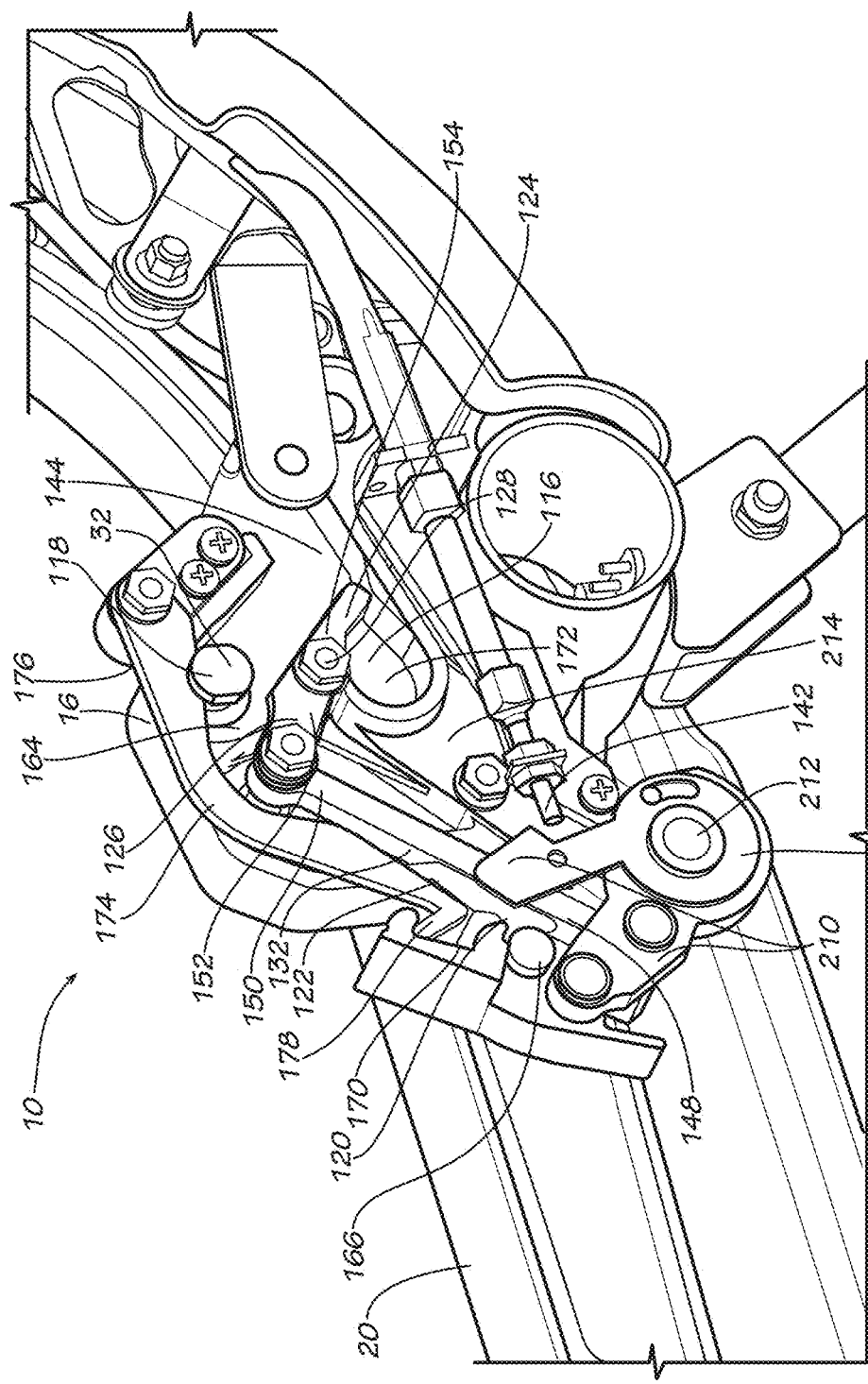
FIG. 22 is a partial perspective view of the track of FIG. 20, where the passenger seat is in a sleeper position and a diverter is in a diverter sleeper position.

An opposing end of the second arm 132 is coupled to a lever 136, so that the first arm 126 and the second arm 132 form a linkage coupling the lever 136 to the diverter 124. The lever 136 may comprise at least two legs 210 that extend outwardly from a pivot location 212. The legs 210 may be integrally formed as a single piece or may comprise a plurality of coupled components. For example, in the embodiments shown in FIGS. 15-19 and 23-26, the lever 136 comprises two legs 210 that extend from the pivot location 212 at an angle of approximately 90 degrees so as to form a substantially "L" shaped bracket. In other embodiments, as shown in FIGS. 20-22, the two legs 210 extend from the pivot location 212 at an angle of less than 90 degrees. One of ordinary skill in the relevant art will understand that any suitable number and spacing of legs 210 may be used to achieve the desired lever design. In these embodiments, the lever 136 is pivotally coupled via the pivot location 212 to an extension 214 of the track 16.

In some embodiments, as shown in FIGS. 15-26, the lever 136 may also include a cable receptacle 140. In the embodiments illustrated in FIGS. 15-22, the cable receptacle 140 comprises an aperture in one of the legs 210 that is shaped to receive a first end of a cable 142. In other embodiments illustrated in FIGS. 23-26, the cable receptacle 140 comprises an aperture in one of the legs 210 that is pivotally coupled to a cable connector 216, wherein the cable connector 216 is in turn coupled to the first end of the cable 142.

Figure 2:
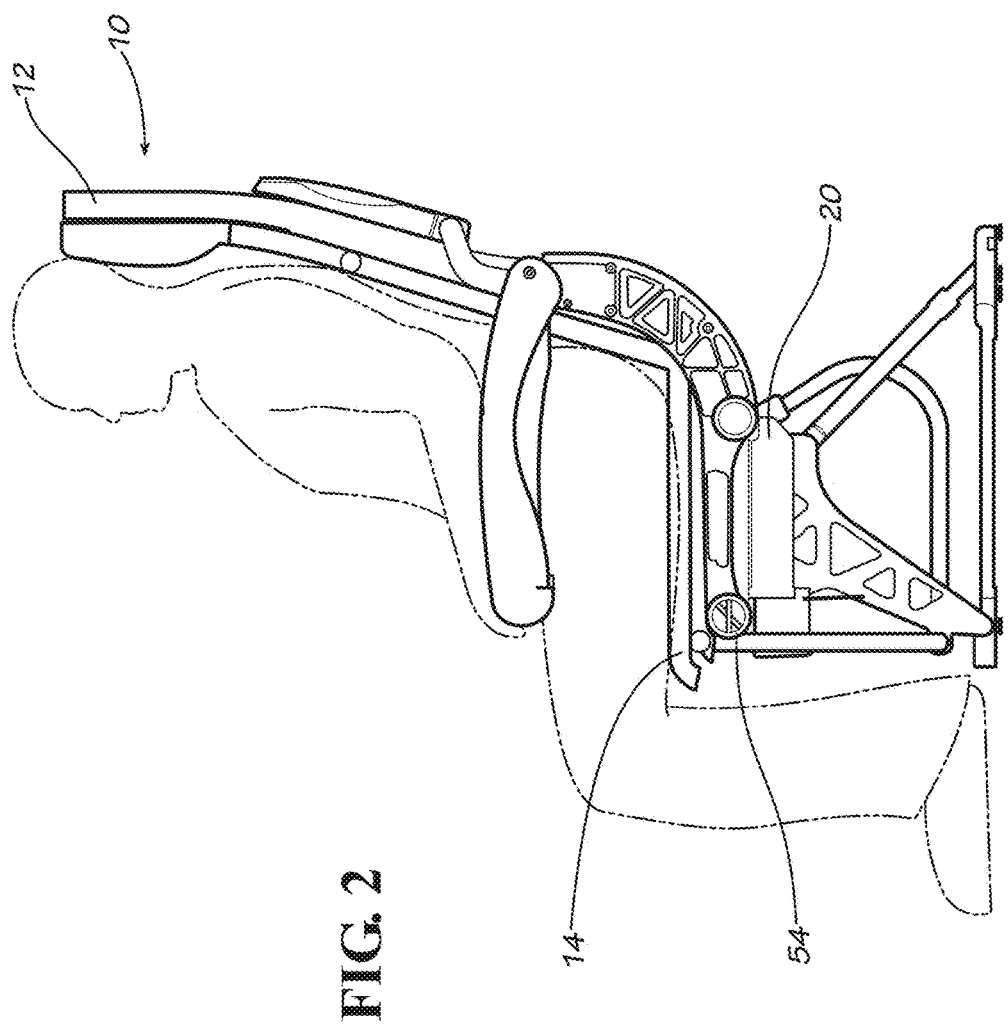
FIG. 2 is a general side view of the passenger seats of FIGS. 1 and 22 in an upright position.
Figure 4:
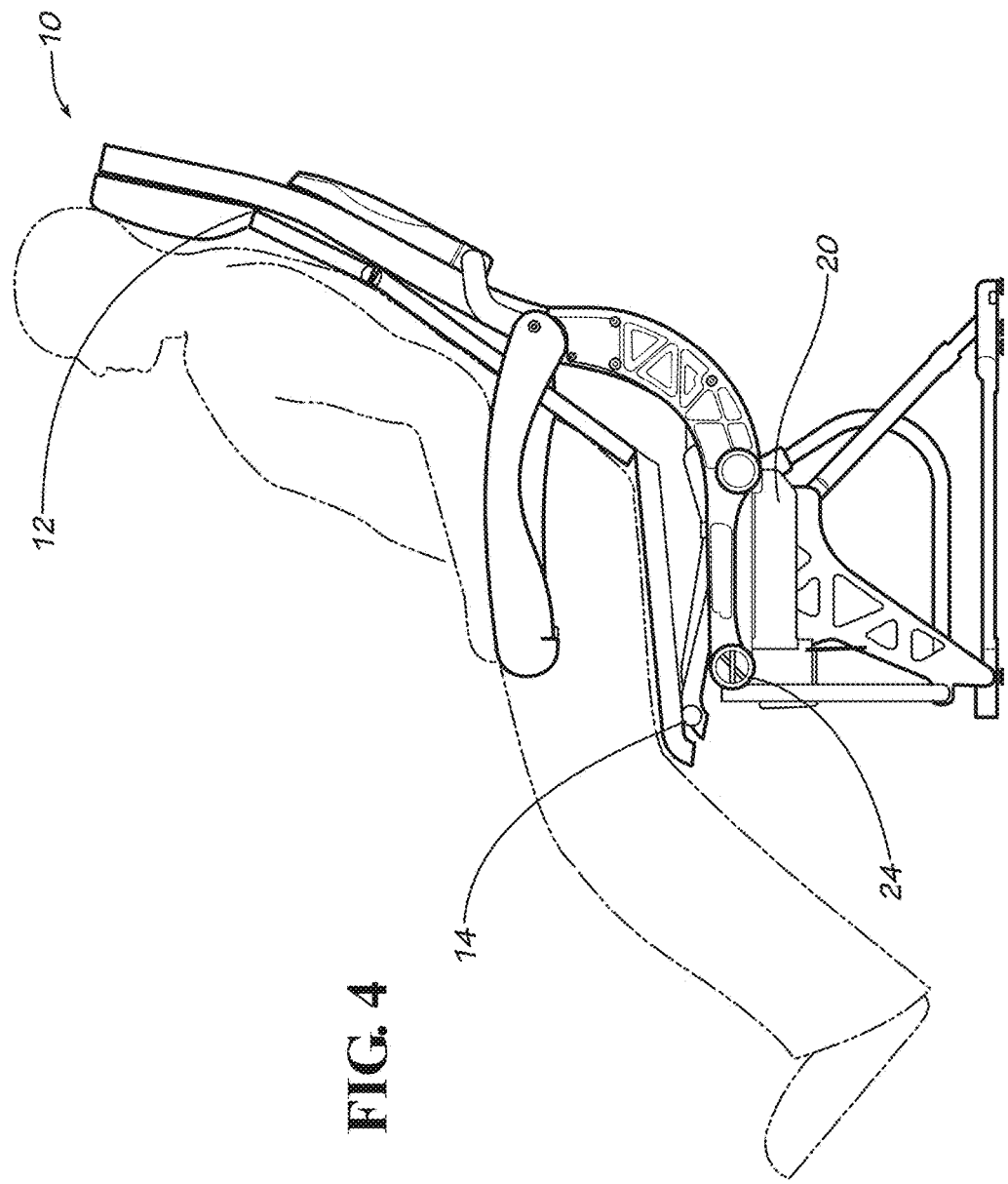
FIG. 4 is a general side view of the passenger seats of FIGS. 1 and 22 in an sleeper position.
Figure 5:
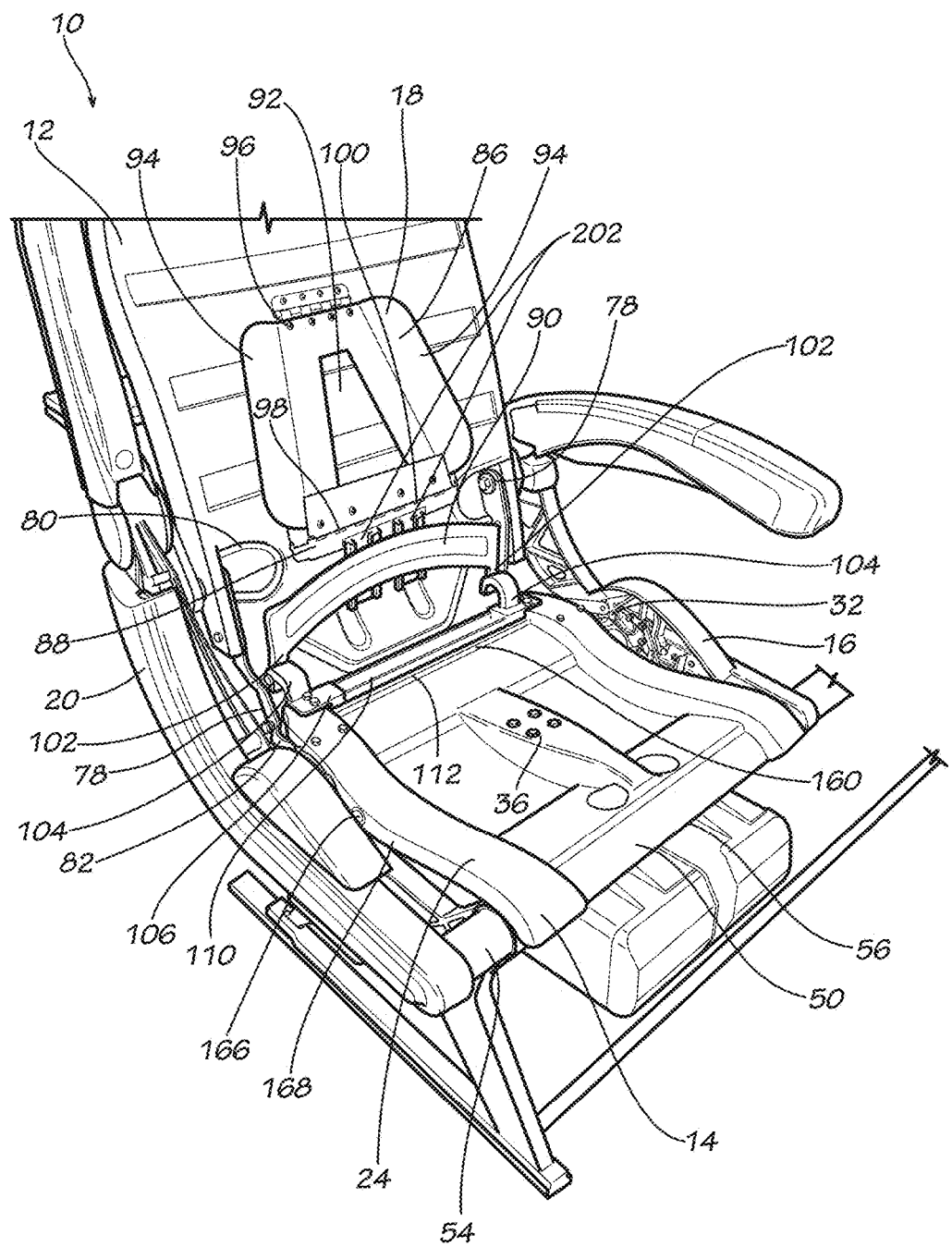
FIG. 5 is a partial perspective view of the passenger seat of FIG. 1 in an upright position.
Figure 7:
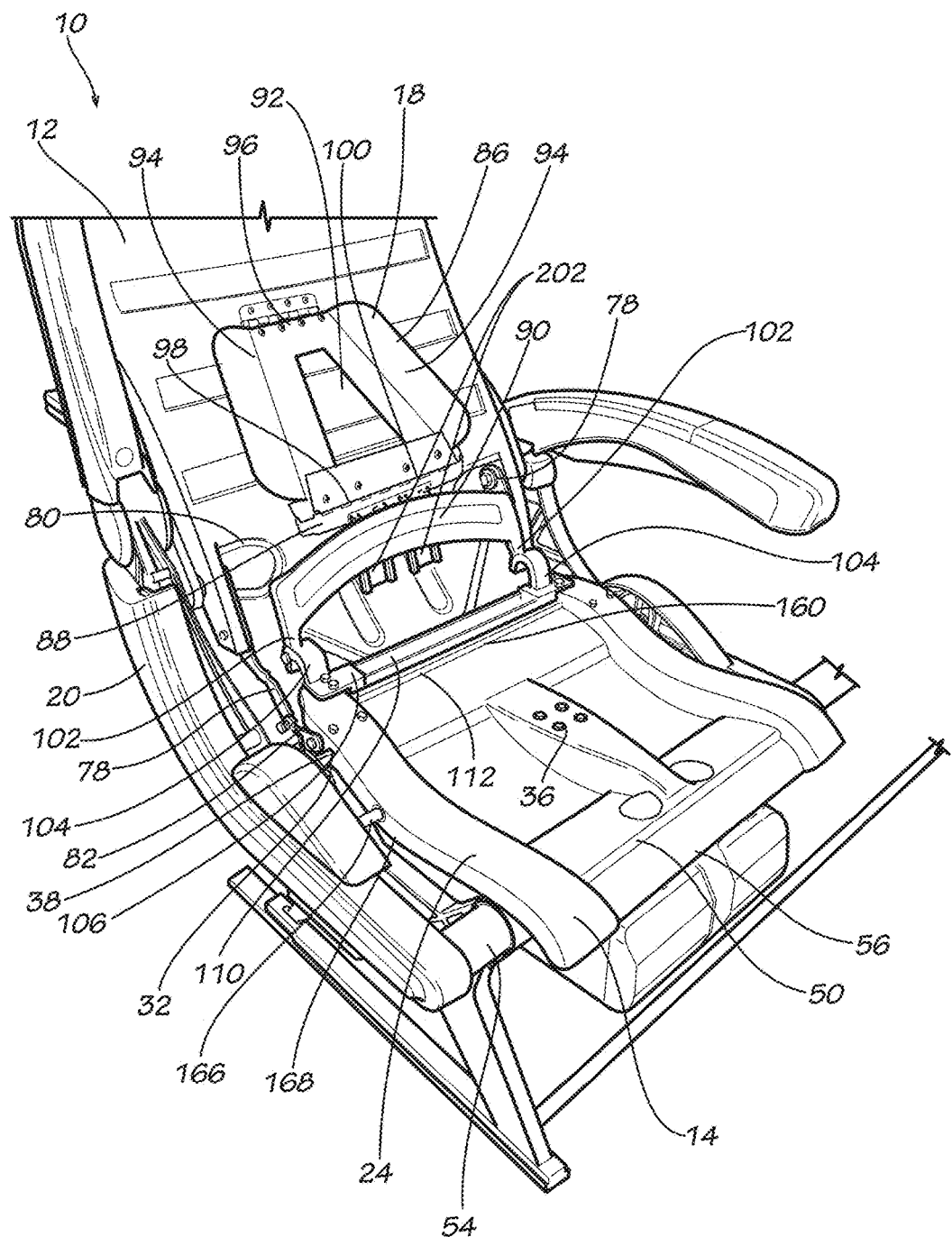
FIG. 7 is a partial perspective view of the passenger seat of FIG. 1 in a sleeper position.
Figure 8:
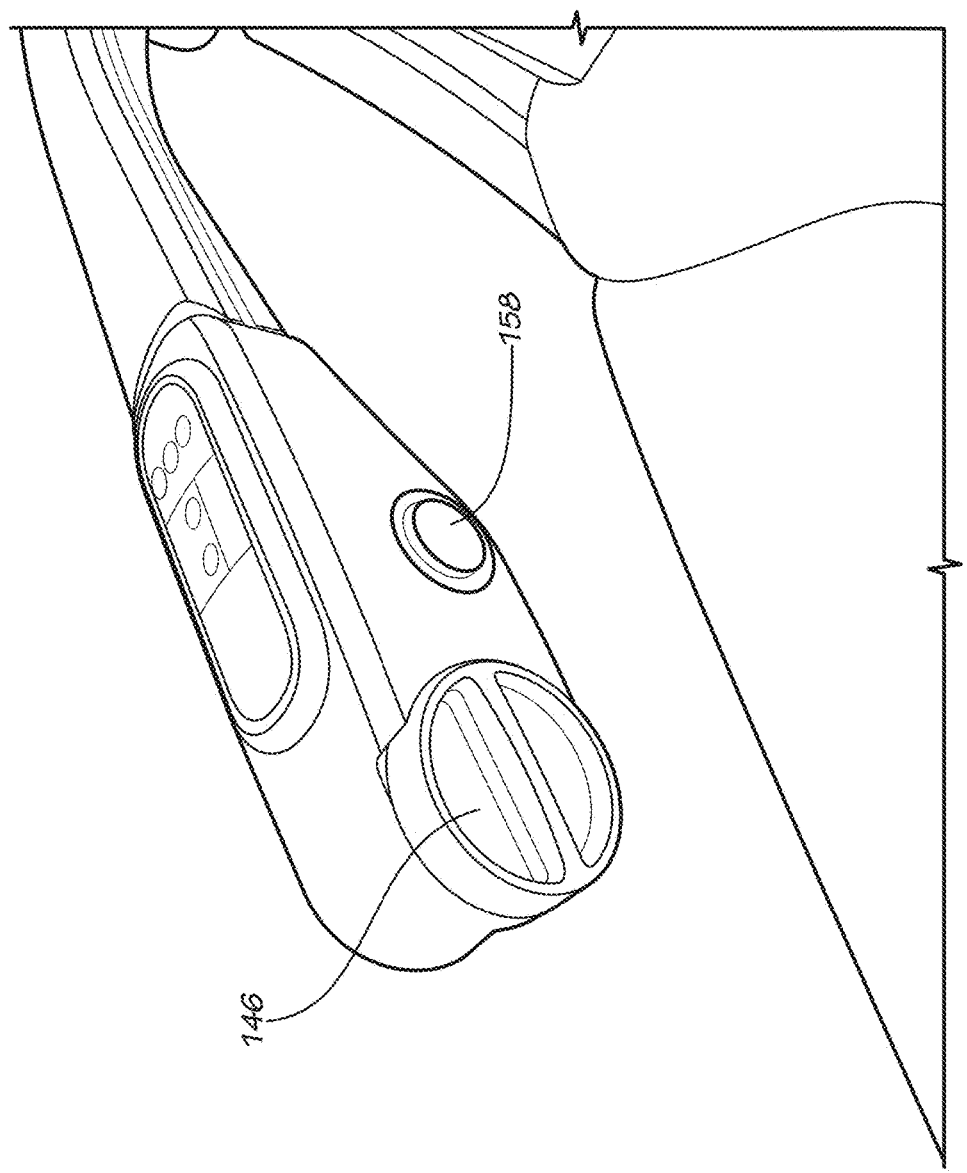
FIG. 8 is a perspective view of certain embodiments of a control panel for the passenger seat of FIG. 1.
Figure 9:
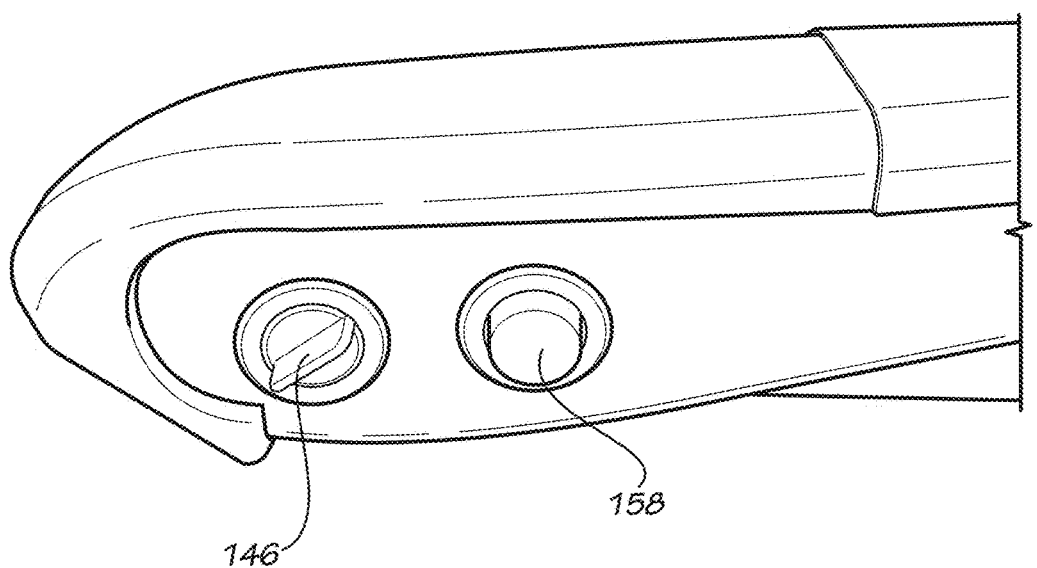
FIG. 9 is a perspective view of other embodiments of a control panel for the passenger seat of FIG. 1.
Figure 10:
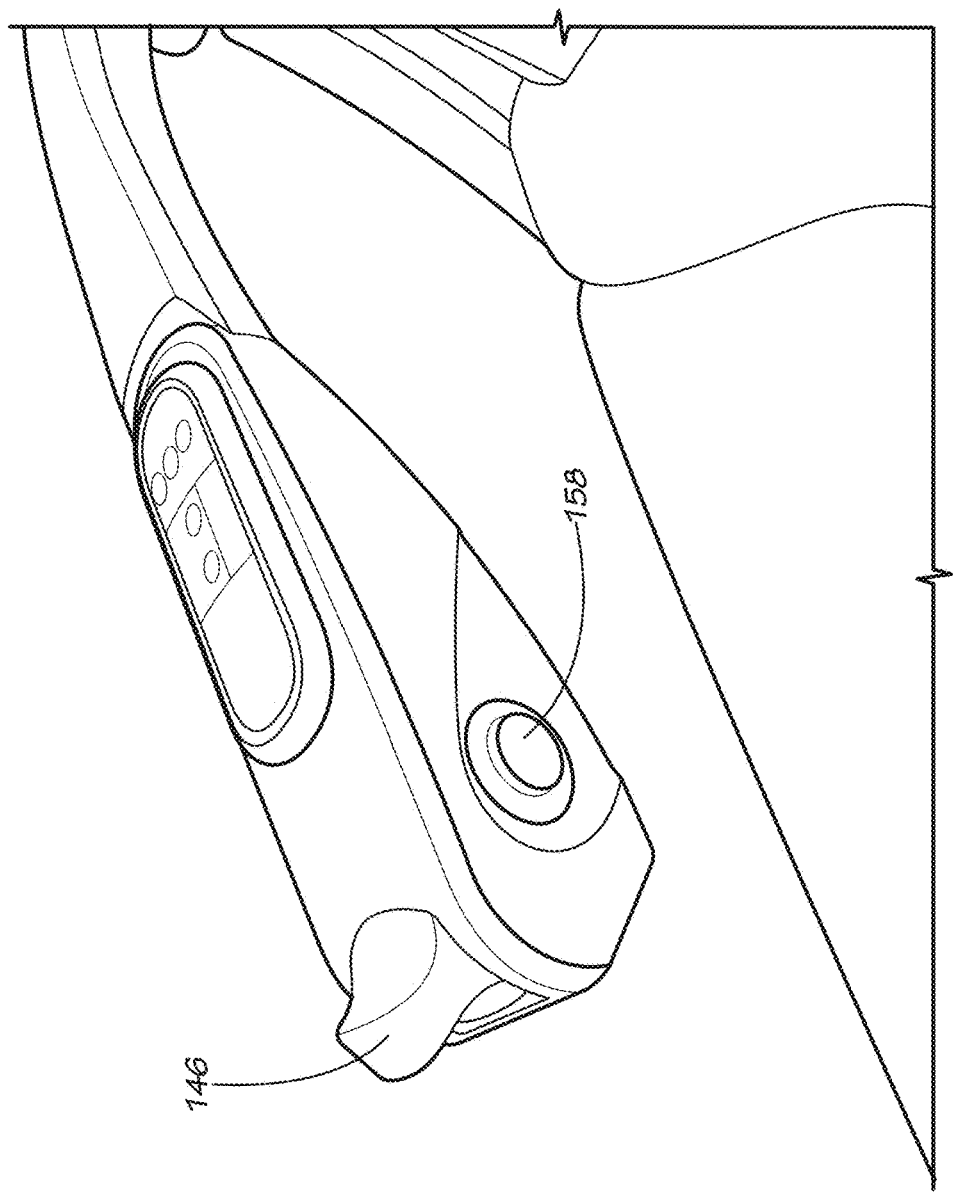
FIG. 10 is a perspective view of yet other embodiments of a control panel for the passenger seat of FIG. 1.
Figure 11:
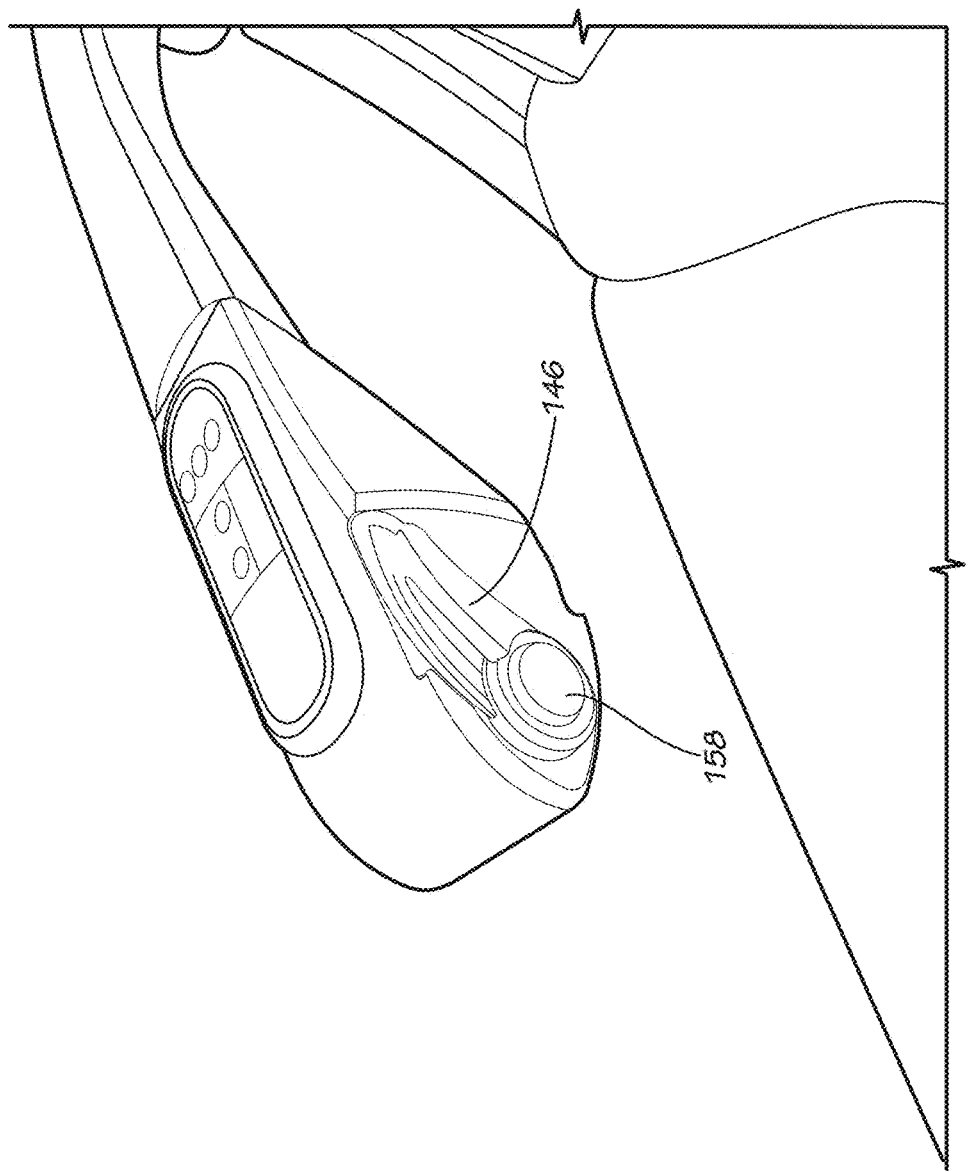
FIG. 11 is a perspective view of yet other embodiments of a control panel for the passenger seat of FIG. 1.
Figure 12:
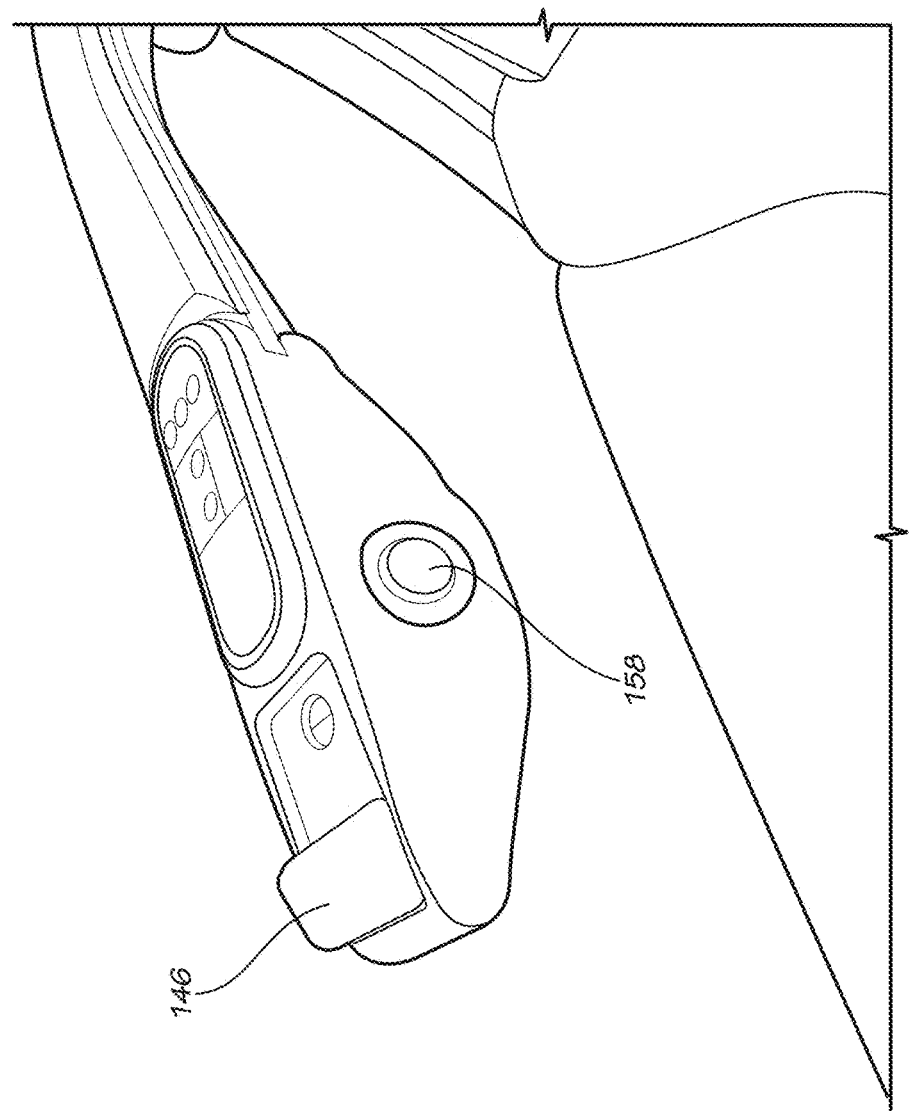
FIG. 12 is a perspective view of yet other embodiments of a control panel for the passenger seat of FIG. 1.
Figure 13:
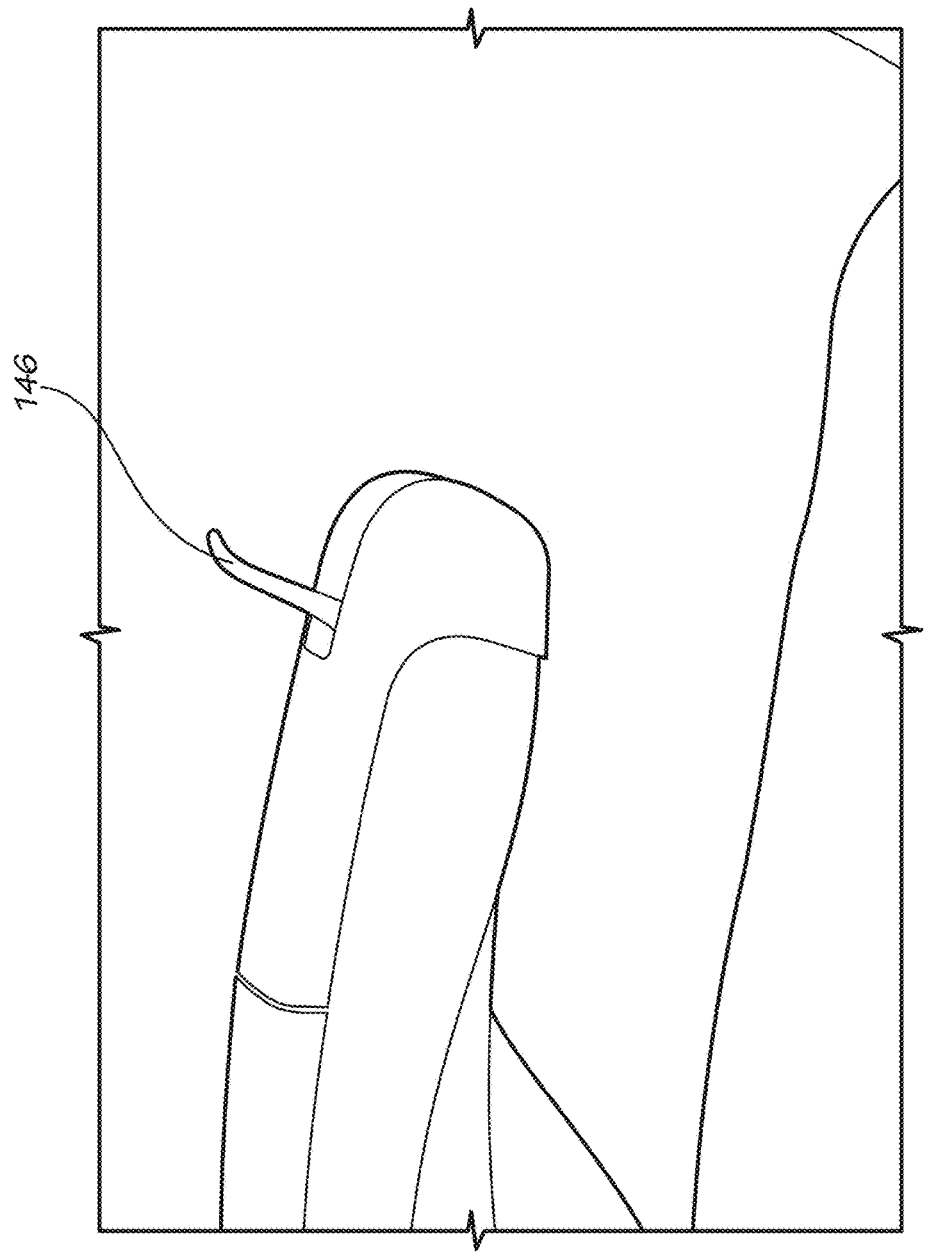
FIG. 13 is a perspective view of yet other embodiments of a control panel for the passenger seat of FIG. 1.
Figure 14:
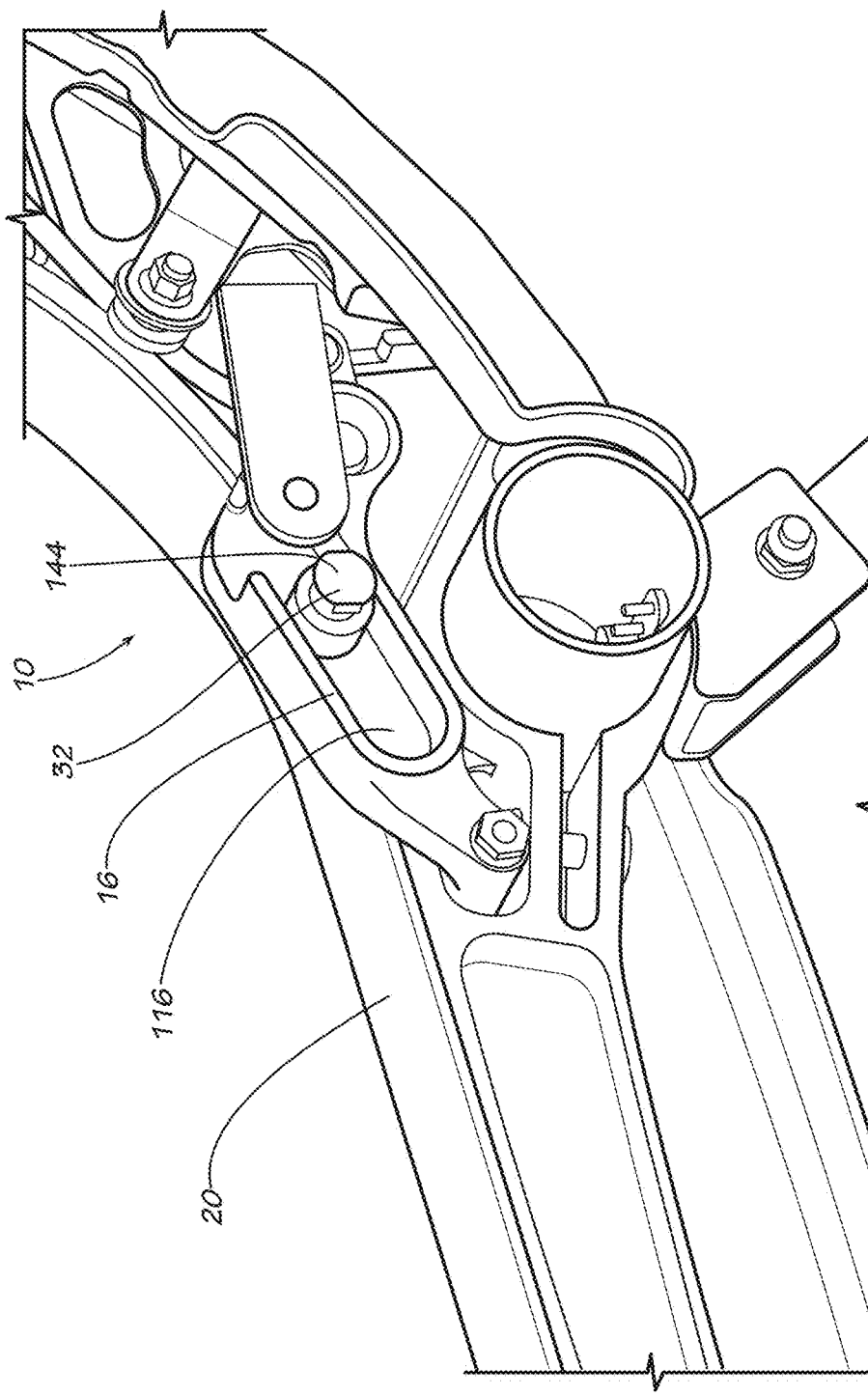
FIG. 14 is a partial perspective view of a conventional track for a passenger seat, where the passenger seat is in an upright position.
Figure 17:
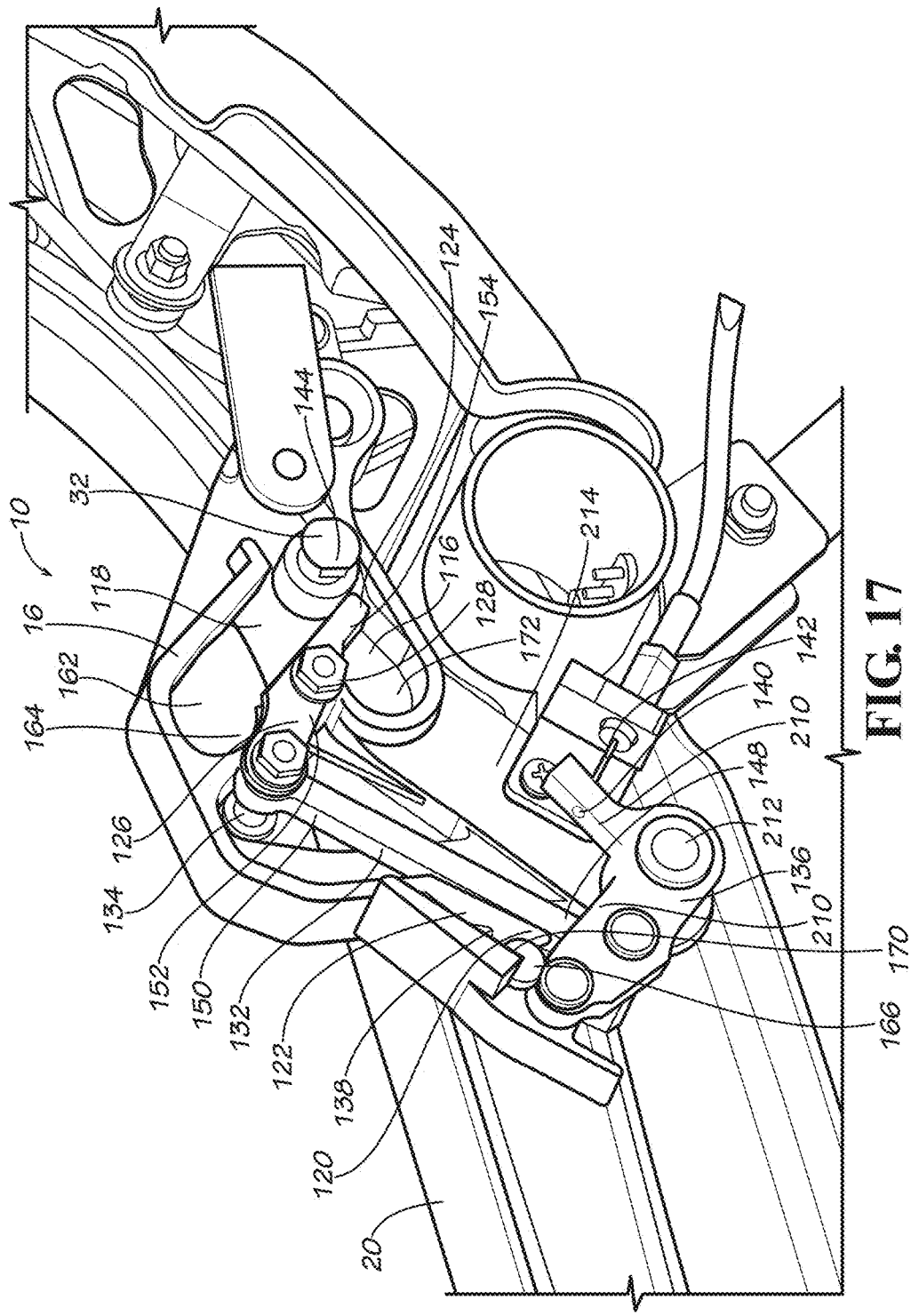
FIG. 17 is a partial perspective view of the track of FIG. 15, where the passenger seat is in an upright position and a diverter is in a diverter sleeper position.
Figure 18:
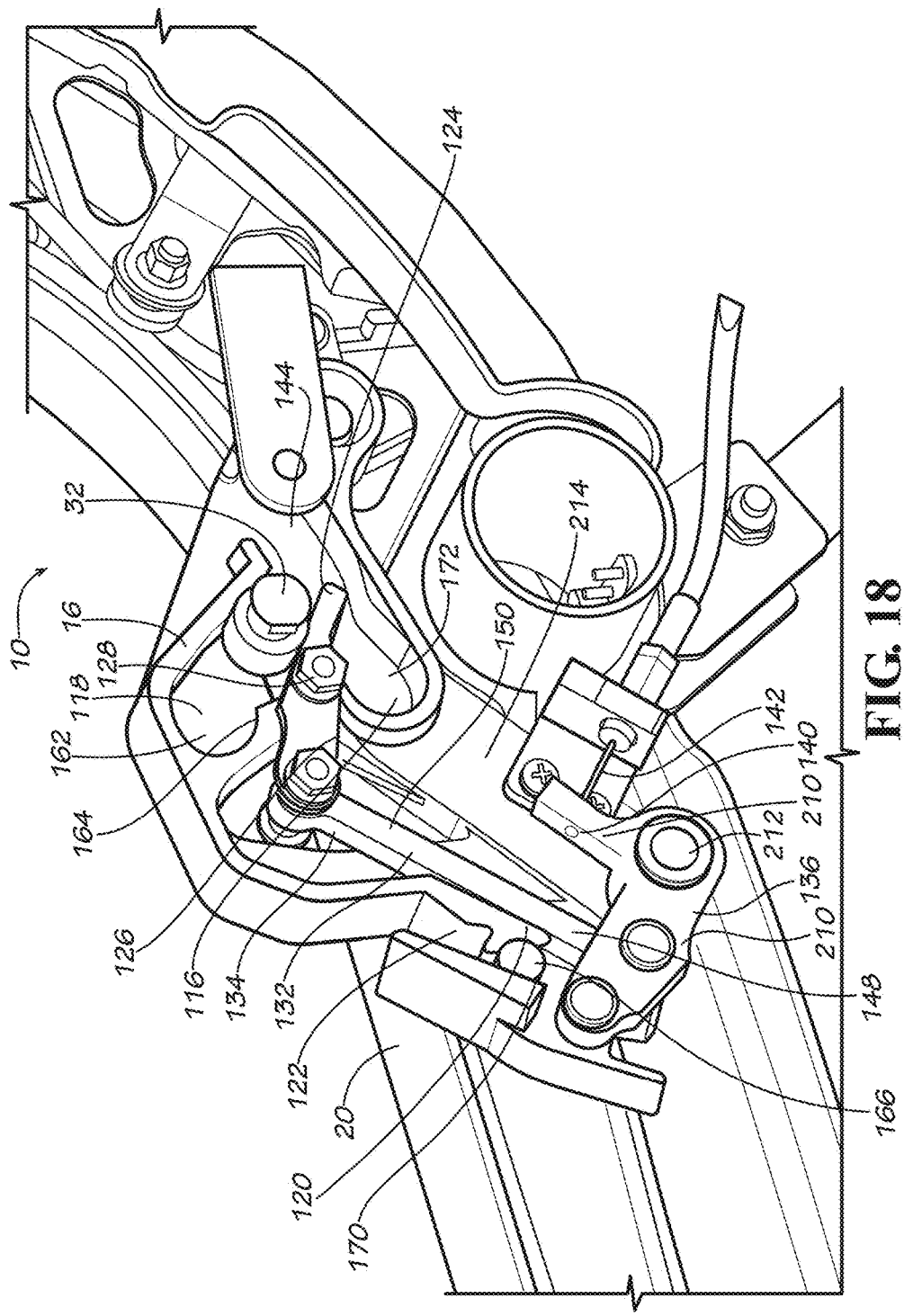
FIG. 18 is a partial perspective view of the track of FIG. 15, where the passenger seat is transitioning to a sleeper position and a diverter is transitioning to a diverter reclining position.
Figure 23:
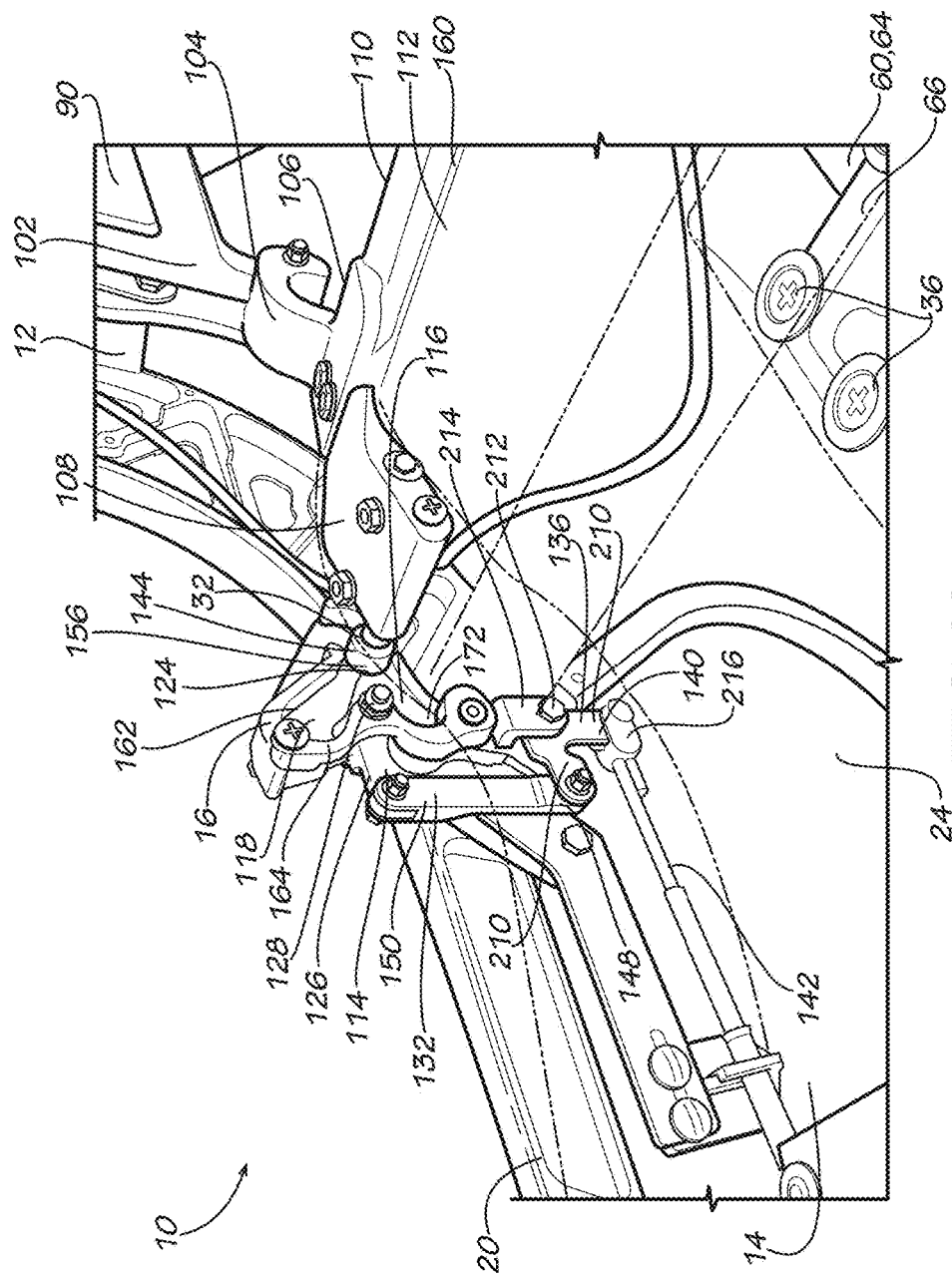
FIG. 23 is a partial perspective view of other embodiments of a track for the passenger seat of FIG. 1, where the passenger seat is in an upright position and a diverter is in a diverter reclining position.
Figure 25:
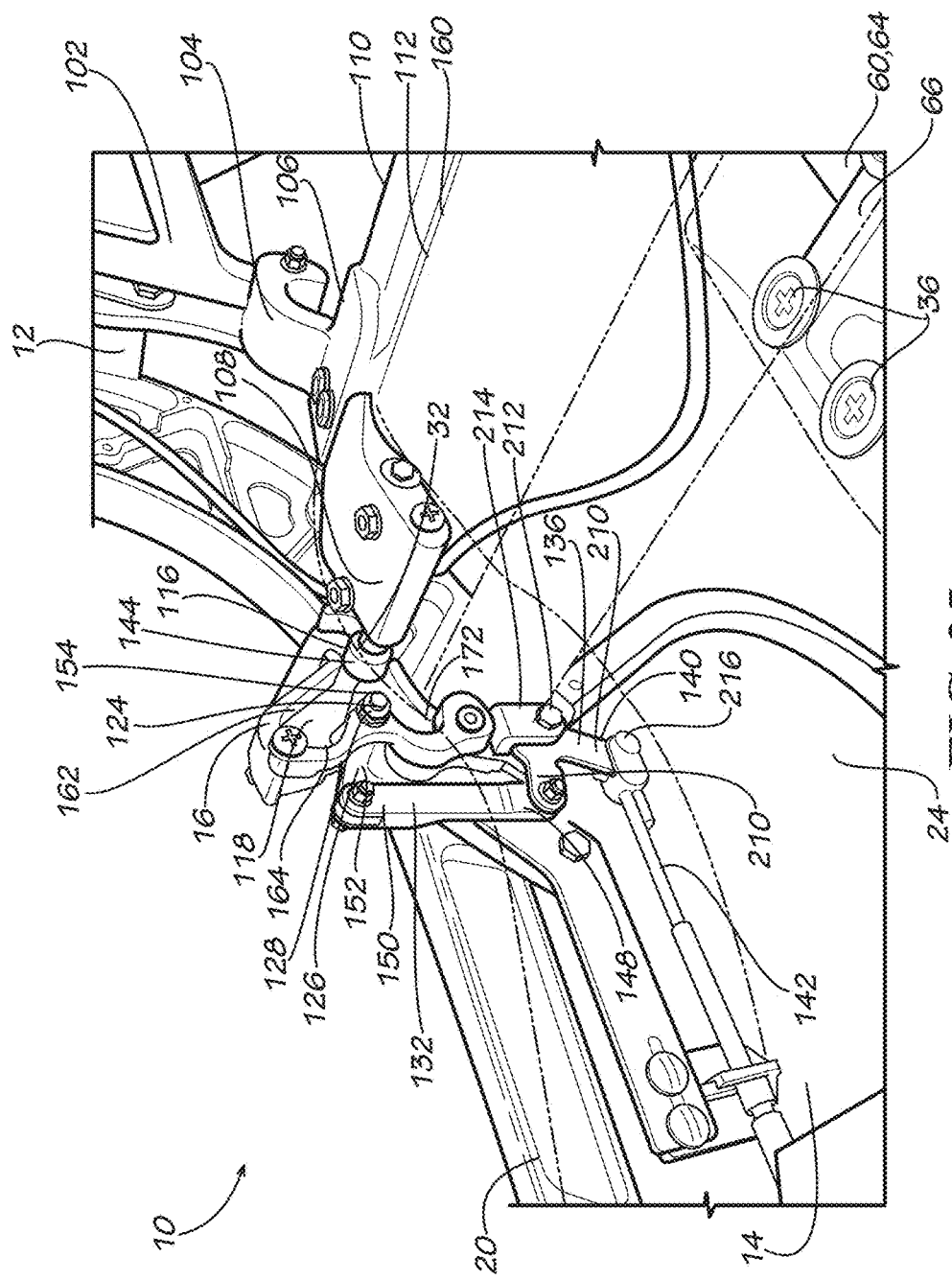
FIG. 25 is a partial perspective view of the track of FIG. 23, where the passenger seat is in an upright position and a diverter is in a diverter sleeper position.

When a passenger desires to transition the passenger seat 10 to a sleeper position (as shown in FIGS. 4 and 7), the passenger seat 10 is placed in an upright position (as shown in FIGS. 1, 2, and 5) where the pivot bar 32 is located in an aft-most position 144 on the track 16 (as shown in FIGS. 15, 20, and 23). The passenger then actuates a sleeper selection control 146 to retract the cable 142, which causes the lever 136 to rotate in an aft direction (as shown in FIGS. 17, 21, and 25). The sleeper selection control 146 may include a knob (as shown in FIGS. 8-9), a lever (as shown in FIG. 10), a side lever (as shown in FIG. 11), a slide (as shown in FIG. 12), a latch (as shown in FIG. 13), a button similar to a reclining mechanism control 158 (as shown in FIG. 1), or other similar control devices.

The rotation of the lever 136 causes a lower end 148 of the second arm 132 to rotate in an upward and/or aft direction, in turn causing an upper end 150 of the second arm 132 to rotate in an upward and/or forward direction. Because the upper end 150 of the second arm 132 is pivotally coupled to the first arm 126, the movement of the upper end 150 of the second arm 132 causes the first arm 126 to rotate in an upward and/or aft direction until the first arm 126 is oriented in a substantially vertical position 152. The upward and/or aft rotation of the first arm 126 induces a downward and/or forward rotation of the diverter 124 until the diverter 124 reaches the diverter sleeper position 154, which substantially blocks the opening to the reclining path 116, as shown in FIGS. 17, 21, and 25.

One of ordinary skill in the relevant art will understand that any suitable mechanism may be used to rotate the diverter 124 from the diverter reclining position 156 into the diverter sleeper position 154 and transition the pivot bar 32 from the reclining path 116 to the sleeper path 118. For example, as described above and as illustrated in FIGS. 15-26, a cable arrangement may be employed between the sleeper selection control 146 and the lever 136. In these embodiments, the cable 142 is pulled to rotate the diverter 124 into the diverter sleeper position 154 as described above.

In certain embodiments, as illustrated in FIGS. 23-26, a push/pull-type cable arrangement may be used to apply a pulling force to the lever 136 to rotate the diverter 124 into the diverter sleeper position 154, as well as to apply a pushing force to the lever 136 to return the diverter 124 to the diverter reclining position 156. For example, as shown in FIGS. 23-26, the cable connector 216 may be configured to couple the first end of the cable 142 to the lever 136 when the cable 142 is both pulled away from the lever 136, as well as pushed toward the lever 136. The cable 142 may also include a sufficiently rigid structure, such as a telescoping configuration, that allows a pushing force from the sleeper selection control 146 to be transferred to the lever 136.

In these embodiments, the sleeper selection control 146 is coupled to a second end of the cable 142 and is configured to apply a pulling force to the cable 142 when the switch is actuated in one direction and apply a pushing force to the cable 142 when the switch is actuated in the opposite direction. When the cable 142 is pulled by the sleeper selection control 146, the lever 136 rotates in an aft direction (and thereby rotates the diverter 124 into the diverter sleeper position 154). When the cable 142 is pushed by the sleeper selection control 146, the lever 136 rotates in a forward direction (and thereby rotates the diverter 124 into the diverter reclining position 156). In these embodiments, because of the push/pull cable design, manipulation of the sleeper selection control 146 directly controls the position of the diverter 124, which eliminates the need for other mechanisms to return the diverter 124 to the diverter reclining position 156.

In certain embodiments, a pull-type cable arrangement may be configured to apply a pulling force to the lever 136, without being configured to apply a pushing force to the lever 136 to return the diverter 124 to the diverter reclining position 156. For example, in these embodiments, the cable 142 may be formed of a material having sufficient pulling strength to apply a pulling force to the lever 136, but may lack sufficient rigidity to also apply a pushing force to the lever 136.

In these embodiments, an additional mechanism may be required to return the diverter 124 to the diverter reclining position 156. For example, as shown in FIGS. 15-22, the lever 136 may also include a hook 138, and the track 16 may also include a hook 120 on a forward side 122, wherein the hooks 120, 138 may be engaged with one another to hold the diverter 124 in the diverter sleeper position 154 until a release mechanism is activated to disengage the hooks 120, 138. Specifically, the aft-rotation of the lever 136 causes the hook 138 to also rotate in an aft direction until the hook 138 contacts and mates with the hook 120 on the track 16. In these embodiments, when the first arm 126 is in the substantially vertical position 152, the torsion spring 130 may also exert a force on the first arm 126. The mating between the hooks 120, 138 prevents the first arm 126 from rotating back to a substantially horizontal position 114 and, thus, maintains the diverter 124 in the diverter sleeper position 154 until the hooks 120, 138 are disengaged.

Figure 26:
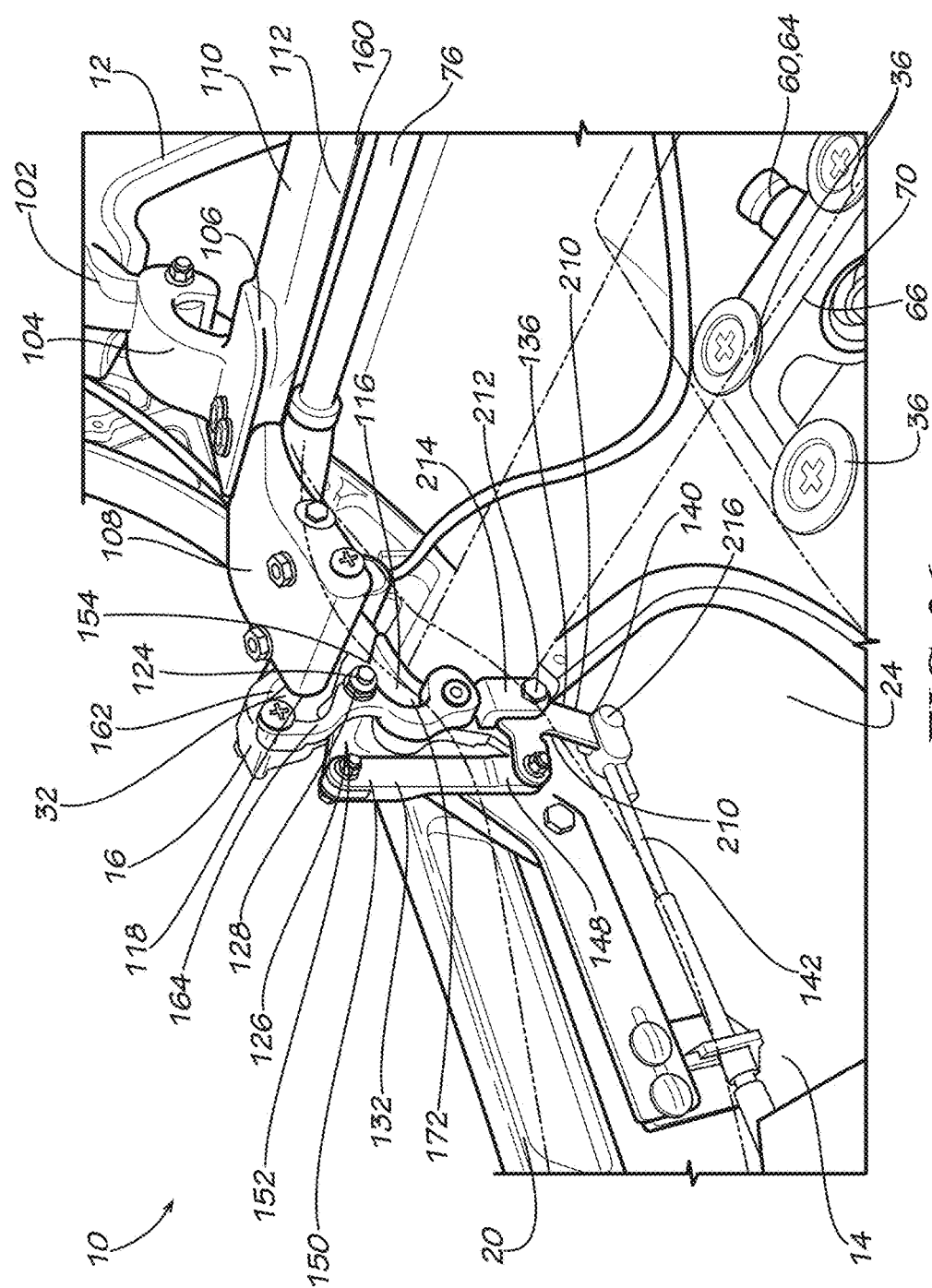
FIG. 26 is a partial perspective view of the track of FIG. 23, where the passenger seat is in a sleeper position and a diverter is in a diverter sleeper position.

As shown in the embodiments depicted in FIGS. 17-19, 21-22, and 25-26, once the diverter 124 is in the diverter sleeper position 154, the passenger actuates a reclining mechanism control 158 that causes the reclining mechanism 60 to transition the seat pan assembly 14 into the sleeper position (as shown in FIGS. 4 and 7). As part of this transition, the reclining mechanism 60 exerts a force on the seat pan assembly 14, which adjusts a forward position of the seat pan assembly 14 and a rotated position of the aft end 160 of the seat pan assembly 14 as the pivot bar 32 slides along the sleeper path 118. When the pivot bar 32 reaches the upper end 162 of the sleeper path 118 (as shown in FIGS. 19, 22, and 26), the pivot bar 32 may be retained in that position via a recess 164 at the top of the sleeper path 118 and the reclining mechanism 60.

As the aft end 160 of the seat pan assembly 14 travels to the upper end 162 of the sleeper path 118 (as shown in FIGS. 19, 22, and 26), the coupling between the seat pan assembly 14 and the seat back 12 causes the seat back 12 to pivot to the reclining position, and the coupling between the seat back 12, the seat pan 24, and the lumbar mechanism 18 causes the lower edge 98 of the upper structure 86 to rotate forward and the lower structure 90 to slide upward on the tracks 202 to compensate for the amount of forward and upward travel of the seat pan assembly 14 and recline of the seat back 12, so that the lumbar mechanism 18 is deployed in the sleeper position (as shown in FIGS. 4 and 7). The passenger also has the option of adjusting the amount of tilt so that the passenger seat 10 may be positioned in any configuration between the fully upright position and the sleeper position.

In the embodiments that include a push/pull-type cable arrangement, as shown in FIGS. 23-26, once the pivot bar 32 has reached the upper end 162, the sleeper selection control 146 may be actuated to return the diverter 124 to the diverter reclining position 156, so that the diverter 124 is positioned below the pivot bar 32 and substantially blocks the opening to the sleeper path 118 (as shown in FIG. 19).

In the embodiments that include a pull-type cable arrangement, as shown in FIGS. 15-22, once the pivot bar 32 has reached the upper end 162, the coupling between the hooks 120, 138 is disengaged via the release mechanism so that the diverter 124 is no longer held into the diverter sleeper position 154. In these embodiments, as shown in FIGS. 15-22, the release mechanism is at least one projection 166 that is positioned on the side 168 of the seat pan 24 and travels upward until the projection 166 contacts an underside 170 of the hook 138, causing the hook 138 to disengage from the hook 120. Once the hooks 120, 138 are disengaged, the force applied by the torsion spring 130 to the first arm 126 causes the lever 136 to rotate back to its original position and the diverter 124 to rotate back to the diverter reclining position 156, as shown in FIG. 19. In this orientation, the diverter 124 is positioned below the pivot bar 32 and substantially blocks the opening to the sleeper path 118 (as shown in FIG. 19). The disengagement of the hooks 120, 138 also resets the sleeper selection control 146 by pulling the cable 142 back to its extended position.

In some embodiments, as shown in FIGS. 20-22, a kicker 174 may also be included, which is pivotally coupled to an outer surface 176 of the track 16. The kicker 174 rests against the extension 134 so that the kicker 174 pivots upward when the first arm 126 rotates upward in the aft direction. The kicker 174 includes a projection 178 that contacts the underside 170 of the hook 138 when the first arm 126 reaches the substantially vertical position 152. In this position, the kicker 174 also partially blocks the upper end 162 of the sleeper path 118. Thus, when the pivot bar 32 reaches the upper end 162 of the sleeper path 118, the kicker 174 is pivoted upward an additional amount, which in turn causes the projection 178 to press against the hook 138 to disengage the hooks 120, 138, which in turn allows the force applied by the torsion spring 130 to the first arm 126 to rotate the lever 136 back to its original position and thus rotating the diverter 124 back to the diverter reclining position 156.

To transition the passenger seat 10 out of the sleeper position, the passenger actuates the reclining mechanism control 158 that causes the reclining mechanism 60 to transition the passenger seat 10 from the sleeper position (as shown in FIGS. 4 and 7) where the pivot bar 32 is located in the upper end 162 of the sleeper path 118 (as shown in FIGS. 19, 22, and 26) to the fully-upright position (as shown in FIGS. 1, 2, and 5) where the pivot bar 32 is located in the aft-most position 144 on the reclining path 116 (as shown in FIGS. 15, 20, and 23). In the embodiments where the diverter 124 is placed in the diverter reclining position 156 while the pivot bar 32 is located in the upper end 162 of the sleeper path 118 (as shown in FIG. 19), the pivot bar 32 may press against the diverter 124 to assist with transitioning it to the diverter sleeper position 154 to allow the pivot bar 32 to exit the sleeper path 118. Once the pivot bar 32 travels to the aft-most position 144 on the track 16 (as shown in FIGS. 17, 21, and 25), the sleeper selection control 146 may be adjusted to return the diverter 124 to the diverter reclining position 156. In some embodiments, as shown in FIGS. 15-22, the pressure applied by the torsion spring 130 to the first arm 126 may also cause the diverter 124 to rotate back to the diverter reclining position 156.

Figure 3:
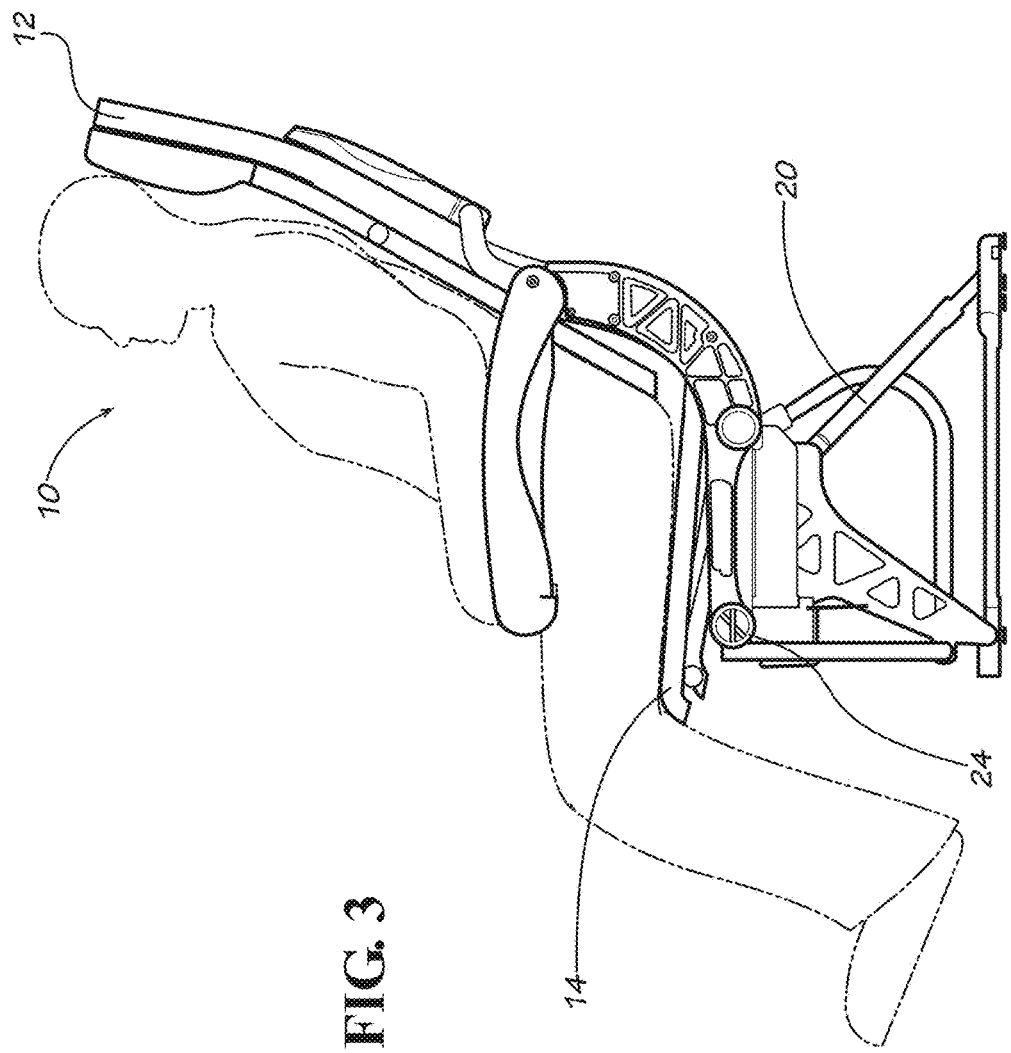
FIG. 3 is a general side view of the passenger seats of FIGS. 1 and 22 in a reclining position.
Figure 6:
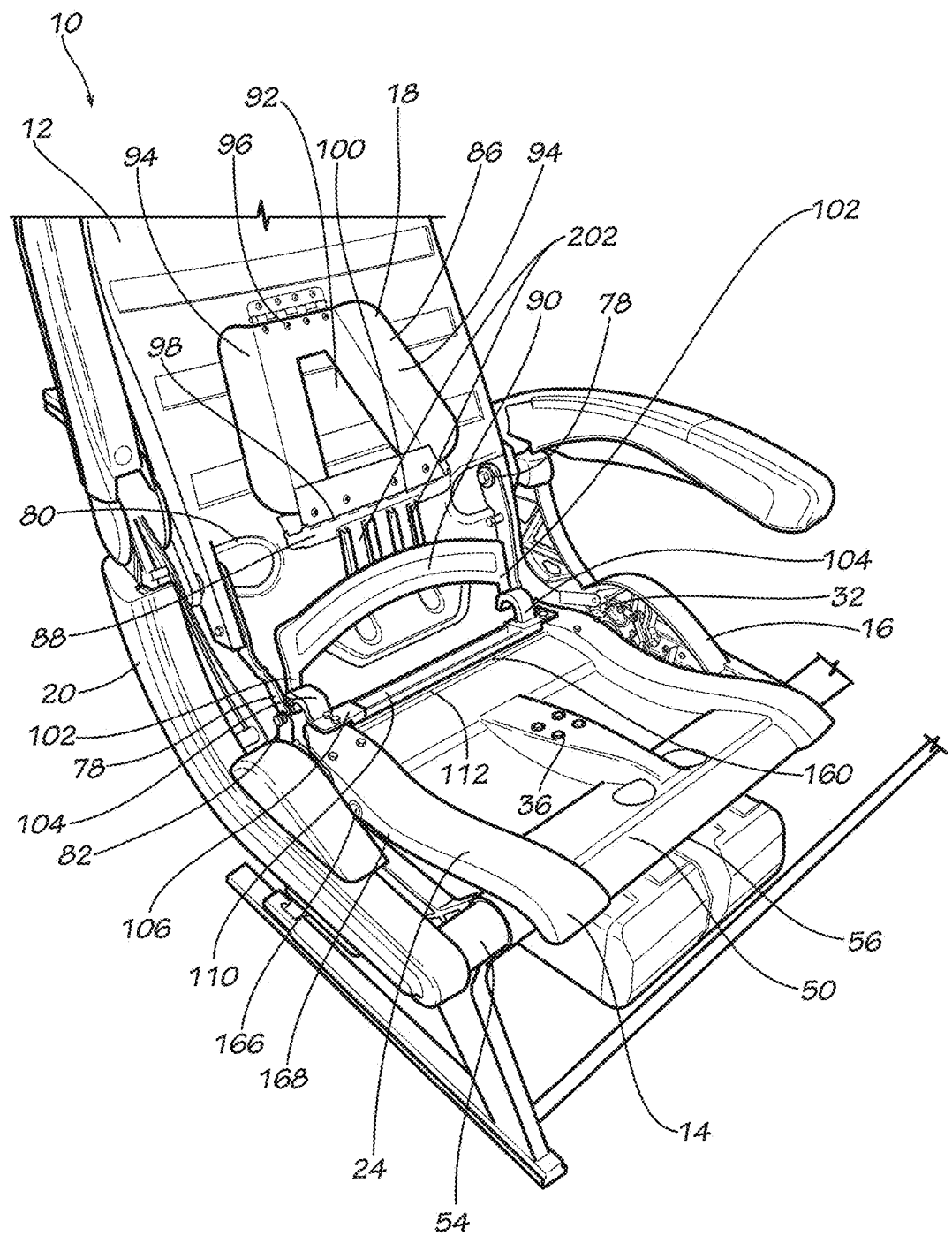
FIG. 6 is a partial perspective view of the passenger seat of FIG. 1 in a reclining position.
Figure 24:
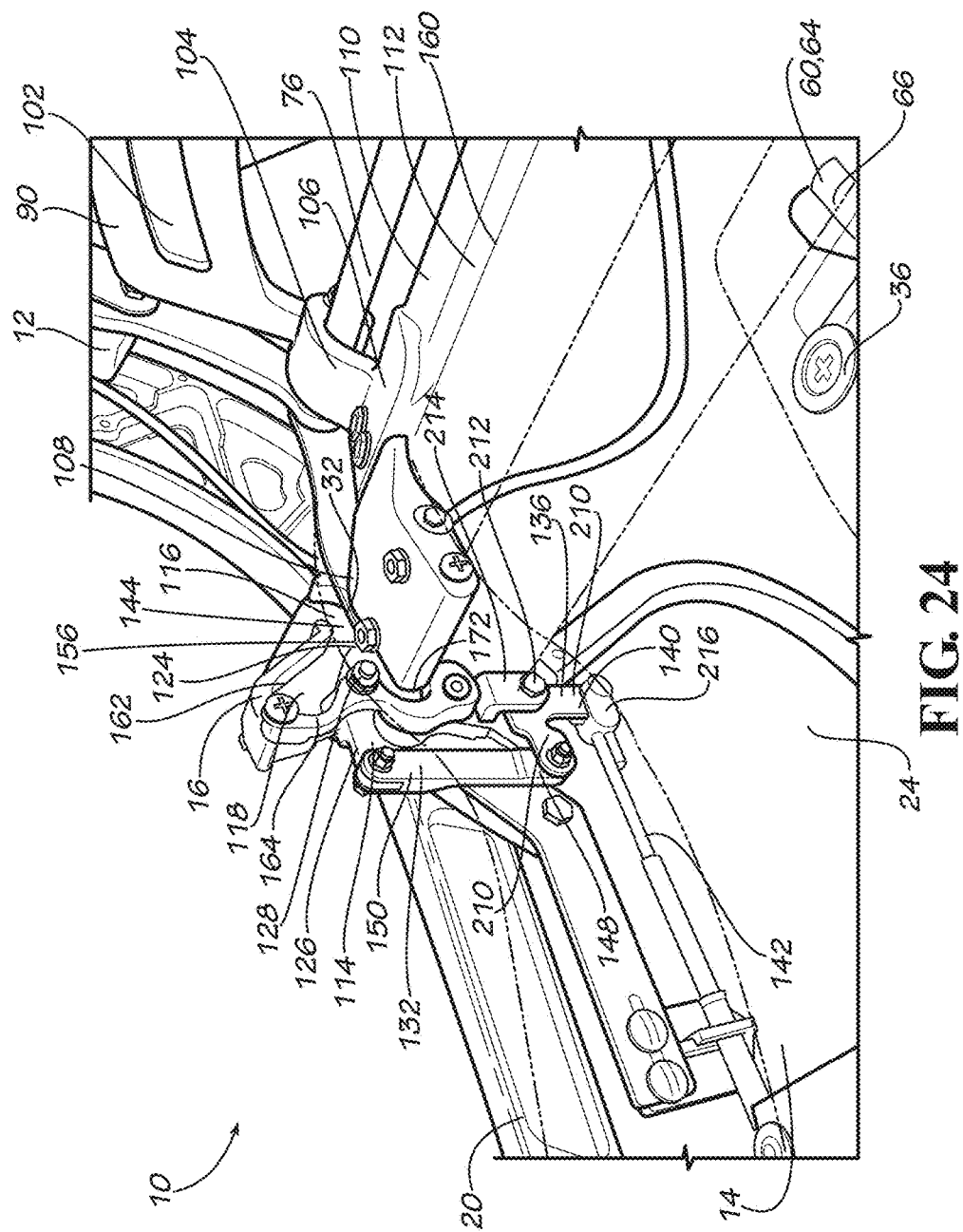
FIG. 24 is a partial perspective view of the track of FIG. 23, where the passenger seat is in a reclining position and a diverter is in a diverter reclining position.

To transition the passenger seat 10 to a reclining position, a passenger actuates the reclining mechanism control 158 that causes the reclining mechanism 60 to transition the passenger seat 10 from the fully-upright position (as shown in FIGS. 1, 2, and 5) where the pivot bar 32 is located in the aft-most position 144 on the reclining path 116 (as shown in FIGS. 15, 20, and 23) to the reclining position (as shown in FIGS. 3 and 6) where the pivot bar 32 is located in a forward-most position 172 on the reclining path 116 (as shown in FIGS. 16 and 24). As part of this transition, the reclining mechanism 60 exerts a force on the seat pan assembly 14, which adjusts the forward position of the seat pan assembly 14 as the pivot bar 32 slides along the reclining path 116 and pivots the seat back 12 to the reclining position through the couplings between these components.

When the seat pan assembly 14 travels forward, the coupling between the seat back 12, the seat pan 24, and the lumbar mechanism 18 causes the lower structure 90 to slide downward on the tracks 202 to compensate for the amount of forward travel of the seat pan assembly 14 and recline of the seat back 12, but does not rotate the lower edge 98 of the upper structure 86 forward, so that the lumbar mechanism 18 is not deployed in the reclining position (as shown in FIGS. 3 and 6). The passenger also has the option of adjusting the amount of recline so that the passenger seat 10 may be positioned in any configuration between the fully upright position and the reclining position.

In other embodiments, as shown in FIGS. 27-50, a tilting mechanism 180 may be separated from the reclining mechanism 60 so that a passenger may operate the sleeper and reclining functions simultaneously or separately. In this embodiment, the track 16 comprises a conventional reclining path 116 without the additional sleeper path 118, similar to the embodiment shown in FIG. 14. As shown in FIGS. 30, 39, 42, 47, and 50, the seat pan 24 is configured to pivot relative to the pan frame 26 via the sleeper pivot bar 40 and at least one tilting mechanism 180. In some embodiments, as shown in FIGS. 34-36, the tilting mechanism 180 may be a locking gas spring comprising a cylinder 182 and a piston 184. In other embodiments, as shown in FIGS. 37-50, the tilting mechanism 180 may be a clutch assembly comprising a fixed component 220 and an variable component 222. In other embodiments, other suitable types of tilting mechanisms may be used. For example, in some embodiments, the tilting mechanism 180 may comprises at least one damper.

In some embodiments, as shown in FIGS. 34-36, which may include a gas spring as the tilting mechanism 180, the piston 184 is coupled to a bracket 186, which is in turn coupled to the underside 68 of the support bar 28. In some embodiments, a spherical plane bearing 188 may be used to used to couple the piston 184 to the bracket 186. The spherical plane bearing 188 allows the piston 184 to rotate in all directions relative to the bracket 186, but prevents the piston 184 from sliding forward or aft relative to the bracket 186. However, one of ordinary skill in the relevant art will understand that any suitable type of couplings may be used to couple the piston 184 to the bracket 186.

The cylinder 182 may include a pivotal coupling 190. In some embodiments, the pivotal coupling 190 is coupled to an angled bracket 192 that is positioned on the inner surface 56 of the seat pan 24. A quick release pin mechanism may be used to couple the cylinder 182 to the angled bracket 192. However, any suitable mechanical fasteners may be used including but not limited to screws, bolts, rivets, or other suitable mechanical fastening devices.

In some embodiments, as shown in FIGS. 37-50, which may include a clutch assembly as the tilting mechanism 180, the fixed component 220 is coupled to the underside 68 of the support bar 28, and the variable component 222 is coupled to the inner surface 56 of the seat pan 24. In these embodiments, the fixed component 220 and the variable component 222 may be coupled to one another via a plurality of interlocking teeth 224.

For example, in some embodiments where the clutch assembly may be a jaw clutch, as shown in FIGS. 37-44, the interlocking teeth 224 are arranged on a planar surface 226 of a mounting plate 228 within each of the fixed component 220 and the variable component 222. The variable component 222 includes a spring 230 that provides a coupling force that engages the interlocking teeth 224 of the variable component 222 with the interlocking teeth 224 of the fixed component 220. When the interlocking teeth 224 are engaged, the seat pan 24 (attached to the variable component 222) is prevented from rotating relative to the fixed component 220 (attached to the support bar 28).

Figure 43:
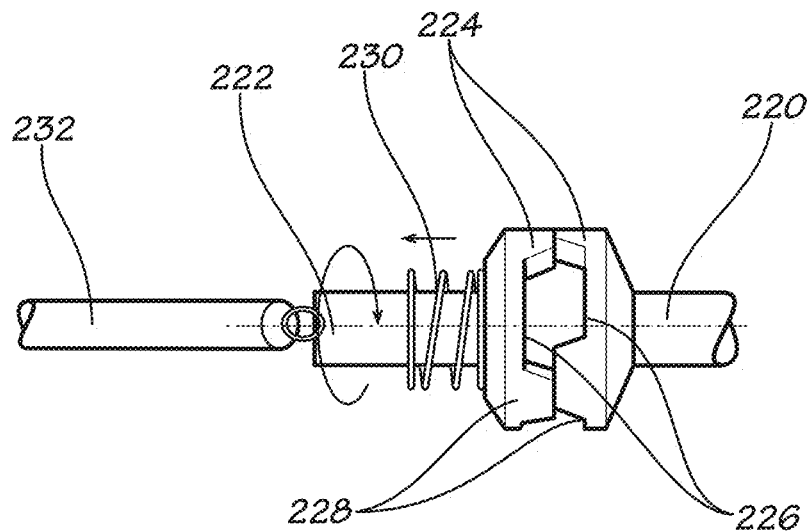
FIG. 43 is a side view of the internal components of certain embodiments of the tilting mechanism of FIG. 37, with a variable component disengaged from a fixed component.
Figure 44:
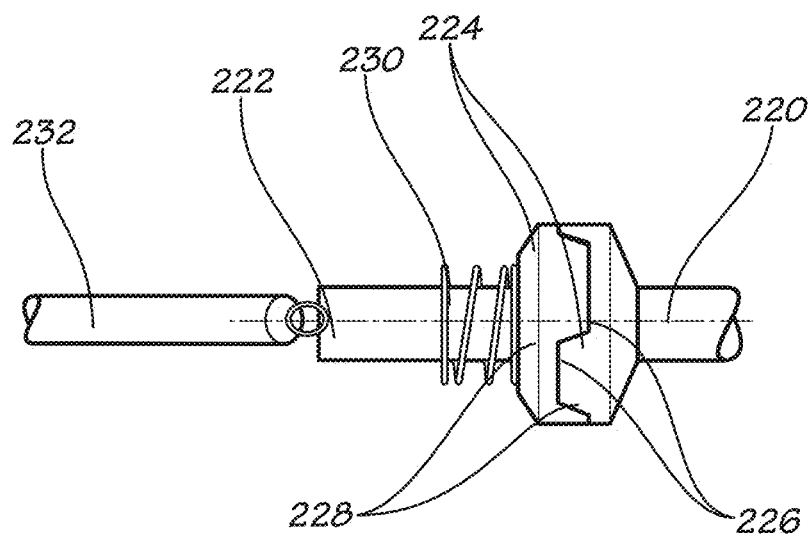
FIG. 44 is a side view of the internal components of FIG. 43, with the variable component engaged with the fixed component.
Figure 45:
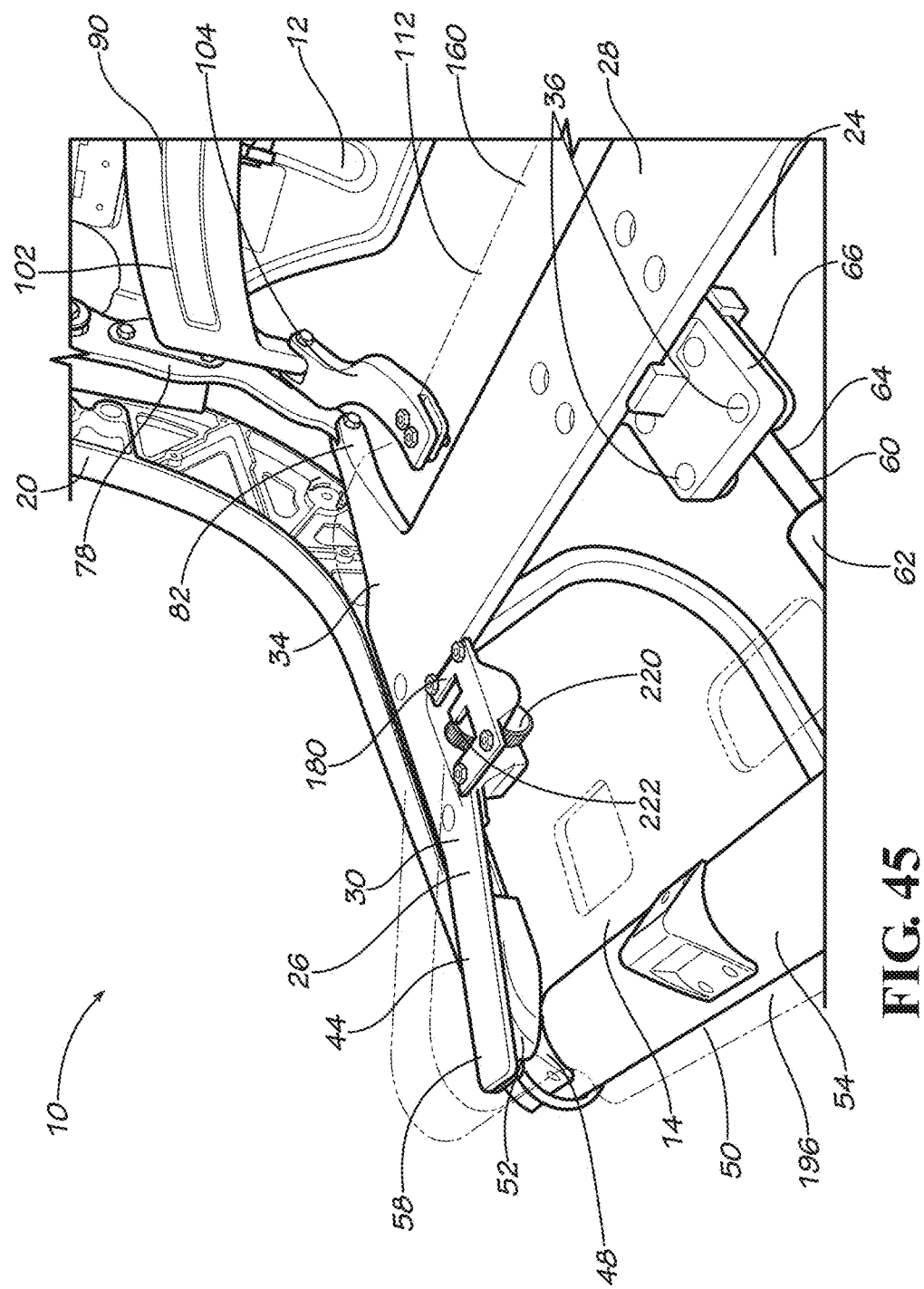
FIG. 45 is a top partial perspective view of other embodiments of a tilting mechanism for the passenger seat of FIG. 36, where the passenger seat is in an upright position.
Figure 46:
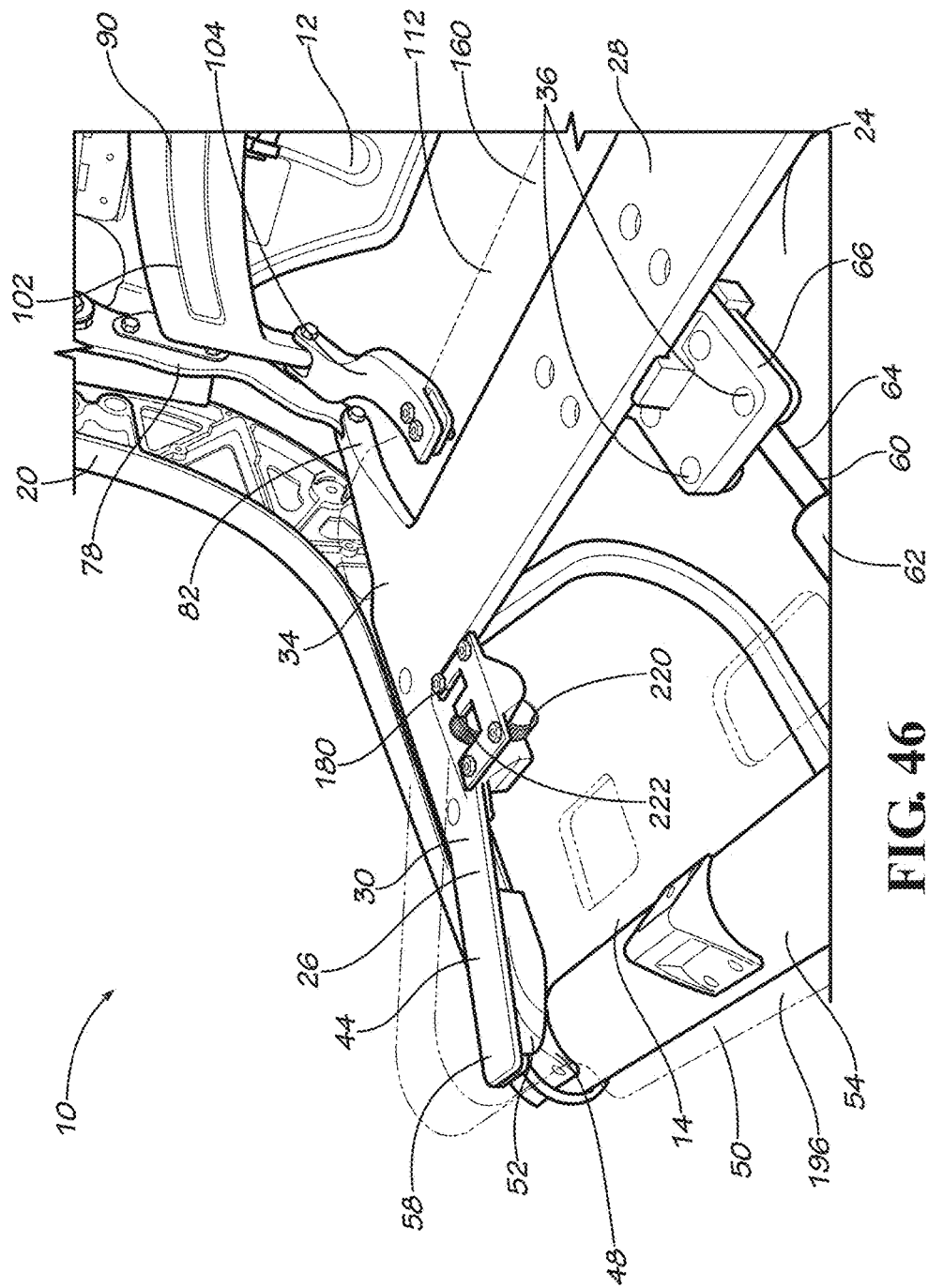
FIG. 46 is a top partial perspective view of the tilting mechanism of FIG. 45, where the passenger seat is in a reclining position.
Figure 47:
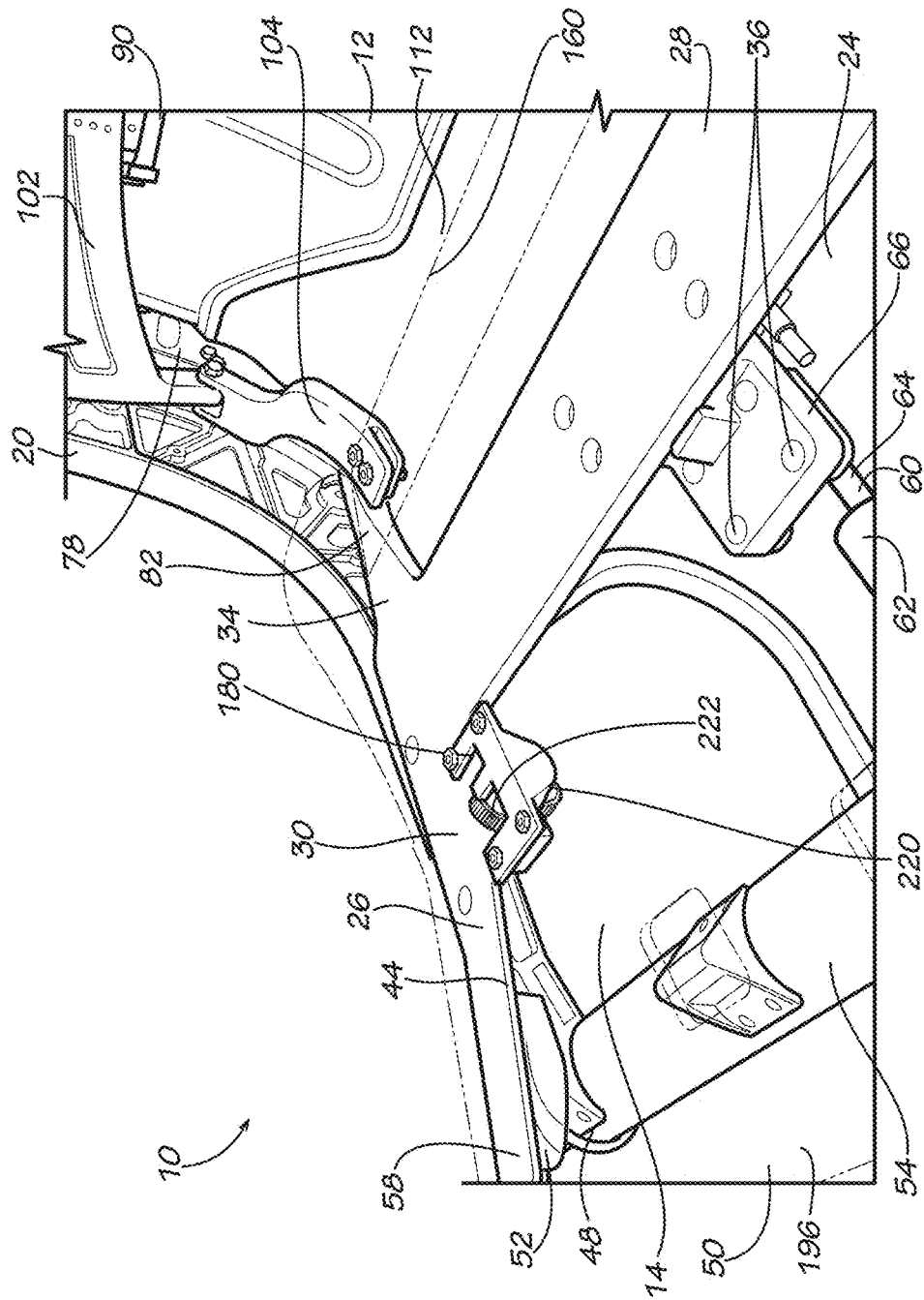
FIG. 47 is a top partial perspective view of the tilting mechanism of FIG. 45, where the passenger seat is in a sleeper position.
Figure 48:
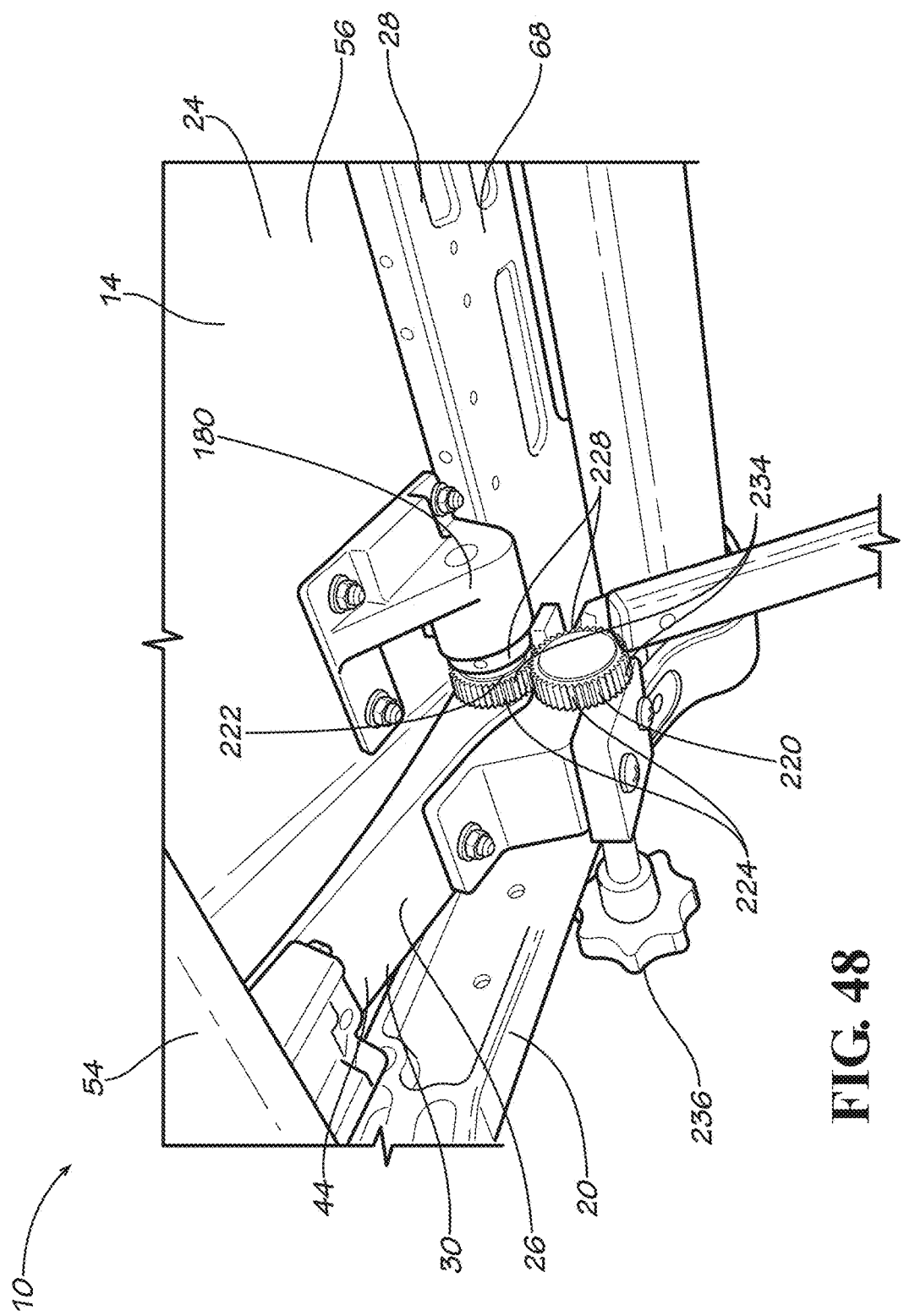
FIG. 48 is a bottom partial perspective view of the tilting mechanism of FIG. 45, where the passenger seat is in an upright position.
Figure 49:
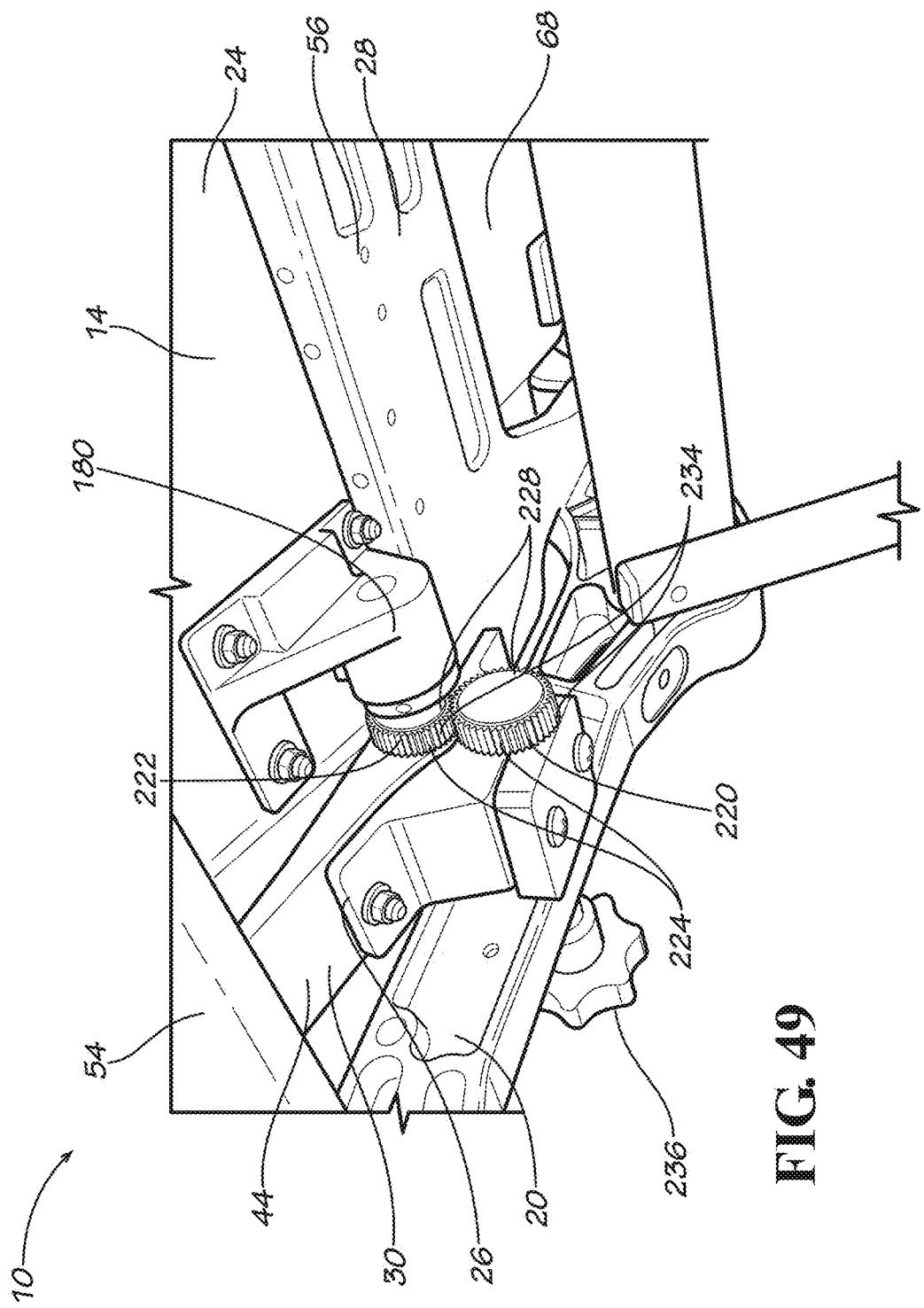
FIG. 49 is a bottom partial perspective view of the tilting mechanism of FIG. 45, where the passenger seat is in a reclining position.

As best illustrated in FIGS. 43-44, to disengage the variable component 222 from the fixed component 220, a pulling force is applied to the variable component 222 via an actuation cable 232, which compresses the spring 230 and pulls the variable component 222 a distance away from the fixed component 220 so that the interlocking teeth 224 are no longer interlocked with one another. In the disengaged position, the seat pan 24 (attached to the variable component 222) may then rotate relative to the fixed component 220 (attached to the support bar 28). When the actuation cable 232 is released, the variable component 222 moves back toward the fixed component 220 so that the interlocking teeth 224 reengage at the current position of the variable component 222. In other words, when the actuation cable 232 is pulled, the variable component 222 is pulled away from the fixed component 220 and the seat pan 24 is free to rotate relative to the support bar 28. When the actuation cable 232 is released, the variable component 222 reengages with the fixed component 220 and the seat pan 24 is held in position at the respective amount of rotation attained by the seat pan 24 at the moment the actuation cable 232 is released.

In other embodiments where the clutch assembly may be a friction clutch, as shown in FIGS. 45-50, the interlocking teeth 224 are arranged on a circumferential surface 234 of each mounting plate 228. In these embodiments, the variable component 222 does not slide relative to the fixed component 220. As a result, the interlocking teeth 224 of the fixed component 220 and the variable component 222 do not disengage from each other in order to rotate the seat pan 24 relative to the support bar 28. Rather, the fixed component 220 includes an adjustment knob 236, which apples a frictional force to control the ability of the fixed component 220 to rotate. When the knob 236 is tightened, the amount of frictional force applied by the knob 236 to the fixed component 220 increases until the fixed component 220 is prevented from rotating. Because the interlocking teeth 224 of the variable component 222 remain engaged with the interlocking teeth 224 of the fixed component 220, the variable component 222 is also prevented from rotating. Thus, when the knob 236 is tightened, the seat pan 24 (attached to the variable component 222, which is in turn interlocked with the fixed component 220) is also prevented from rotating relative to the support bar 28.

To unlock the seat pan 24, the knob 236 is loosened, which in turn reduces the frictional force applied to the fixed component 220 until the fixed component 220 is free to rotate. Because the interlocking teeth 224 of the variable component 222 are engaged with the interlocking teeth 224 of the fixed component 220, the variable component 222 is also free to rotate. Thus, when the knob 236 is loosened, the seat pan 24 (attached to the variable component 222, which is in turn interlocked with the fixed component 220) is free to rotate relative to the support bar 28. When the knob 236 is retightened, the seat pan 24 is held in position at the respective amount of rotation attained by the seat pan 24 at the moment the knob 236 is retightened.

Figure 27:
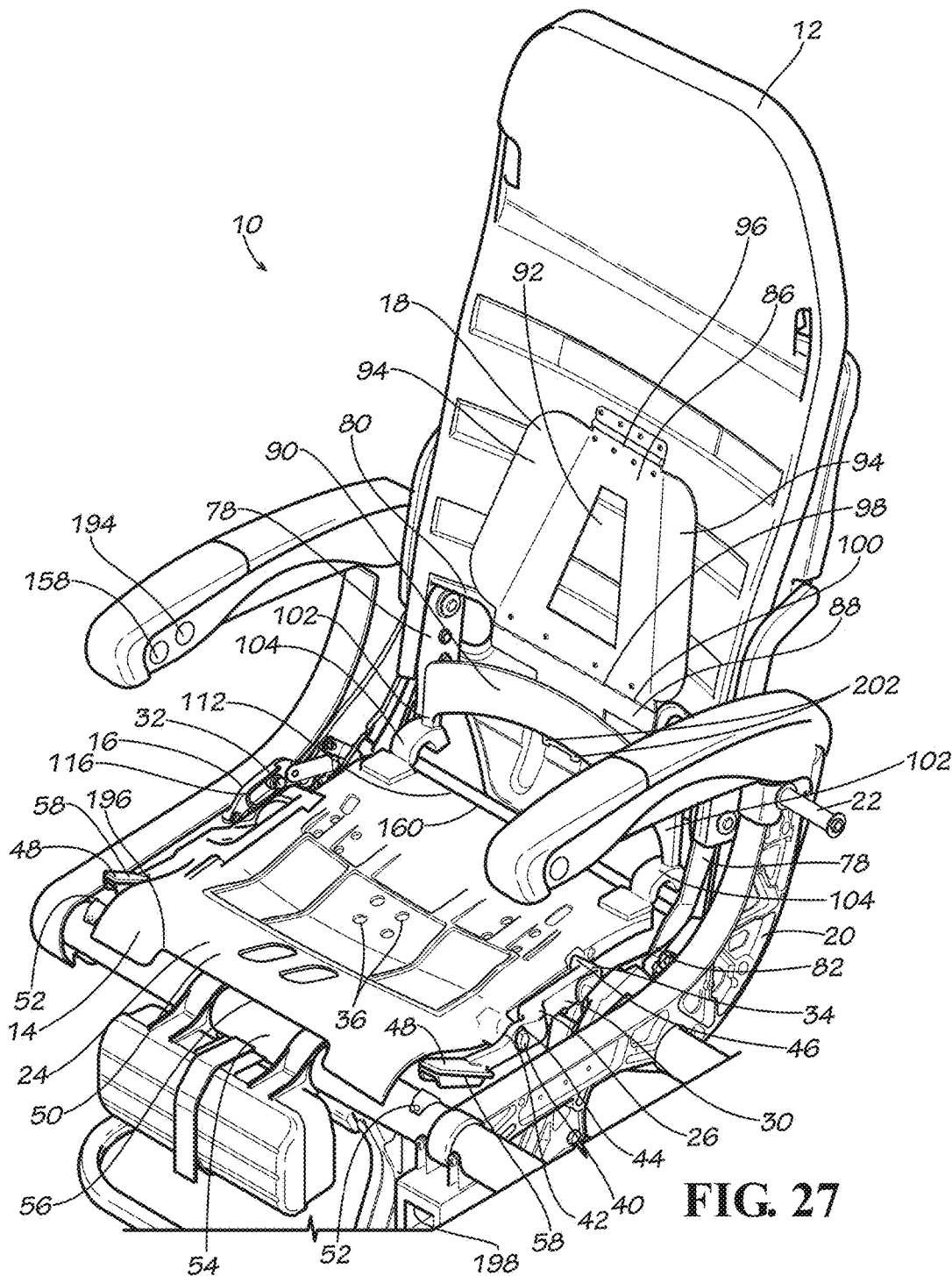
FIG. 27 is a perspective view of a passenger seat according other embodiments of the present invention.
Figure 28:
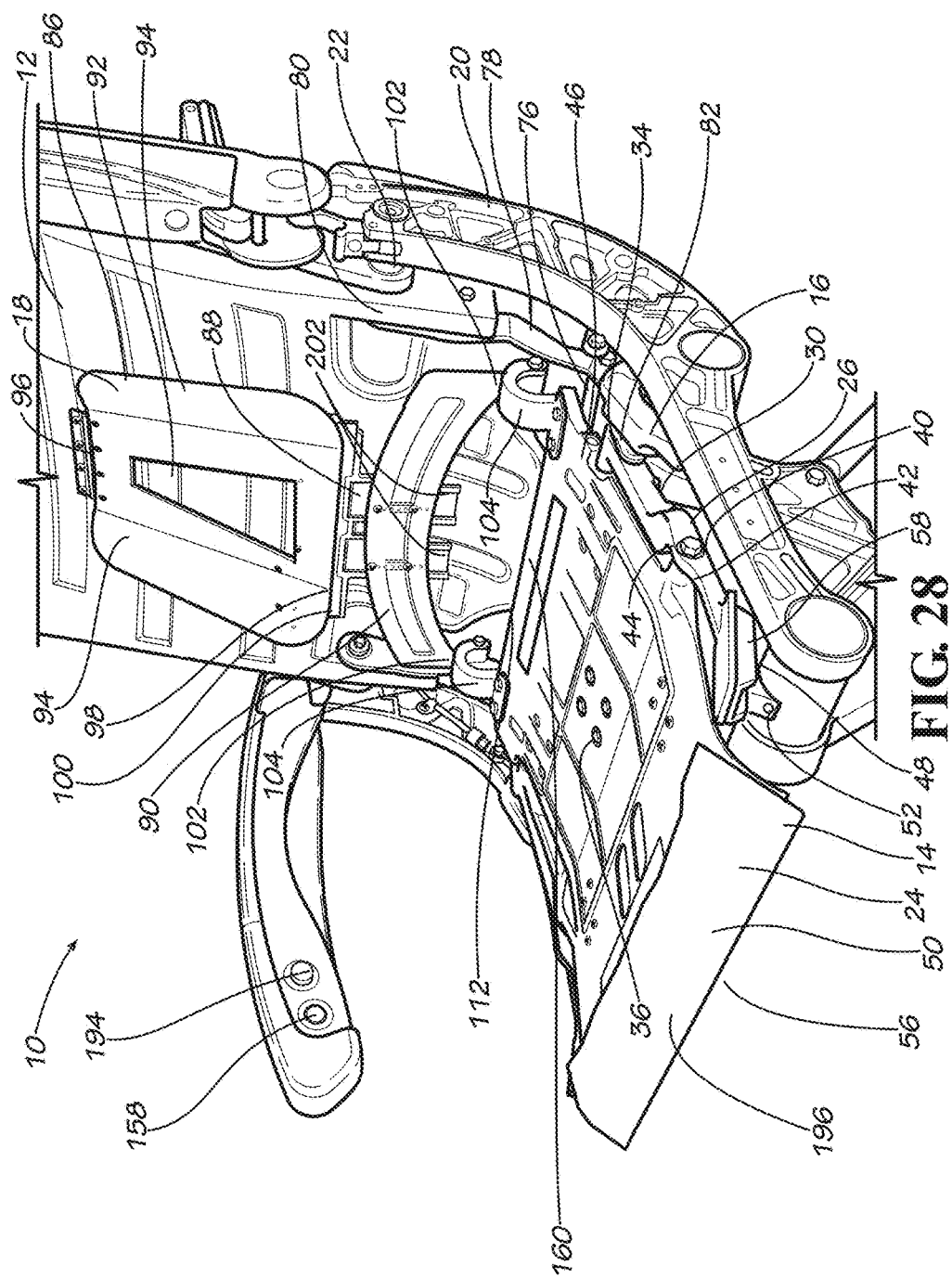
FIG. 28 is a partial perspective view of the passenger seat of FIG. 27 in an upright position.
Figure 29:
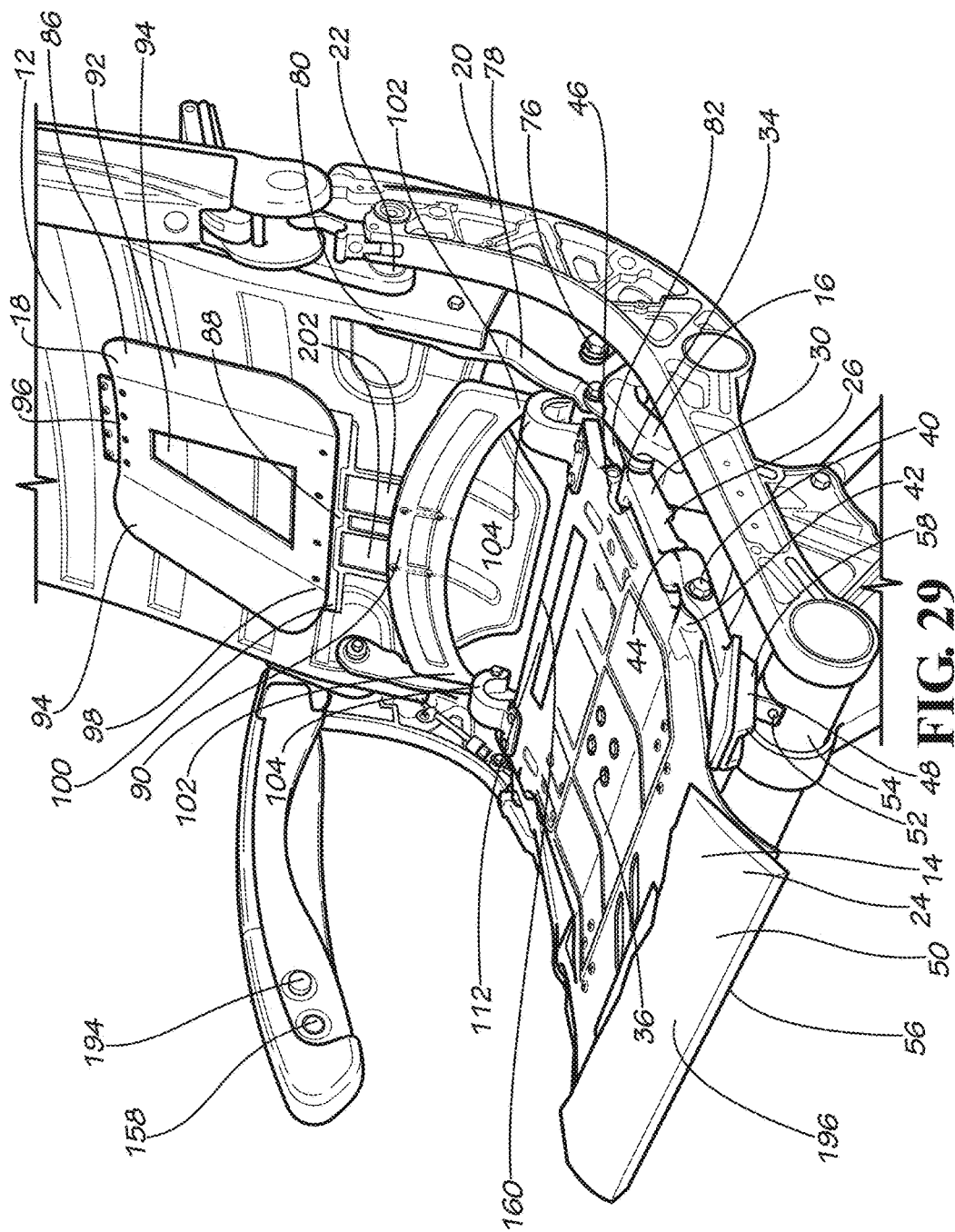
FIG. 29 is a partial perspective view of the passenger seat of FIG. 27 in a reclining position.
Figure 31:
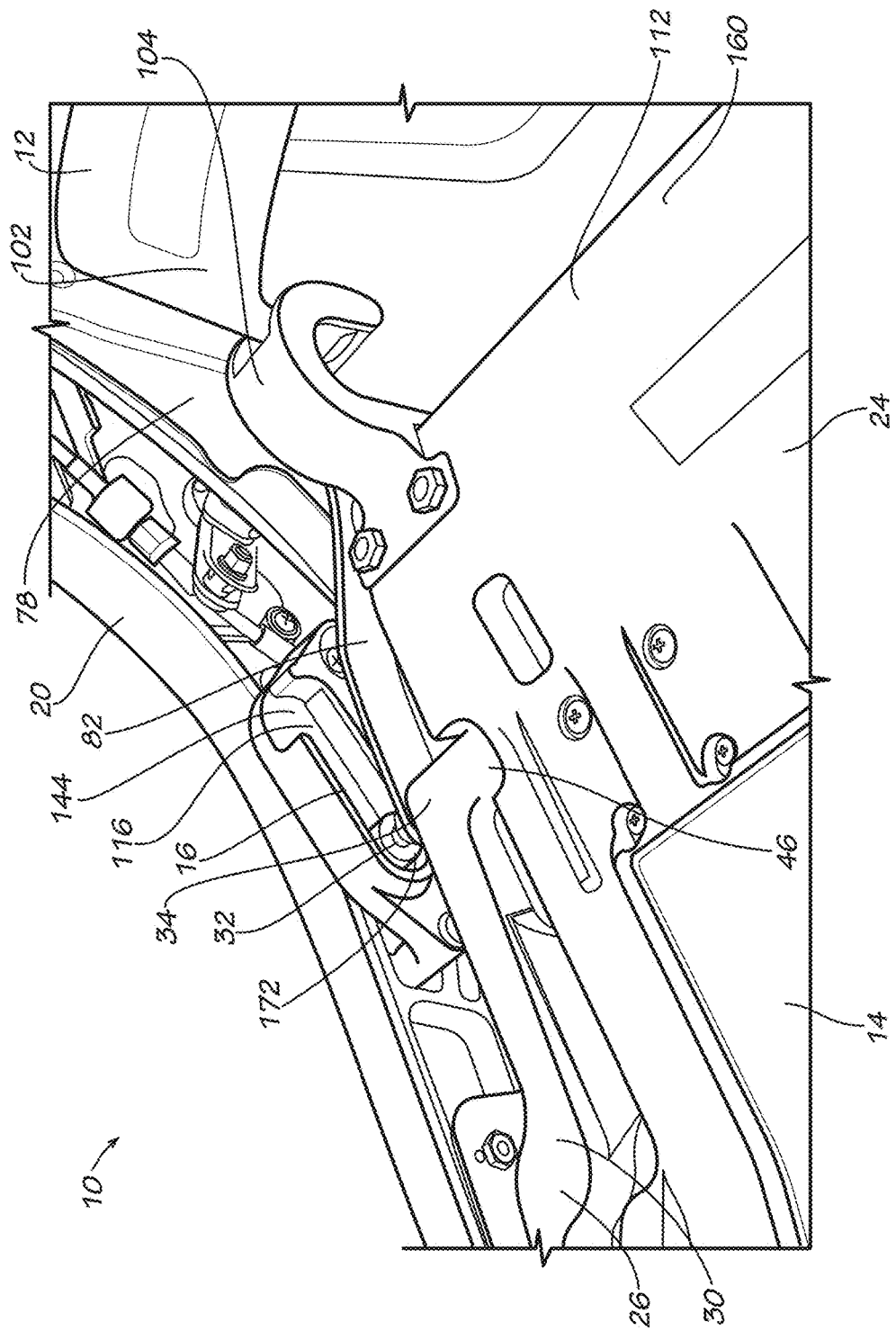
FIG. 31 is a partial perspective view of other embodiments of a track for the passenger seat of FIG. 27, where the passenger seat is in a reclining position.
Figure 32:
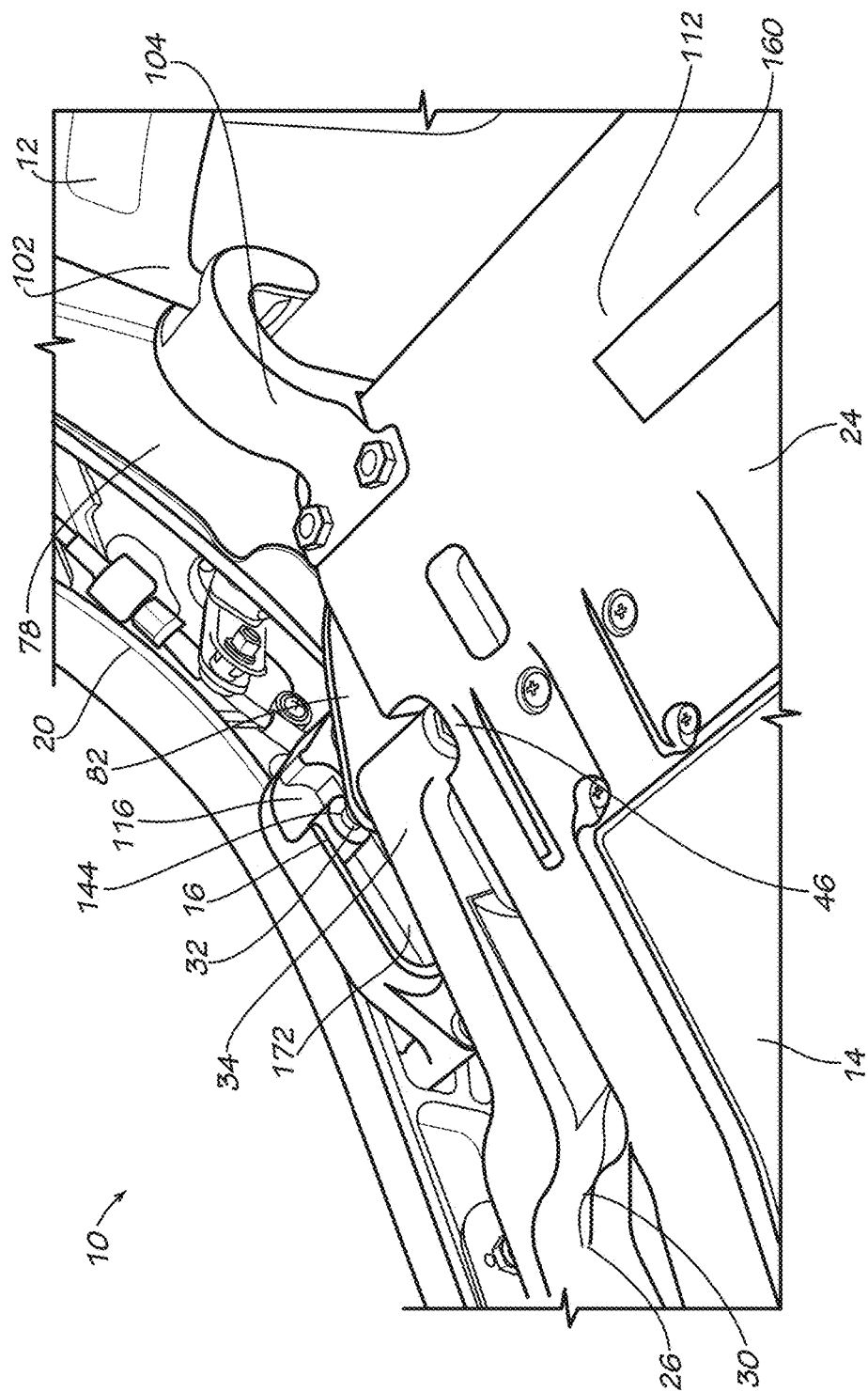
FIG. 32 is a partial perspective view of the track of FIG. 31, where the passenger seat is in an upright position.
Figure 33:
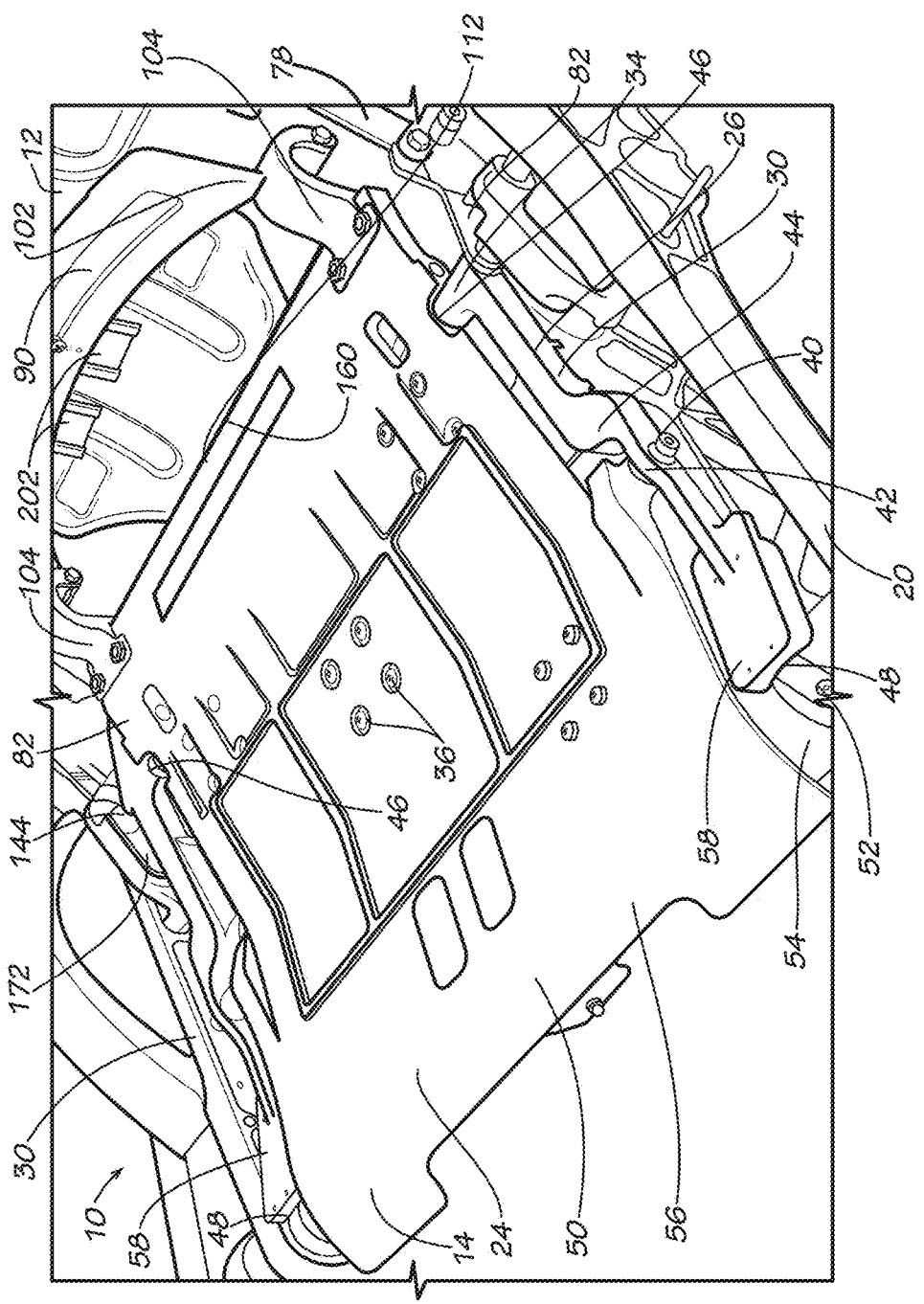
FIG. 33 is a partial perspective view of the passenger seat of FIG. 27 in an upright position.

In these embodiments, to transition the passenger seat 10 to the reclining position, a passenger actuates the reclining mechanism control 158 that causes the reclining mechanism 60 to transition the passenger seat 10 from the fully-upright position (as shown in FIGS. 2 and 27) where the pivot bar 32 is located in the aft-most position 144 on the reclining path 116 (as shown in FIG. 32) to the reclining position (as shown in FIG. 29) where the pivot bar 32 is located in the forward-most position 172 on the reclining path 116 (as shown in FIG. 31). As part of this transition, the reclining mechanism 60 exerts a force on the seat pan assembly 14, which adjusts a forward position of the seat pan assembly 14 and pivots the seat back 12 to the reclining position through the couplings between these components.

When the seat pan assembly 14 travels forward, the coupling between the seat back 12, the seat pan 24, and the lumbar mechanism 18 cause the lower structure 90 to slide downward on the tracks 202 to compensate for the amount of forward travel of the seat pan assembly 14 and recline of the seat back 12, but does not rotate the lower edge 98 of the upper structure 86 forward, so that the lumbar mechanism 18 is not deployed in the reclining position (as shown in FIGS. 3 and 29). The passenger also has the option of adjusting the amount of recline so that the passenger seat 10 may be positioned in any configuration between the fully upright position and the reclining position.

To transition the passenger seat 10 to the sleeper position, a passenger actuates a separate tilting mechanism control 194, which is coupled to the tilting mechanism 180. In some embodiments, the tilting mechanism control 194 may be coupled to the actuation cable 232 of the jaw clutch assembly and/or may be the adjustment knob 236 of the friction clutch assembly. One of ordinary skill in the relevant art will understand that the tilting mechanism control 194 is any suitable actuation device that transitions the tilting mechanism 180 between locked and adjustable positions.

Figure 30:
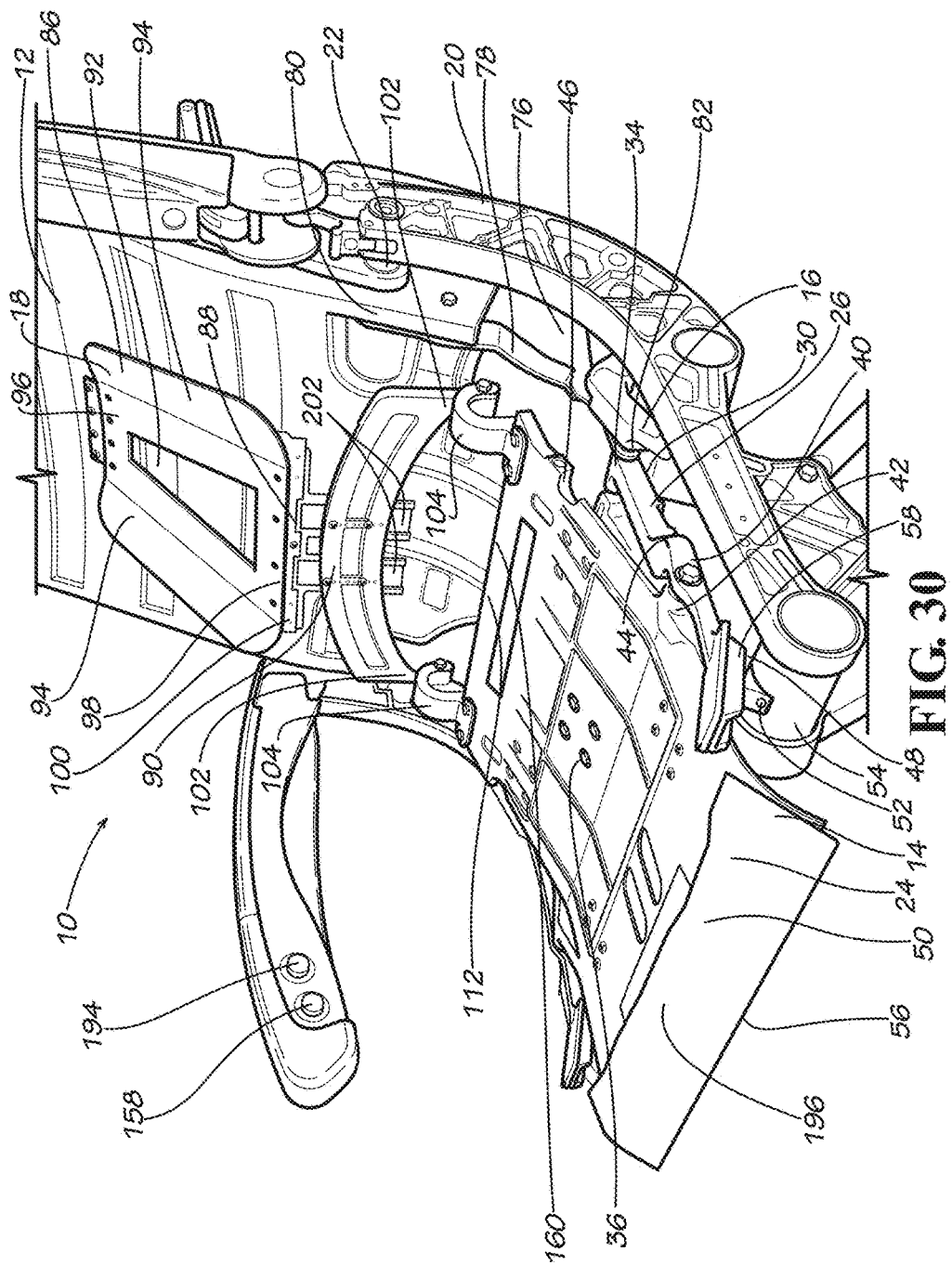
FIG. 30 is a partial perspective view of the passenger seat of FIG. 27 in a sleeper position.

Actuation of the tilting mechanism control 194 causes the tilting mechanism 180 to transition the passenger seat 10 from a substantially horizontal position where the seat pan 24 is adjacent the pan frame 26 (as shown in FIGS. 2, 3, and 27-29) to the sleeper position where the seat pan 24 is pivoted relative to the pan frame 26 (as shown in FIGS. 4 and 30). As part of this transition, the tilting mechanism 180 causes forward end 196 of the seat pan 24 to rotate in a downward direction, which induces an upward rotation of the aft end 112 of the seat pan 24, which is located aft of the sleeper pivot bar 40. When the aft end 112 of the seat pan 24 rotates upward, the coupling between the seat back 12, the seat pan 24, and the lumbar mechanism 18 causes the lower edge 98 of the upper structure 86 to rotate forward and the lower structure 90 to slide upward on the tracks 202 to compensate for the amount of forward and upward travel of the seat pan 24 and recline of the seat back 12, so that the lumbar mechanism 18 is deployed in the sleeper position (as shown in FIGS. 4 and 30). The passenger also has the option of adjusting the amount of tilt so that the passenger seat 10 may be positioned in any configuration between the fully upright position and the reclining position.

In yet other embodiments, as shown in FIGS. 36-50, the seat pan assembly 14 is not coupled to the seat frame 20 via a pivot bar 32 and the at least one track 16. Rather, the forward end 50 of the seat pan assembly 14 is coupled to the seat frame 20 via the at least one coupling device 48 and the at least one coupling receptacle 52, but the aft end 160 of the seat pan assembly 14 is pivotally coupled to and supported by the seat back 12. In this embodiment, the tilting mechanism 180 is substantially similar to the above description with respect to the embodiments shown in FIGS. 27-35. The reclining mechanism 60, however, no longer comprises the pivot bar 32 or the track 16.

In these embodiments, to transition the passenger seat 10 to the reclining position, a passenger actuates the reclining mechanism control 158 that causes the reclining mechanism 60 to transition the passenger seat 10 from the fully-upright position (similar to the position shown in FIG. 2) to the reclining position (similar to the position shown in FIG. 3). The aft position of the seat pan assembly 14 is controlled through the actuation of the reclining mechanism 60 and the pivotal coupling between the seat pan assembly 14 and the seat back 12. As part of this transition, the reclining mechanism 60 exerts a force on the seat pan assembly 14, which adjusts a forward position of the seat pan assembly 14 and pivots the seat back 12 to the reclining position through the pivotal couplings between these components.

When the seat pan assembly 14 travels forward, the coupling between the seat back 12, the seat pan 24, and the lumbar mechanism 18 causes the lower structure 90 to slide downward on the tracks 202 to compensate for the forward travel of the seat pan assembly 14 and recline of the seat back 12, but does not rotate the lower edge 98 of the upper structure 86 forward, so that the lumbar mechanism 18 is not deployed in the reclining position. The passenger also has the option of adjusting the amount of recline so that the seat back 12 and the seat pan assembly 14 are positioned anywhere between the fully-upright position and the reclining position.

While the above embodiments describe the use of reclining mechanisms 60 and/or tilting mechanisms 180 and/or lumbar mechanisms 18 to adjust the various positions of the passenger seat 10, any suitable device may be used to adjust the passenger seat 10 into the desired upright, reclining, and sleeper positions, including but not limited to any type of motor, spring, hydraulic controls, inflatable devices, or other similar devices, and with or without any type of lumbar mechanism 18, including but not limited to inflatable, expandable, or rotatable lumbar mechanisms.

In some embodiments, as shown in FIGS. 1 and 34-36, an IFE display 198 may be included with the passenger seat 10. An IFE box 200 may be attached to the seat frame 20 below the seat pan assembly 14 to provide the passenger more leg room and baggage space underneath the seat. In order to access the IFE box 200, a technician needs to position the seat pan assembly 14 in the open position (as shown in FIGS. 34-36). In the embodiments where seat pan assembly 14 and the seat frame 20 are releasably coupled via the combination of the coupling device 48 and the coupling receptacle 52, the technician disengages the coupling device 48 from the coupling receptacle 52. In some embodiments where two or more combinations of coupling devices 48 and coupling receptacles 52 are used, the technician disengages each coupling device 48 from each coupling receptacle 52. The technician also pulls the quick release pin (or otherwise removes the fasteners) to disconnect the reclining mechanism 60 from the seat frame 20. In the embodiment shown in FIGS. 34-35, the lower structure 90 slides out of the tracks 202 when the seat pan assembly 14 is rotated into the open position. In the embodiment shown in FIG. 36, the lower structure 90 may optionally remain in the lower end of the tracks 202 when the seat pan assembly 14 is rotated into the open position because the seat pan 24 is pivotally coupled to the seat back 12 and pivots relative to the pan frame 26 in the same location. The technician is then able to rotate the seat pan assembly 14 upward to the open position (as shown in FIGS. 34-36) and easily access the IFE box 200.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat comprising:
   (a) a seat pan assembly comprising:
      (i) a reclining mechanism;
      (ii) a seat frame comprising at least one track comprising a reclining path and a sleeper path;
      (iii) a diverter pivotally coupled to the at least one track adjacent an opening to the reclining path and an opening to the sleeper path;
      (iv) a sleeper selection control coupled to the diverter and configured to pull the diverter into a position substantially blocking the opening to the reclining path and to push the diverter into a position substantially blocking the opening to the sleeper path; and
      (v) at least one pivot bar coupled to an aft end of the seat pan assembly;
   (b) a seat back pivotally coupled to the aft end of the seat pan assembly; and
   (c) a lumbar mechanism coupled to the seat back and the seat pan assembly;
   (d) wherein the at least one pivot bar is positioned within the at least one track so that a circumferential surface of the at least one pivot bar maintains contact with a side of the at least one track when the at least one pivot bar is positioned in the reclining path and when the at least one pivot bar is positioned in the sleeper path.

2. The passenger seat of claim 1, wherein the sleeper selection control is a button, a knob, a side lever, a lever, a slide, or a latch.

3. The passenger seat of claim 1, wherein the reclining mechanism is configured to:
   (a) adjust a forward position of the seat pan assembly when the diverter is positioned to substantially block the opening to the sleeper path; and
   (b) adjust the forward position of the seat pan assembly, a rotated position of the aft end of the seat pan assembly, and rotate the lumbar mechanism relative to the seat back when the diverter is positioned to substantially block the opening to the reclining path; and
   (c) rotate the seat back between upright and reclining positions.

4. The passenger seat of claim 1, wherein the reclining mechanism is a gas spring.

5. The passenger seat of claim 1, further comprising a lever comprising at least two legs, wherein a first leg of the at least two legs is coupled to the diverter via a linkage, and a second leg of the at least two legs is coupled to a first end of a cable, wherein a second end of the cable is coupled to the sleeper selection control.

6. The passenger seat of claim 5, wherein the cable comprises a telescoping configuration.

7. A seat pan assembly comprising:
   (a) a reclining mechanism;
   (b) a seat frame comprising at least one track comprising a reclining path and a sleeper path;
   (c) a diverter pivotally coupled to the at least one track adjacent an opening to the reclining path and an opening to the sleeper path;
   (d) a sleeper selection control coupled to the diverter and configured to pull the diverter into a position substantially blocking the opening to the reclining path and to push the diverter into a position substantially blocking the opening to the sleeper path; and
   (e) at least one pivot bar coupled to an aft end of the seat pan assembly, wherein the at least one pivot bar is positioned within the at least one track so that a circumferential surface of the at least one pivot bar maintains contact with a side of the at least one track when the at least one pivot bar is positioned in the reclining path and when the at least one pivot bar is positioned in the sleeper path.

8. The seat pan assembly of claim 7, wherein the sleeper selection control is a button, a knob, a side lever, a lever, a slide, or a latch.

9. The seat pan assembly of claim 7, wherein the reclining mechanism is configured to:
   (a) adjust a forward position of the seat pan assembly when the diverter is positioned to substantially block the opening to the sleeper path; and
   (b) adjust the forward position of the seat pan assembly and a rotated position of the aft end of the seat pan assembly.

10. The seat pan assembly of claim 7, wherein the reclining mechanism is a gas spring.

11. The seat pan assembly of claim 7, further comprising a lever comprising at least two legs, wherein a first leg of the at least two legs is coupled to the diverter via a linkage, and a second leg of the at least two legs is coupled to a first end of a cable, wherein a second end of the cable is coupled to the sleeper selection control.

12. The seat pan assembly of claim 1, wherein the cable comprises a telescoping configuration.

13. A seat pan assembly comprising:
   (a) a reclining mechanism;
   (b) a seat frame comprising at least one track comprising a reclining path and a sleeper path;
   (c) a diverter pivotally coupled to the at least one track adjacent an opening to the reclining path and an opening to the sleeper path;
   (d) a push/pull-type cable arrangement is coupled to the diverter; and
   (e) at least one pivot bar coupled to an aft end of the seat pan assembly, wherein the at least one pivot bar is positioned within the at least one track so that a circumferential surface of the at least one pivot bar maintains contact with a side of the at least one track when the at least one pivot bar is positioned in the reclining path and when the at least one pivot bar is positioned in the sleeper path.

14. The seat pan assembly of claim 13, wherein the reclining mechanism is configured to:
  (a) adjust a forward position of the seat pan assembly when the diverter is positioned to substantially block the opening to the sleeper path; and
  (b) adjust the forward position of the seat pan assembly and a rotated position of the aft end of the seat pan assembly.

15. The seat pan assembly of claim 13, wherein the reclining mechanism is a gas spring.

16. The seat pan assembly of claim 13, wherein the push/pull-type cable arrangement comprises a telescoping configuration.

* * * * *